(12) United States Patent
Washizuka

(10) Patent No.: US 6,371,563 B1
(45) Date of Patent: *Apr. 16, 2002

(54) EMERGENCY-LOCK TYPE RETRACTOR WITH HAND-OPERATED BELT LOCK MECHANISM AND CHILD CAR SEAT INCORPORATING SAME RETRACTOR

(75) Inventor: Mitsuru Washizuka, Saitama (JP)

(73) Assignee: Combi Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/374,991

(22) Filed: Aug. 16, 1999

(30) Foreign Application Priority Data

Aug. 17, 1998 (JP) .............................................. 10-230836

(51) Int. Cl.[7] ................................................ B60R 22/38
(52) U.S. Cl. .................... 297/476; 297/478; 242/383.2; 242/384.2
(58) Field of Search ................................. 297/476, 478, 297/479, 480; 280/806, 807; 242/383.2, 383.4, 384–384.2

(56) References Cited

U.S. PATENT DOCUMENTS

| 5,380,066 A | * | 1/1995 | Wiseman ..................... 297/476 |
| 5,484,190 A | * | 1/1996 | Corrion et al. ............. 297/476 |
| 5,950,952 A | * | 9/1999 | Koketsu ................. 297/478 X |
| 6,045,194 A | * | 4/2000 | Kielwein et al. ........... 297/476 |

FOREIGN PATENT DOCUMENTS

GB                967710     *   8/1964    ................. 297/476

* cited by examiner

Primary Examiner—Peter R. Brown
(74) Attorney, Agent, or Firm—Whitham, Curtis & Christofferson, P.C.

(57) ABSTRACT

An emergency-lock type retractor includes an emergency lock part for stopping the rotation of said drum to restrict the pull-out of said belt when a belt wound around a drum is pulled suddenly at a predetermined speed or higher, and a hand-operated lock part capable of stopping the rotation of said drum by hand.

7 Claims, 36 Drawing Sheets

(1-1)

(1-2)

(2)

(1-1)

(1-2)

(2)

EMERGENCY-LOCK TYPE RETRACTOR WITH HAND-OPERATED BELT LOCK MECHANISM AND CHILD CAR SEAT INCORPORATING SAME RETRACTOR

BACKGROUND OF THE INVENTION

1. Field of the Invention

The invention relates to a child car seat which is fixed to a seat in a car for sitting an infant therein and, in particular, to an improved child car seat incorporating therein an emergency-lock type of retractor.

2. Related Art

When putting an infant aboard a car, in order to insure the safety of the infant, there is used a child car seat.

Conventionally, there are present various kinds of structures for the child car seat. Here, description will be predetermined below of the structure of an example of the conventional child car seats with reference to FIGS. 44 and 45.

A child car seat 101 shown in FIGS. 44 and 45 includes a seat part 102 with an infant's sitting seat portion and a back portion thereof formed as an integrally united body, and a base part 104 to be fixed to the seat of the car by a car seat belt 103. In the central portion of the front surface of the seat part 102, there is provided a stomach member 105; and, not only belts 106a and 106b to be pulled from the back surface side of the seat part 102 but also seat belts 106c and 106d fixed to the child car seat can be removably fixed to the stomach member 105, respectively by their associated fixing and removing metal members 106e and 106f.

And, the belts 106a and 106b are respectively fixed to one end of a plate-shaped belt adjusting metal member 110 on the back surface side of the seat part 102 and, to the other end of the belt adjusting metal member 110, there is fixed a length adjusting belt 311 which is pulled out from a retractor (which will be discussed later, and, in FIG. 1, is shown by reference character 1). The retractor is mounted in the lower portion of the seat part 102, while the length adjusting belt 311 is pulled out from a pull-out opening 312.

When using the above-mentioned child car seat 101, as shown in FIG. 45, the base part 104 is fixed to the seat of the car by the car seat belt 103 and the infant is then seated in the seat part 102. In this operation, the head of the infant is situated between the two belts 106a and 106b, while the two belts 106a and 106b are fixed to the stomach member 105 in such a manner that they hold the shoulder of the infant. Then, the stomach member 105 covers the stomach part and breast part of the infant, while the two lets of the infant are extended forwardly from the two sides of the stomach member.

In the normal running state of the car, the two belts 106a and 106b can be pulled out or pulled back according to the motion of the infant while applying slight tension to the infant; and, therefore, when the infant moves to thereby pull the two belts 106a and 106b toward the infant, the two belts 106a and 106b are pulled out from the child car seat 101 and, when the two belts 106a and 106b are loosened, they are pulled back automatically. In this manner, the infant is to sit in the child car seat 101 while the infant is loosely restricted by the child car seat 101.

On the other hand, when breaking hard or the like, an emergency-lock type retractor is operated urgently. That is, since the hard breaking causes the infant to incline forward suddenly, the two belts 106a and 106b are pulled suddenly and the length adjusting belt 311 is also going to be pulled suddenly. However, in such case, the emergency-lock type retractor secures the length adjusting belt 311 due to its acceleration action to thereby prevent the length adjusting belt 311 from being pulled out, that is, locks the length adjusting belt 311 in an emergency. As a result of this, the pull-out of the two belts 106a and 106b is restricted and thus the whole body of the infant is held by the stomach member 105 and two belts 106a and 106b, so that the safety of the infant can be secured.

SUMMARY OF THE INVENTION

The present invention aims at eliminating the drawbacks found in the above-mentioned conventional child car seat. Accordingly, it is an object of the invention to provide an emergency-lock type retractor which also allows a parent to lock arbitrarily the belts holding an infant seated in a child car seat, and a child car seat incorporating such emergency-lock type retractor therein.

In attaining the above object, according to the present invention, there is provided an emergency-lock type retractor comprising an emergency lock part which, when a belt wound around a drum is pulled suddenly at a predetermined speed or higher, capable of stopping the rotation of the drum to thereby restrict the pull-out of said belt, the emergency-lock type retractor further including a hand-operated lock part capable of stopping the rotation of the drum by hand.

According to the present structure, not only the originally expected emergency locking is possible, but also the belt can be previously set to a predetermined length by hand to fix an infant, which makes it possible to enhance the easy use of the retractor.

Also, according to the present invention, there is provided an emergency-lock type retractor comprising an emergency lock part which, when a belt wound around a drum is pulled suddenly at a predetermined speed or higher, is capable of securing a securing pawl to a gear rotating integrally with said drum to stop the rotation of the drum to thereby restrict the pull-out of the belt, and a hand-operated lock part which not only allows a user to operate the securing pawl by hand to secure the securing pawl to the gear to thereby stop the rotation of the drum and thus restrict the pull-out and storage of the belt but also allows the user to remove the mutual securing engagement between the securing pawl and gear by hand.

According to the present structure, by making use of a conventional securing pawl which is provided as an emergency locking pawl for locking the belt, the length of the belt can be set to a desired length by hand.

Further, according to the present invention, in an emergency-lock type retractor, there is further included an operation part which, when an operation knob is fixed at a first operation position, allows the user to carry out the mutual securing engagement between the securing pawl and gear by the hand-operated lock part and, when the operation knob is fixed at a second operation position, allows the user to remove the mutual securing engagement between the securing pawl and gear by the hand-operated lock part.

According to the present structure, the hand-operated locking as well as removal of such locking can be carried out according to the fixed position of the operation knob, which makes it easier to operate the retractor.

And, according to the present invention, in an emergency-lock type retractor, there is disposed on the operation knob a lock knob to be energized by a spring, and one end of the lock knob is secured by the energizing force of the spring to a securing hole formed at a predetermined position to thereby carry out the fixation of the operation knob at the first and second operation position.

According to the present structure, by operating the operation knob, the lock knob is automatically secured to the securing hole, which makes it possible to carry out the locking of the belt and removing such locking simply and positively.

Also, according to the present invention, in an emergency-lock type retractor, the hand-operated operation of the securing pawl through the operation part is carried out by means of a flexible wire connecting together the operation part and hand-operated part.

According to the present structure, the operation of the hand-operated lock part can be carried out at an arbitrary position which is distant from the retractor main body and is easiest to operate.

Further, according to the present invention, in an emergency-lock type retractor, the hand-operated operation of the securing pawl is carried out by operating the operation knob directly.

According to the present structure, it is possible to omit a wire for connecting together the operation part and hand-operated lock part, thereby being able to reduce the number of parts required.

And, according to the present invention, there is provided an emergency-lock type retractor comprising an emergency lock part which, when a belt wound around a drum is pulled suddenly at a predetermined speed or higher, is capable of securing a securing pawl to a gear rotating integrally with the drum to thereby stop the rotation of the drum and thus restrict the pull-out of the belt, and a hand-operated lock part which not only allows a user to secure a second securing pawl to be operated by hand to the gear to thereby stop the rotation of the drum and thus restrict the pull-out and storage of the belt but also allows the user to remove the mutual securing engagement between the second securing pawl and gear by hand.

According to the present structure, the hand-operated locking can be carried out separately from the emergency lock part.

Also, according to the present invention, there is provided an emergency-lock type retractor comprising an emergency lock part which, when a belt wound around a drum is pulled suddenly at a predetermined speed or higher, is capable of securing a securing pawl to a gear rotating integrally with the drum to thereby stop the rotation of the drum and thus restrict the pull-out of the belt, and a hand-operated lock mechanism which is capable of pressing against part of the belt to thereby restrict the pull-out and storage of the belt.

According to the present structure, by operating the hand-operated lock mechanism which is disposed separately from the emergency lock part and can be designed freely, the pull-out and take-up of the belt can be locked at an arbitrary position by hand.

Further, according to the present invention, there is provided an emergency-lock type retractor comprising an emergency lock part which, when a belt wound around a drum is pulled suddenly at a predetermined speed or higher, is capable of securing a securing pawl to a gear rotating integrally with the drum to thereby stop the rotation of the drum and thus restrict the pull-out of the belt, and a hand-operated lock mechanism which is capable of securing a belt adjusting metal member connected to the belt to thereby restrict the pull-out and storage of the belt.

According to the present structure, by using the hard metal member with which the belt is to be connected, the pull-out and storage of the belt can be locked, which makes it possible to realize a positive locking operation.

And, according to the present invention, there is provided a retractor comprising a drum around which a seat belt can be wound, a lock member for restricting the rotation of the drum, and an operation member for operating the lock member to thereby switch the same between a locking state and a locking removed state as the need arises.

Also, according to the present invention, there is provided a retractor comprising a drum around which a seat belt can be wound, a lock member for restricting the pull-out and storage of the belt, and an operation member for operating the lock member to thereby switch the same between a locking state and a locking removed state as the need arises.

According to the structures respectively, even when a seat belt does not include an emergency lock part, the pull-out and storage of such seat belt can be locked by hand.

And, according to the present invention, there is provided a child car seat which is provided by an emergency-lock type retractor.

According to the thus structured child car seat, a belt, which holds an infant while a car is running, can be locked urgently as well as the belt can be previously set to a predetermined length and fixed by hand, so that the present child car seat can be made easier to use.

BRIEF DESCRIPTION OF THE DRAWINGS

FIG. 30 is an explanatory view of the operation part shown in FIG. 29; in particular.

FIG. 32 is an explanatory view of the relation between an operation knob and a button according to the first modification of the operation part C employed in the first embodiment of the invention; in particular.

FIG. 33 is an explanatory view of a second modification of the operation part C of a wire type according to the first embodiment of the invention; in particular.

FIG. 33(a) is a partially longitudinal section view of the third modification, showing a state thereof in which it is held at a second operation position, FIG. 33(b) is a partially longitudinal section view thereof, showing a process for moving it to a first operation position, and FIG. 33(c) is an explanatory view of the relation between the first and second operation positions of the third modification;

FIG. 35 is an explanatory view of a fourth modification of the operation part C of a wire type according to the first embodiment of the invention; in particular.

FIG. 37 is an explanatory view of the modification shown in FIG. 36; in particular.

FIG. 39 is an explanatory view of the modification shown in FIG. 38; in particular.

FIG. 40 is an explanatory view of the modification shown in FIG. 38; in particular.

FIG. 41 is an explanatory view of a seventh modification of the operation part C of a wire type according to the first embodiment of the invention; in particular.

FIG. 42 is an explanatory view of an eighth modification of the operation part C of a wire type according to the first embodiment of the invention; in particular.

FIG. 43 is an explanatory view of a ninth modification of the operation part C of a wire type according to the first embodiment of the invention; in particular.

DETAILED DESCRIPTION OF PREFERRED EMBODIMENTS

Next, description will be predetermined below of the preferred embodiments of a retractor including a hand-operated lock mechanism and a child car seat incorporating the present retractor therein according to the invention with reference to the accompanying drawings.

First Embodiment

Figure 44:
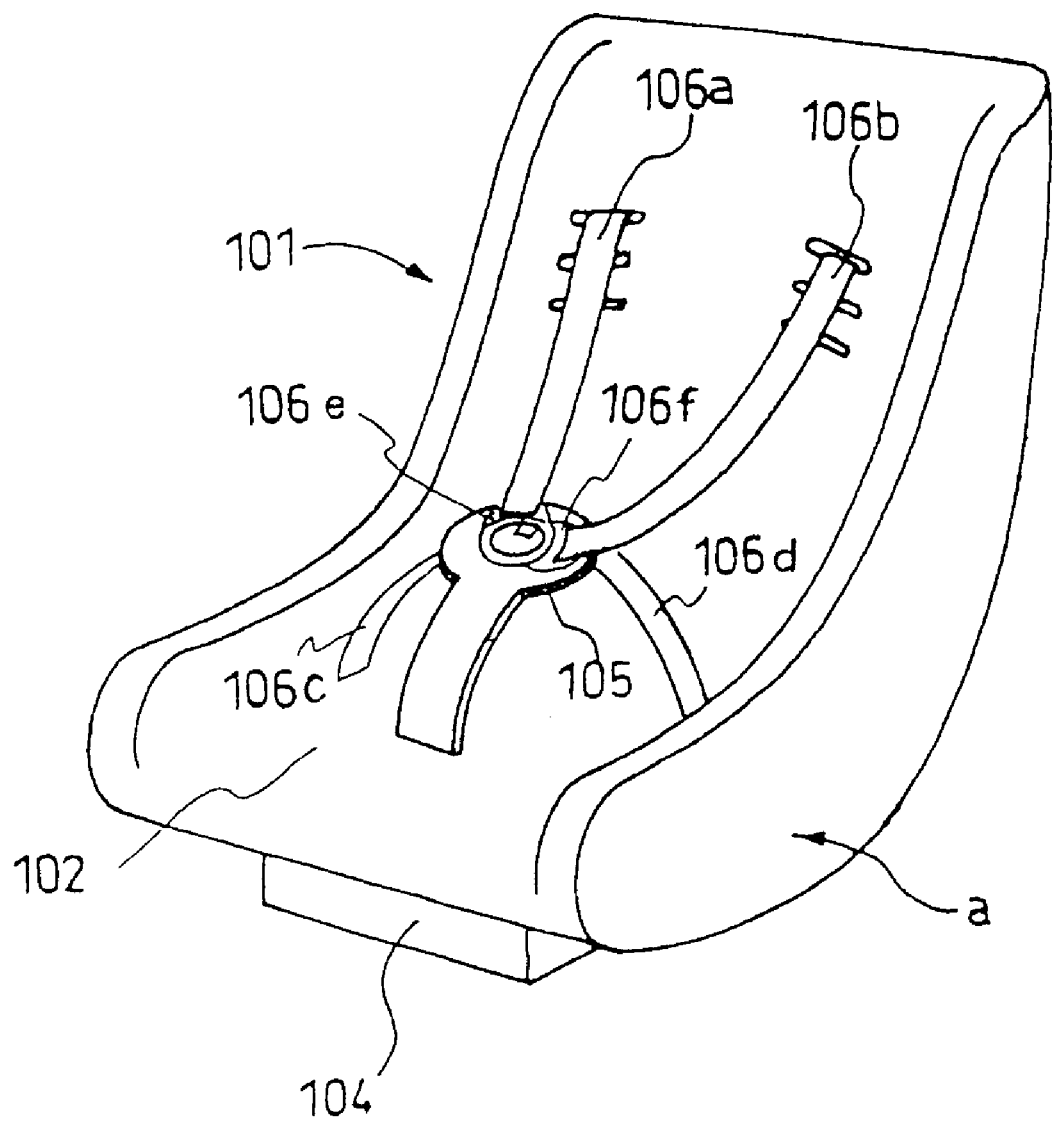
FIG. 44 is a perspective view of the front surface side of a conventional child car seat; and, FIG. 45 is a perspective view of the back surface side of the conventional child car seat.
Figure 45:
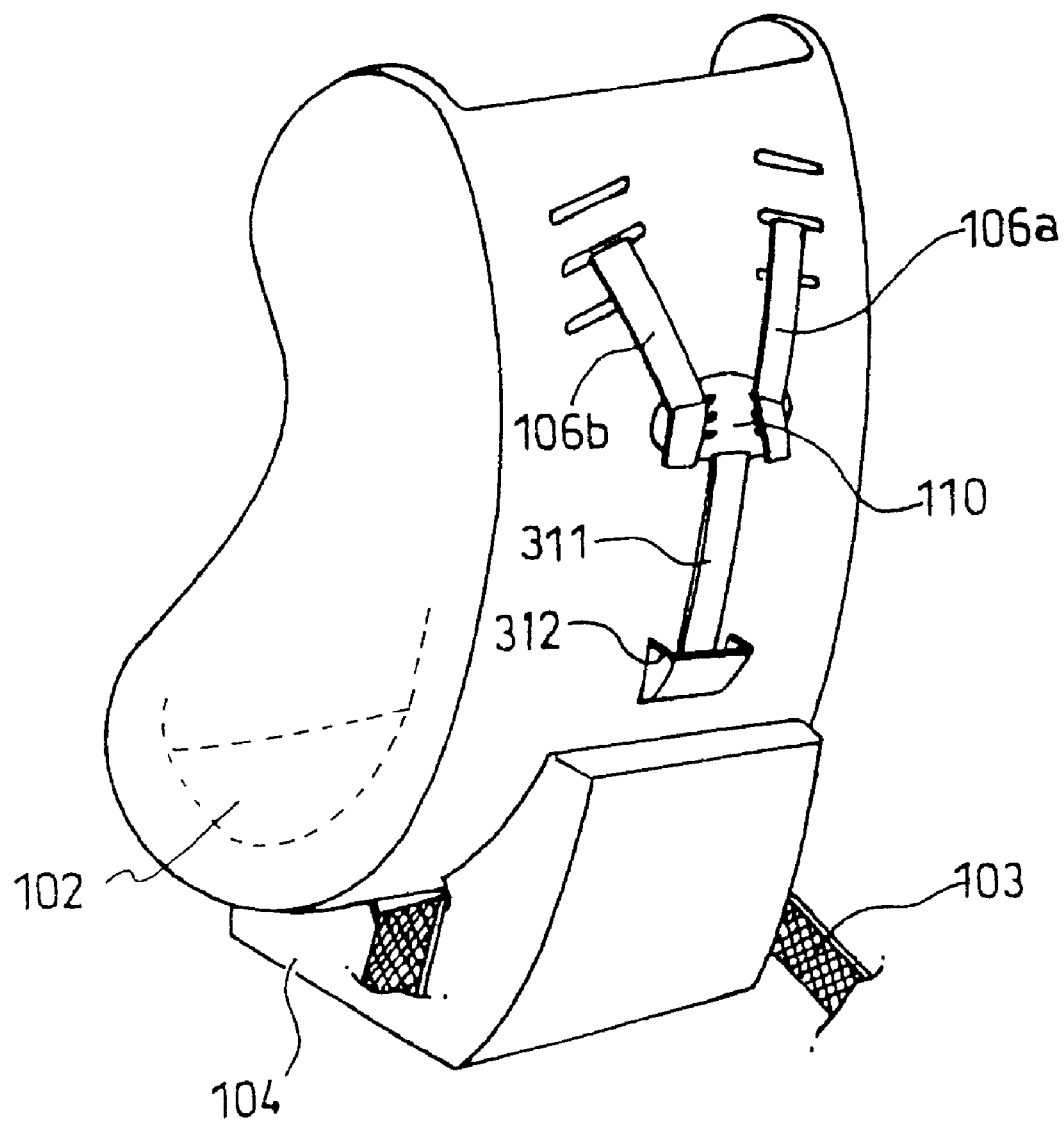

By the way, FIGS. 1 to 6 respectively show a first embodiment of a retractor according to the invention and, in the description of the present embodiment, there is properly employed the description of the child car seat shown in FIGS. 44 and 45.

Figure 1:
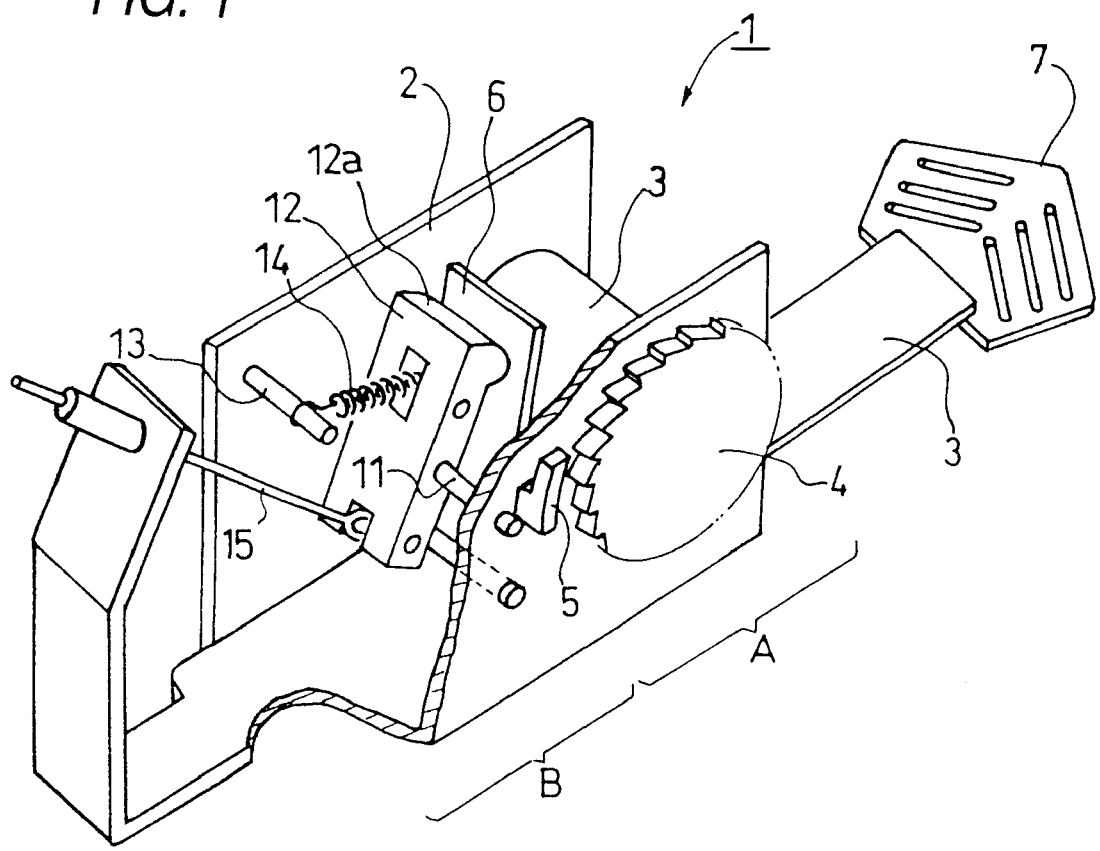
FIG. 1 is a perspective view of a retractor according to a first embodiment of the invention.
Figure 2:
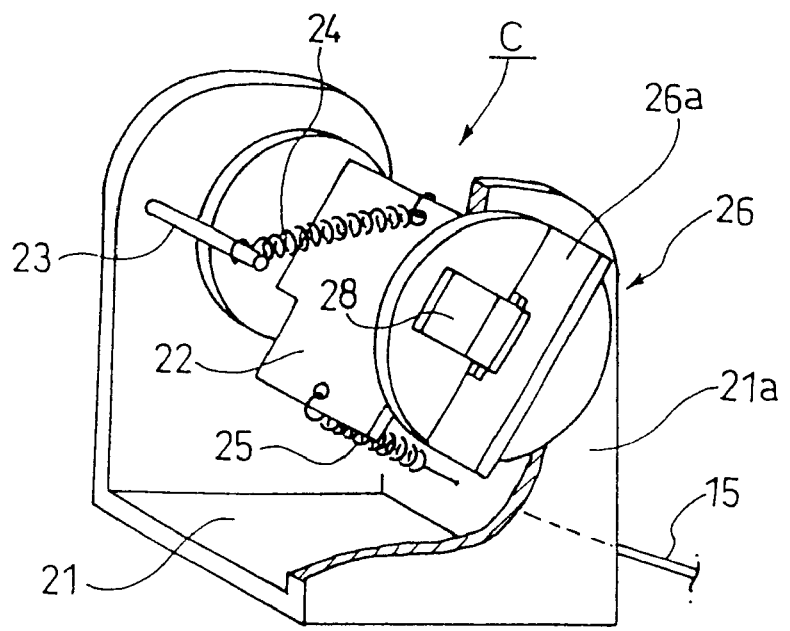
FIG. 2 is a perspective view of a structure of an operation part employed in the first embodiment.

Now, a retractor 1 including a hand-operated lock mechanism according to the invention is structured such that a hand-operated lock mechanism is added to a conventional retractor including an emergency lock mechanism. The retractor 1 according to the first embodiment of the invention is mainly composed of an emergency lock part A, a hand-operated lock part B (both of which are shown in FIG. 1), and an operation part C (FIG. 2). Among them, the emergency lock part A and hand-operated lock part B are disposed in the inside of a frame body 2 which is so formed as to have a U-shaped section in FIG. 1; a wire 15 is pulled out from the emergency lock part A and hand-operated lock part B; and, as shown in FIG. 2, the wire 15 is operated by the operation part C at a position distant from the emergency lock part A and hand-operated lock part B.

At first, description will be predetermined below of the emergency lock part A. In FIG. 1, the emergency lock part A includes a length adjusting belt 3, a drum for taking up and playing out the length adjusting belt 3 (however, the drum cannot be seen in FIG. 1, because the length adjusting belt 3 is wound around the drum), a gear 4 which can be rotated integrally with the drum, and a securing pawl 5 to be securingly engaged with the gear 4.

By the way, the emergency lock part A itself corresponds to the previously described conventional emergency lock mechanism. Therefore, the length adjusting belt 3 also corresponds to the length adjusting belt 311 (FIG. 45) that has been previously discussed herein relating to the conventional retractor, and a belt adjusting metal member 7 fixed to the leading end of the length adjusting belt 3 similarly corresponds to the previously described belt adjusting metal member 110 (FIG. 45).

When the length adjusting belt 3 is pulled suddenly due to a collision or hard braking, the securing pawl 5 of the emergency lock part A is secured to the gear 4 due to an acceleration generated by the collision or hard braking, thereby locking the pull-out of the length adjusting belt 3. For the structure of the emergency lock part, there are available various structures and, since they are already well known, the further detailed description thereof is omitted here.

Now, the hand-operated lock part B is the lock part that is newly provided by the invention.

The present hand-operated lock part B is composed of a rotary plate 12 disposed such that it can be freely rotated about a shaft 11, a spring 14 having one end fixed to a shaft 13 for pulling the rotary plate 12 all the time, a wire 15 for pulling the rotary plate 12 against the spring 14, and a drive plate 6 which is formed integrally with the securing pawl 5 securingly engageable with the gear 4 and can be rotated by the rotary plate 12.

In this structure, if the wire 15 is pulled, then the rotary plate 12 is rotated about the shaft 11 to thereby push against the drive plate 6, so that the securing pawl 5 rotatable integrally with the drive plate 6 is rotated in the direction of the gear 4 and is thereby securingly engaged with the gear 4. As a result of this, the rotation of the drum is locked and thus the pull-out of the length adjusting belt 3 is restricted.

The operation part C shown in FIG. 2 is also a part that is provided according to the invention, and the operation part C is used to pull the wire 15 shown in FIG. 1.

In FIG. 2, the operation part C is composed of a U-shaped frame body 21, a rotary plate 22 which is rotatably mounted on the frame body 21, a spring 24 having one end fixed to a shaft 23 for pulling one end of the rotary plate 22 all the time, a spring 25 connected between the wire 15 and rotary plate 22, and an operation knob 26.

The operation knob 26 includes a knob 26a for operating or rotating the rotary plate 22, and a disk portion 26b; and, on a bearing portion 27 formed in the corner portion between the knob 26a and disk portion 26b, there is rotatably mounted a lock knob 28. The lock knob 28 is used not only to lock the operation knob 26 to thereby disable the operation knob 26 from rotating but also to remove such locking to thereby enable the operation knob 26 to rotate.

Figure 3:
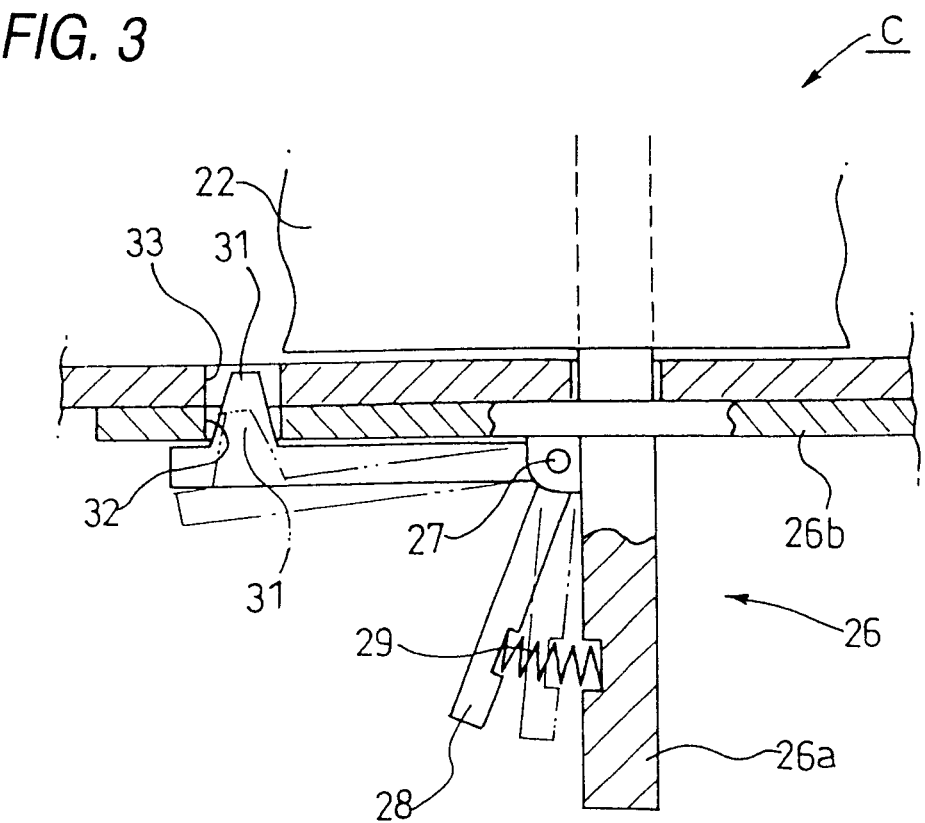
FIG. 3 is a section view of the main portion of the operation part, showing the structure thereof.

The lock knob 28, as shown in FIGS. 2 and 3, is made of a plate-like body by forming it into a hook-like shape; and, the two ends of the bent portion of the lock knob 28 are rotatably mounted on the bearing portion 27. Between the knob 26a and one end of the lock knob 28, there is interposed a spring 29 which always energizes the whole of the lock knob 28 clockwise in FIG. 3. Also, on the other end of the lock knob 28, there is disposed a securing projection 31.

On the other hand, although not shown in FIG. 2, in the disk portion 26b, there is formed a securing hole 32 and, in the wall portion 21a of the frame body 21 on this side as well, there is formed a securing hole 33. However, actually, the securing hole 33 is formed at two positions at a predetermined distance on a locus where the securing projection 31 rotates. The reason why this structure is employed is to lock the rotation position of the rotary plate 22 at two kinds of angles; and, this structure functions as a hand-operated lock mechanism which will be described later in detail.

Figure 4:
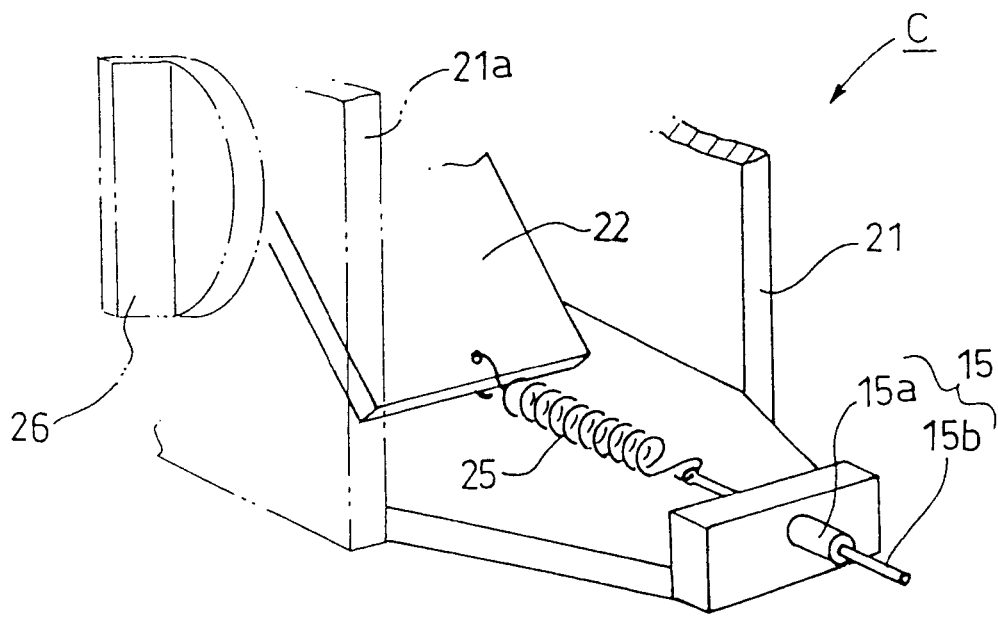
FIG. 4 is a perspective view of the main portion of the operation part, showing the structure thereof.

Now, FIG. 4 is an enlarged view of a specific example of a connecting structure which is used to connect together the spring 25 and wire 15 respectively shown in FIG. 2. Both of FIGS. 2 and 4 show that the wire 15 can be pulled by rotating the operation knob 26. The wire 15 may be of the same kind that is used for the brakes of a bicycle and the like. That is, the wire 15 is composed of a flexible cover 15a and a steel wire 15b inserted into the cover 15a and, even when the wire 15 is flexed and deflected, the steel wire 15b can be pulled. And, because one end of the rotary plate 12 shown in FIG. 1 is connected to the operation part C by the wire 15, even if the operation part C is distant from the hand-operated lock part B, the hand-operated lock part B can be operated in the operation part C.

Next, description will be predetermined below of the operation of the whole of the retractor 1 according to the invention.

By the way, since the retractor 1 is to be applied to a child car seat, in the following description, there is employed properly the child car seat 101 which has been previously shown in the description of the related prior art. Parts of the retractor 1 that are shown in FIG. 1, that is, the emergency lock part A and hand-operated lock part B are buried in the seat portion 102 of the child car seat 101, while the length adjusting belt 3 is pulled out from the pull-out opening 312. And, while the operation part C is also mounted in the inside of the seat 102, because the wire 15 is flexible as discussed before, the operation knob 26 is mounted at a position which can be operated from the outside, for example, on the side surface a of the seat portion 102 or the like.

It is now assumed that, as described before, an infant is seated in the child car seat 101 and the belts 106a, 106b are applied to the infant. In this state, for example, a parent inserts his or her fingers between the body of the infant and the belts 106a, 106b to adjust the condition of pull-out of the belts 106a, 106b in such a manner that the infant is able to move to a certain degree but is prevented from slipping out of the belts 106a, 106b. And, the lock knob 28 disposed on the operation knob 26 is pulled toward the knob 26a side against the spring 29 to thereby remove the securing projection 31 from the securing hole 33. That is, the two belts 106a, 106b are operated in such a manner that they are moved from the state shown by a solid line in FIG. 3 to the state shown by an imaginary line in FIG. 3, thereby removing the locking of the operation knob 26.

Next, if the lock knob 28 is released from the fingers of the parent and the operation knob 26 is rotated in a predetermined direction, since the lock knob 28 is always energized by the spring 29, the securing projection 31 is automatically locked to the other securing hole 33 at a position where the securing hole 33 is formed.

If the operation knob 26 is rotated in this manner, then the rotary plate 22 is also rotated integrally with the operation knob 26 against the spring 24. Due to the rotation of the rotary plate 22, the wire 15 is pulled through the spring 25. Here, since the spring 25 always energizes the wire 15 in the pulling direction in the locked state, the rotary plate 12 can be held in such a manner that the rotary plate 12 is pressed against the drive plate 6, and thus the securing pawl 5 can be held in such a manner that the securing pawl 5 is pressed against the gear 4.

On the other hand, if the wire 15 is pulled in the operation part C, then the rotary plate 12 shown in FIG. 1 is rotated against the energizing force of the spring 14. And, a projection 12a, which is provided on the upper end of the rotary plate 12, is pressed against the upper end of the drive plate 6 to thereby rotate the drive plate 6.

Because the drive plate 6 and securing pawl 5 are connected integrally with each other, when the drive plate 6 is rotated, then the securing pawl 5 is also rotated in the same direction, that is, in the direction of the gear 4 and is thereby caused to come into meshing engagement with the gear 4. At the then time, due to the operation of the spring 25 of the operation part C, there can be held a state that the securing pawl 5 is always engaged against the gear 4. Therefore, the gear 4 and the drum connected integrally with the gear are restricted in the rotation thereof, which in turn restricts the pull-out and take-up of the length adjusting belt 3.

Referring to this state in connection with the infant, it can be well said that the degree of tightening of the belts 106a and 106b holding the infant, that is, the degree of loosening thereof is set constant. Therefore, in this state, although the infant is able to move in the range that has been adjusted by the parent, but the infant is not allowed to move so greatly that the infant can slip out of the belts 106a and 106b. That is, the parent is allowed to drive the car at rest.

Also, in this state, assuming that the car is caused to stop suddenly due to hard braking or a collision accident, in a normal case, the length adjusting belt 3 is pulled suddenly through the belts 106a and 106b to thereby actuate an acceleration sensor, so that the emergency lock part A is operated to thereby prevent the length adjusting belt 3 from being pulled out. However, since the infant is already restricted by using the retractor 1 according to the present embodiment, the securing pawl 5 is in meshing engagement with the gear 4 and thus the emergency lock part A is also already in operation. Therefore, although the emergency lock part A does not function as the originally set emergency lock part A, the pull-out of the length adjusting belt 3 is properly restricted, so that the infant can be similarly protected, that is, no problem will occur.

In this manner, according to the invention, by adding the hand-operated lock mechanism to the retractor including the emergency lock mechanism, not only the infant can be prevented from slipping out of the child car seat in a normal state, but also the infant can be protected in safe in an emergency.

Also, when the hand-operated lock part B is not in operation, when the car is caused to stop suddenly due to hard braking or a collision accident, then the emergency lock part A is allowed to carry out its originally set emergency lock operation. Thus, according to the present invention, a parent is able to select one of the two operations according to cases.

Further, as the hand-operated locking condition according to the present embodiment cannot be removed unless the lock knob 28 is pulled again against the spring 29, a driver is allowed to drive a car without worrying about the slip-out of the infant.

Next, description will be predetermined below of another structure of the operation part C with reference to FIGS. 5 and 6.

An operation part 35 according to the present structure comprises a frame body 36, an operation knob 37 which is disposed in such a manner that it is free to move laterally along the longitudinal direction of the frame body 36, a lock knob 38 disposed on the operation knob 37, and the like; and, the wire 15 is connected to one end of the operation knob 37 through a spring 39.

On the two ends of the operation knob 37, there are respectively provided two guide projections 37a (however, in FIG. 5, only one of them is shown), while the two guide projections 37a are respectively inserted into their associated guide holes 36b which are respectively so formed in the two side wall portions 36a of the frame body 36 as to extend in the longitudinal direction of the frame body 36. Also, on the wall portion 36a, there is disposed a pin 41. And, one end of a spring 42 is fixed to the pin 41, whereas the other end of the spring 42 is secured to the leading end of the guide projection 37a. Therefore, the operation knob 37 is always energized in the right direction in FIG. 5 by the spring 42.

The lock knob 38 is formed in an L shape when it is viewed from the side surface thereof, and is rotatably mounted on the corner portion of the operation knob 37. And, the lock knob 38 is always energized counterclockwise in FIGS. 5 and 6 by a spring 43 which is interposed between the operation knob 37 and lock knob 38. On the lower portion of the leading end of the lock knob 38, there is provided a securing projection 38a and, on the other hand, in the bottom portion of the frame body 36, there are formed securing holes 44a and 44b at a predetermined distance; that is, the securing projection 38a of the lock knob 38 can be secured to either of the securing holes 44a and 44b of the frame body 36 according to cases.

Next, description will be predetermined below of the operation of the thus structured operation part 35.

Figure 6:
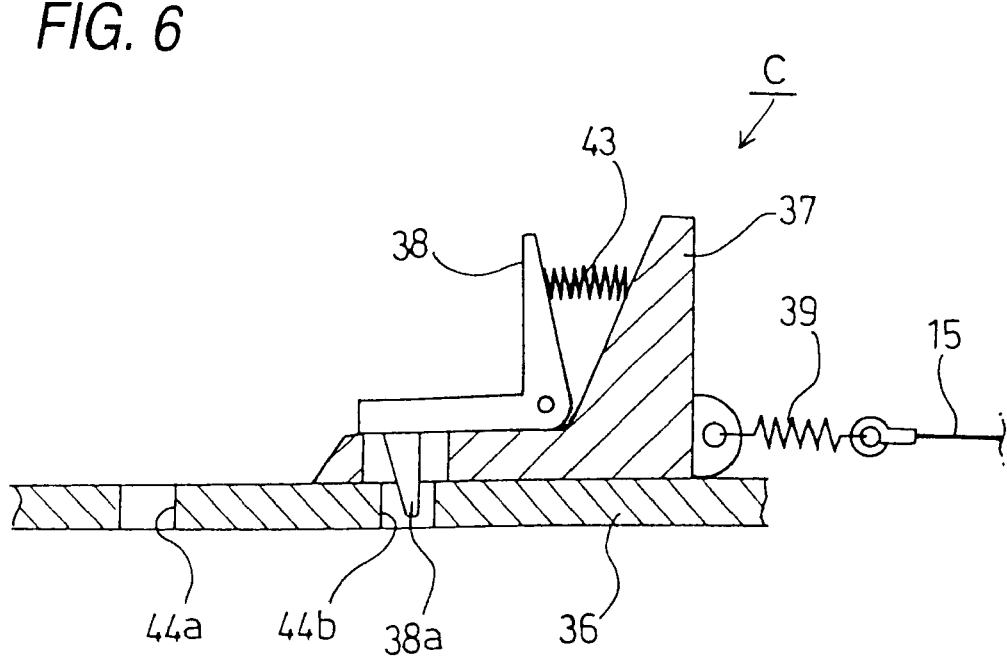
FIG. 6 is a section view of the main portion of the operation part shown in FIG. 5, showing the structure thereof.

As shown in FIG. 6, when the securing projection 38*a* is secured to the right securing hole 44, the wire 15 is not pulled, nor is rotated the rotary plate 12 shown in FIG. 1. Therefore, the securing pawl 5 is not securingly engaged with the gear 4. In this case, the emergency lock part A is held in a state that it is allowed to carry out its originally set emergency lock operation.

On the other hand, when the lock knob 38 is pressed in the direction of the operation knob 37 against the spring 43, then the securing projection 38*a* is removed from the securing hole 44*b*, so that the whole of the operation knob 37 can be moved. Accordingly, when the operation knob 37 is moved in the direction of arrow lines shown in FIGS. 5 and 6 (in FIGS. 5 and 6, in the left direction), then the securing projection 38*a* is automatically fitted into the securing hole 44*a* because the securing projection 38*a* is energized by the spring 43.

In this manner, by moving the operation knob 37, the wire 15 is pulled through the spring 39, the lower end of the rotary plate 12 shown in FIG. 1 is pulled in a similar manner to the above-mentioned case, and the securing pawl 5 is securingly engaged with the gear 4. And, due to the fact that the securing projection 38*a* is secured to the securing hole 44*a*, the rotary plate 12 is pulled to thereby continue to press the upper end of the drive plate 6 similarly to the above-mentioned case and, in linking with this, the securing pawl 5 continues to be in meshing engagement with the gear 4.

Therefore, since the infant can be restricted in such a state as has been previously set by the parent in a similar manner to the above-mentioned case, not only the infant can be prevented from slipping out of the child car seat in a normal state, but also, similarly to the conventional retractor, the infant can be prevented against danger even in an accident caused by a sudden stop of the car.

Second Embodiment

Next, description will be predetermined below of a second embodiment of a retractor according to the invention with reference to FIGS. 7 and 8.

By the way, the present embodiment is different from the previously described first embodiment in that the emergency lock part A and hand-operated lock part B are formed integrally with the operation part C, whereas they are arranged separately from each other in the first embodiment. Therefore, in the present embodiment, parts capable of exhibiting similar functions to those in the first embodiment are predetermined the same designations and thus the description thereof is omitted here.

In a retractor 1 according to the present embodiment, a frame body 21 forming an operation part C is formed integrally with the outside of a frame body 2. And, a rotary plate 12 is fixed to the leading end of a shaft 22*a* rotatable integrally with a rotary plate 22 which is disposed in the operation part C. In the present embodiment, there is omitted the wire 15 which is connected to the rotary plate 12 in the first embodiment, and the rotary plate 12 is directly rotated by operating or rotating an operation knob 26.

By the way, the operation knob 26 and lock knob 28 respectively disposed in the operation part C may be similar in structure and the like to those in the previously described first embodiment.

According to the retractor 1 of the present embodiment, when the operation knob 26 is operated or rotated to thereby lock a length adjusting belt 3 in a similar manner to the first embodiment, then the rotary plate 12 directly presses against the upper end of a drive plate 6 to thereby bring a securing pawl 5 into meshing engagement with a gear 4, so that the pull-out and storage of the length adjusting belt 3 can be restricted. Thanks to this, parts such as the wire 15 and the like can be omitted.

Also, in the present embodiment as well, similarly to the first embodiment, when the parent adjusts manually the belts 106*a* and 106*b* for restricting the infant and also operates manually the operation knob 26 to thereby lock the length adjusting belt 3, then, not only the infant can be prevented from slipping out of the child car seat in a normal state, but also, similarly to the conventional retractor, the infant can be prevented against danger even in an accident caused by a sudden stop of the car. Also, unless the parent or driver operates the lock knob 28 by hand to thereby operate or rotate the operation knob 26, the slip-out of the infant can be prevented; so that the driver is allowed to drive the car without worrying about the danger of the slip-out of the infant.

Third Embodiment

Figure 9:
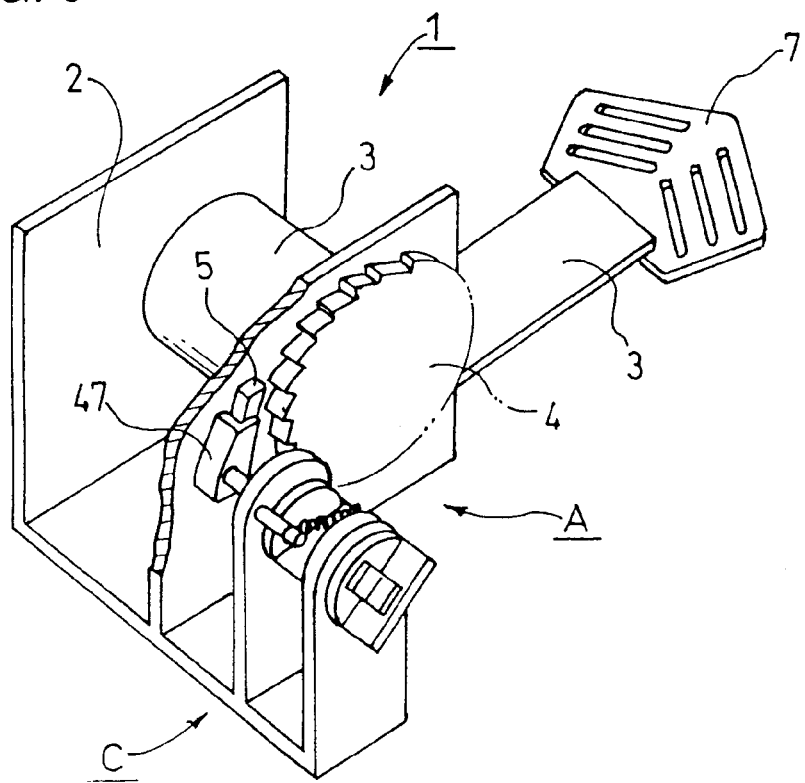
FIG. 9 is a perspective view of a retractor according to a third embodiment of the invention.
Figure 10:
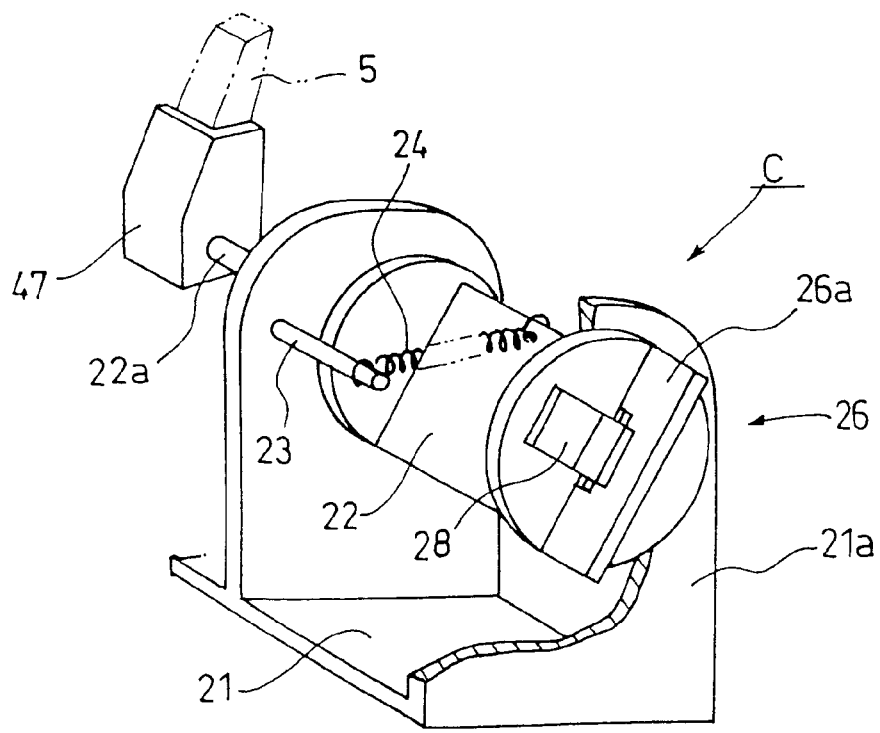
FIG. 10 is a perspective view of a structure of an operation part employed in the third embodiment.

Next, description will be predetermined below of a third embodiment of a retractor according to the invention with reference to FIGS. 9 and 10.

The present embodiment is structured in such a manner that, by operating the operation part C, the securing pawl 5 can be brought into direct meshing engagement with the gear 4. In the present embodiment, parts capable of exhibiting similar functions as those employed in the previously described first and second embodiments are predetermined the same designations and thus the description thereof is omitted here.

Figure 7:
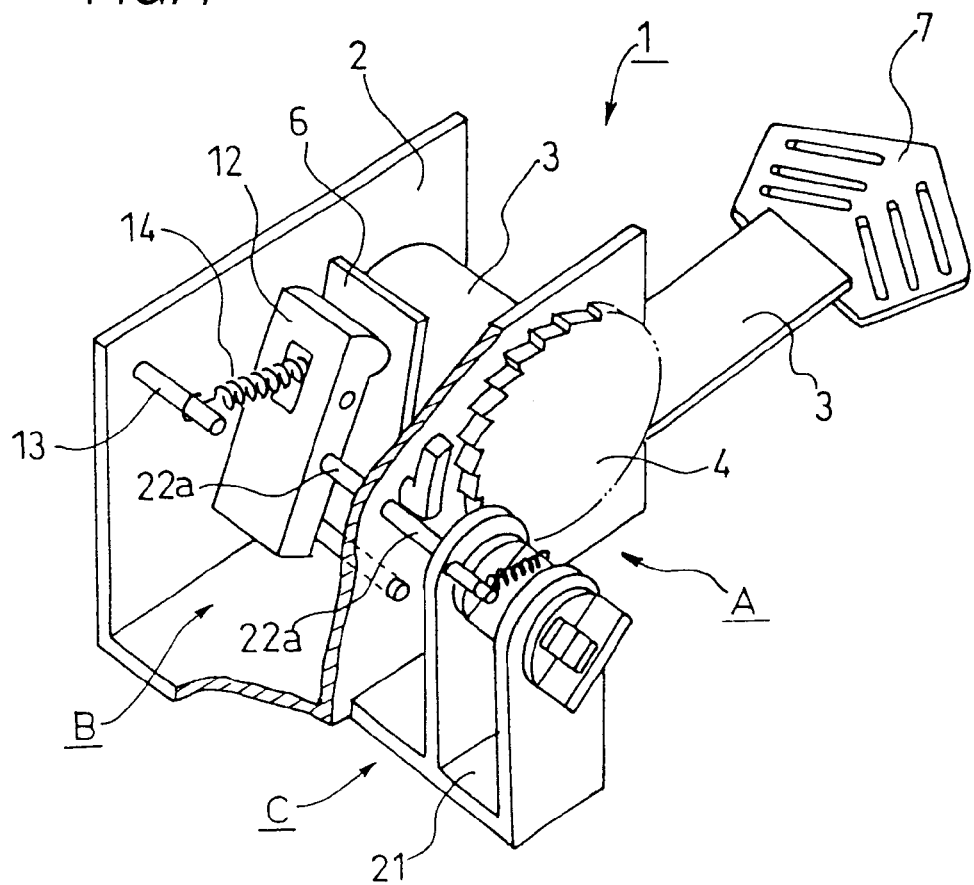
FIG. 7 is a perspective view of a retractor according to a second embodiment of the invention.
Figure 8:
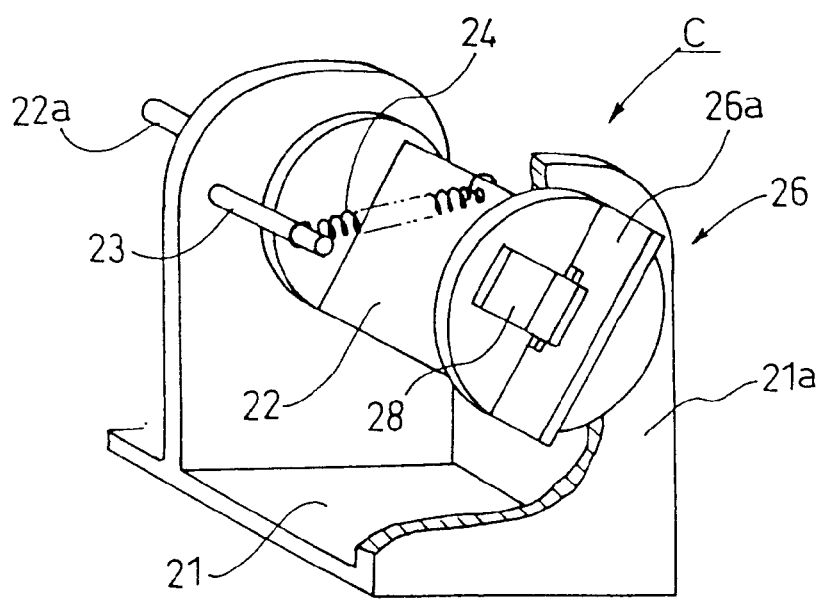
FIG. 8 is a perspective view of a structure of an operation part employed in the second embodiment.

That is, in the reactor 1 according to the present embodiment, there are not used the drive plate 6, rotary plate 12, spring 14, wire 15 and the like which are shown in FIGS. 1 and 7, but, similarly to the second embodiment, the frame body 2 is formed integrally with the frame body 21 which forms the operation part C. And, on the leading end of a shaft 22*a* which can be rotated integrally with a rotary plate 22 forming the operation part C, there is disposed a pressure member 47. The pressure member 47 has an L-shaped section so that it can be contacted with the two side surfaces of the securing pawl 5. When the pressure member 47 is rotated, then the pressure member 47 presses against the securing pawl 5 to thereby be able to bring the securing pawl 5 into meshing engagement with the gear 4. Therefore the pressure member 47 can also be regarded as the hand-operated lock part B.

By the way, the operation knob 26, lock knob 28 and the like respectively disposed in the present operation part C are quite the same in structure and operation as those that have been previously described in the first and second embodiments.

The present retractor 1 is buried into the seat part of the a child car seat and the operation knob 26 is located on the outside of the child car seat so that the operation knob 26 can be operated outside. And, after the parent sets the gap between the body of the infant and belts properly, when the parent operates the operation part C similarly to the above-mentioned embodiments, then the pressure member 47 is allowed to press against the securing pawl 5 in the direction of the gear 4, so that the securing pawl 5 can be brought into meshing engagement with the gear 4. As a result of this, the gear 4 and thus the drum is caused to stop, which makes it impossible to pull out or store the length adjusting belt 3 any further: that is, the degree of adjustment of the infant restricting belts set by the parent is maintained to thereby be able to prevent the infant from slipping out of the infant restricting belts. Also, in this state, even if the car is stopped suddenly or an accident occurs, since the length adjusting belt 3 is already locked, the infant is held in a state that the infant is protected. Further, when this hand-operated locking operation is not executed, the originally set emergency locking operation is possible and, therefore, the retractor 1 can be made a multi-function device so that the easiness of the use of the child car seat can be enhanced.

Fourth Embodiment

Next, description will be predetermined below of a fourth embodiment of a retractor according to the invention with reference to FIGS. 11 and 12.

In the present embodiment, an operation knob forming the operation part C is formed integrally with the frame body 2 which forms the emergency lock part A. And, parts capable of exhibiting similar functions at those employed in the previously described respective embodiments are predetermined the same designations and thus the description thereof is omitted here.

Figure 11:
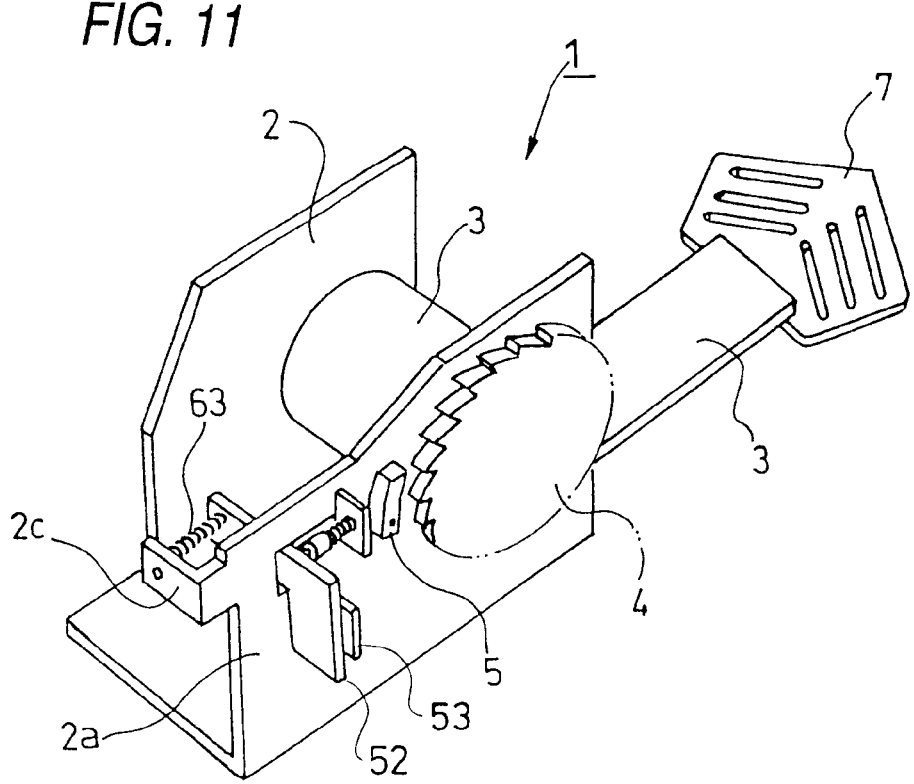
FIG. 11 is a perspective view of a retractor according to a fourth embodiment of the invention.
Figure 12:
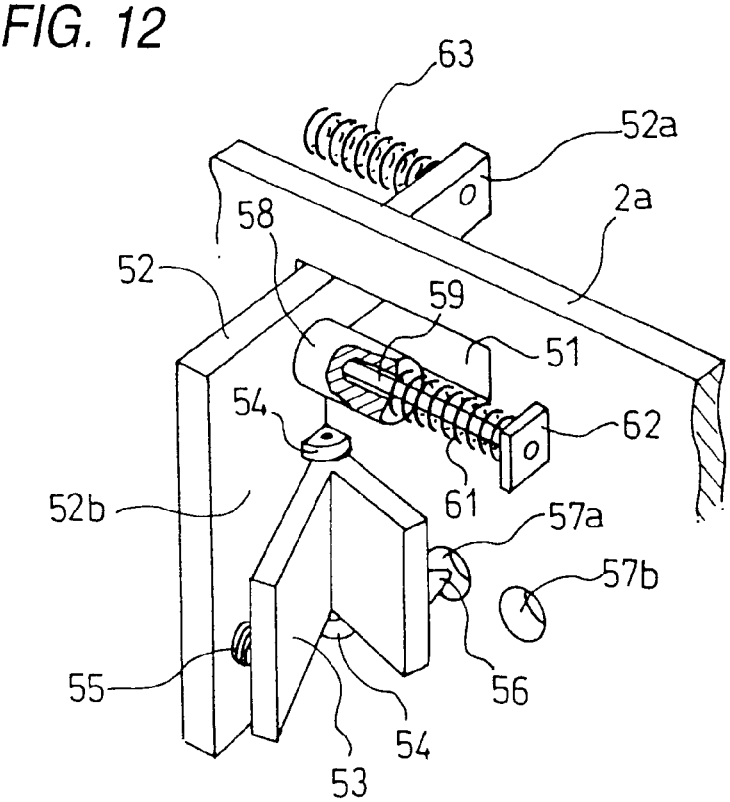
FIG. 12 is a perspective view of a structure of an operation part employed in the fourth embodiment.

As shown in FIGS. 11 and 12, in one wall portion 2a which forms the frame body 2, there is formed a guide hole 51 which extends long in the transverse direction of the wall portion 2a. And, through the guide hole 51, there is inserted a guide portion 52a forming part of an operation member 52 which has an L-like shape when viewed form the side Surface thereof, while a lock knob 53 is mounted on the side surface of a knob, portion 52b having a large width in such a manner that the lock knob 53 can be rotated by a bearing portion 54. The lock knob 53 is always energized in one direction by a spring 55 so that a securing projection 56 provided on the other end of the lock knob 53 can be secured to one of two securing holes 57a and 57b which are formed in the wall portion 52a at a predetermined distance.

On the other hand, to the side surface of the knob portion 52b, there is fixed a pipe-shaped guide member 58 in such a manner that the guide member 58 stands erect on the, knob portion 52b side surface; and, in the inside of the guide member 58, there is disposed a guide rod 59 in such a manner that it is free to reciprocate. The guide rod 59 extends through the inside of a spring 61 and, to the leading end of the guide rod 59, there is, fixed a pressure member 62 which is used to energize the securing pawl 5.

And, part of the rear end portion of the wall portion 2a is bent to thereby form a spring support portion 2c, and the other end of a spring 63 with one and thereof fixed to the spring support portion 2c is secured to one end of the guide portion 52a, whereby the whole of the operation member 52 is always pulled backwardly, that is, in FIG. 4, in a direction where the operation member 52 is moved away from the gear 4.

In the present retractor 1, when the hand-operated locking operation is not carried out, the whole of the operation member 52, as shown in FIG. 11, is pulled by the spring 63 to the rear end side of the guide hole 51; and, the securing projection 56, as shown in FIG. 12, is secured to the securing hole 57a. In this state, the locking of the hand-operated length adjusting belt 3 is not executed but the emergency lock part A performs a similar operation to the conventional retractor in an emergency, for example, when the car is caused to stop suddenly.

On the other hand, when the hand-operated locking operation is to be carried out, the lock knob 53, is pulled against the spring 55 to thereby remove the secured condition between the securing projection 56 and securing hole 57a, and further the whole of the operation member 52 is pressed and moved in the gear 4 direction against the spring 63. In this operation, since the guide portion 52a of the operation member 52 is guided by the guide hole 51, the operation member 52 is able to move forward without vibrating up and down. And, when the securing projection 56 is pressed and moved up to the neighborhood of a position corresponding to the securing hole 57b, then the pressure member 62 begins to press against the securing pawl 5 and, at a position where the securing projection 56 is secured to the securing hole 57b, the securing pawl 5 is meshingly engaged with the gear 4.

And, the securing projection 56 is secured to the securing hole 57b to thereby restrict the rotation of the gear 4, that is, the pull-out and storage of the length adjusting belt 3, so that the degree of the belt adjustment previously set by the parent can be maintained. This hand-operated locking state will continue unless the lock knob 53 is pulled again by hand against the spring 55; that is, the parent is able to drive on while maintaining the infant unslippable state.

Fifth Embodiment

Figure 13:
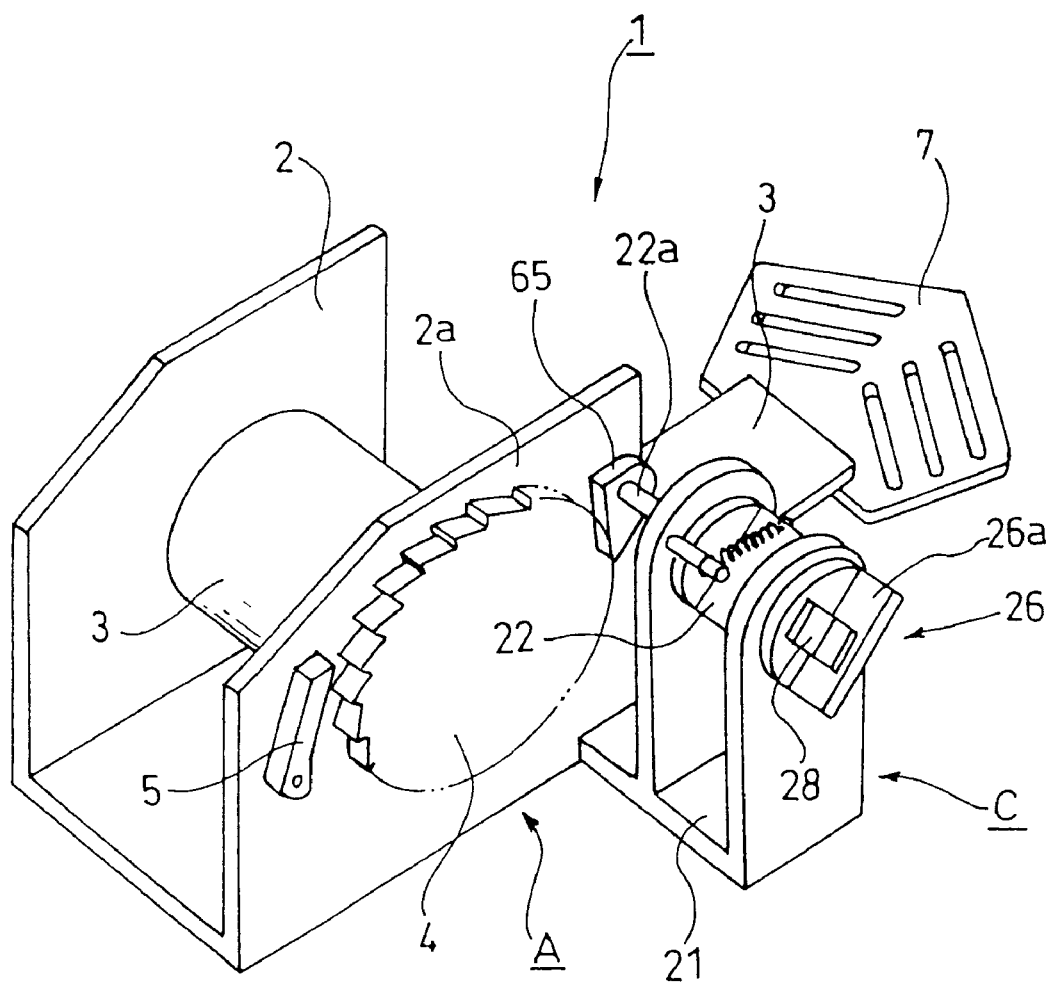
FIG. 13 is a perspective view of a retractor according to a fifth embodiment of the invention.

Next, description will be predetermined below of a fifth embodiment of a retractor according to the invention with reference to FIG. 13.

The present embodiment is structured such that the hand-operated locking can be set without using the securing pawl 5 which is used for emergency locking in the conventional retractor. In the present embodiment, parts capable of exhibiting similar functions to those employed in the previously described embodiments are predetermined the same designations and thus the description thereof is omitted here. That is, in the retractor 1 according to the present embodiment, the frame body 2 is formed integrally with a frame body 21 forming the operation part C and, on the leading and of a shaft 22a which forms the operation part C, there is disposed a securing pawl 65 which is used to execute a hand-operated locking operation. The operation knob 26 and lock knob 28 respectively disposed in the operation part C may be similar in structure and operation to those employed in the previously described respective embodiments.

According to the present structure, after a parent sets the length of the length adjusting belt 3 in such a manner that an infant seated in a child car seat is allowed to move but is prevented from slipping out from the infant restricting belts of the child car seat, the operation knob 26 may be operated similarly to the previous embodiments. And, when the shaft 22a is rotated, then the securing pawl 65 is meshingly engaged with the gear 4, so that, regardless of the securing pawl 5, the rotation of the gear 4 can be restricted and thus the length adjusting belt 3 can be locked.

In the present embodiment as well, there can be obtained similar effects to the previously described respective embodiments.

Sixth Embodiment

Figure 14:
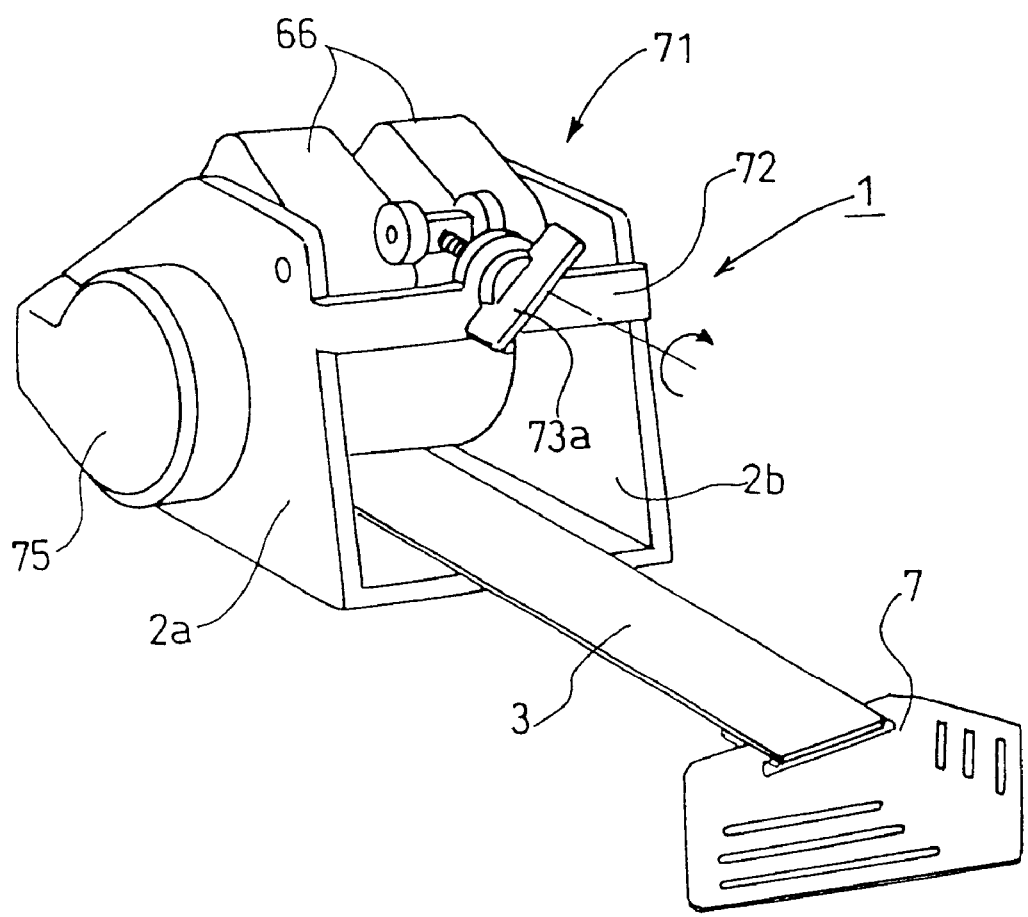
FIG. 14 is a perspective view of a retractor according to a sixth embodiment of the invention.
Figure 15:
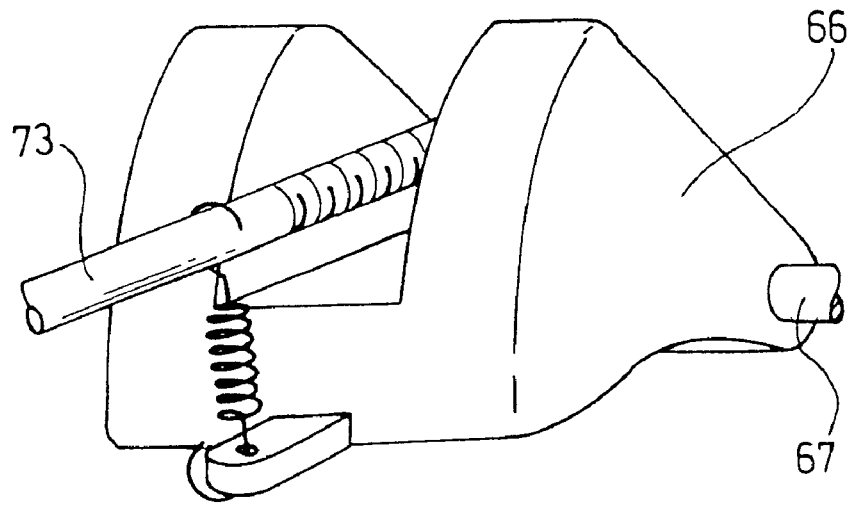
FIG. 15 is a section view of the structure of the retractor shown in FIG. 14.
Figure 15:
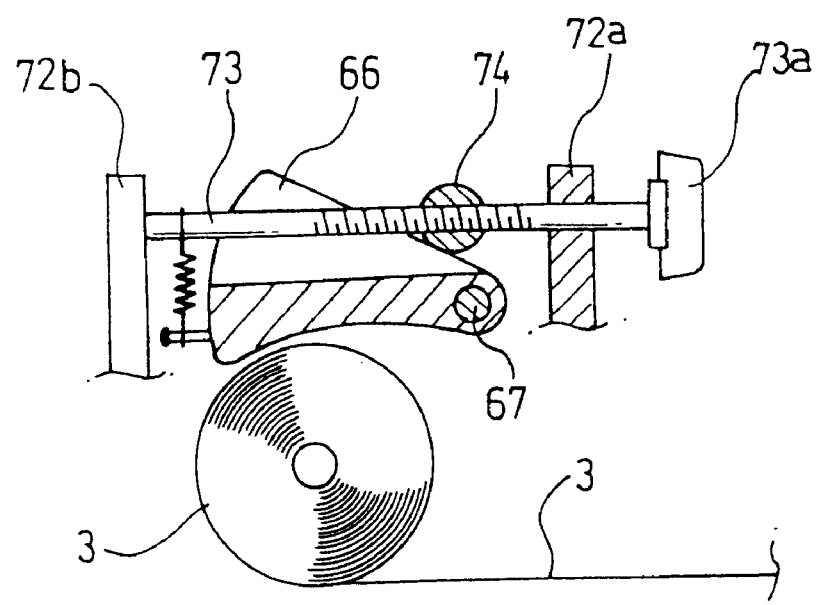

Next, description will be predetermined below of a sixth embodiment of a retractor according to the invention with reference to FIGS. 14 and 15.

In the present embodiment, the length adjusting belt 3 is directly locked regardless of a securing pawl and the like. In these FIGS. 14 and 15, the illustration of the above-mentioned securing pawl and gear is omitted and also parts capable of exhibiting similar functions to those employed in the previously described embodiments are predetermined the same designations and thus the description thereof is omitted here.

In the retractor 1 to the present embodiment, between the mutually opposing wall portions 2a and 2b, there is interposed a pressure member 66 in such a manner that it can be freely rotated. The present pressure member 66 has two side surfaces each of which is formed in an substantially triangular shape; and, the base portion of the pressure member 66 is rotatably mounted on the two wall portions 2a and 2b through a shaft 67. Also, between the leading end side of the pressure member 66 and a screw shaft 73 to be discussed later, there is interposed a spring 78 which always energizes the pressure member 66 clockwise around the shaft 67 in FIG. 15 (b). That is, the curved side surface of the pressure member 66 on the lower side thereof forms a gap with respect to the length adjusting belt 3 wound around the drum.

Also, on the lateral side of the pressure member 66, that is in the pull-out direction of the length adjusting belt 3, there is disposed a pressure mechanism 71 which is used to press the pressure member 66 against the side surface of the length adjusting belt 3. The pressure mechanism 71 comprises two base plates 72a and 72b respectively mounted on the front and rear portions of the wall portions 2a and 2b, the screw shaft 73 rotatably interposed between the two base plates 72a and 72b, an operation 73a which is used to operate or rotate the screw shaft 73 a nut block 74 which can be moved due to the rotation or the screw shaft 73 to press the pressure member 66 against the side surface of the length adjusting belt 3, and the like.

By the way, the gear 4 and securing pawls 5, which have been discussed heretofore in the above-mentioned respective embodiments, are respectively covered by a cover 75 which is disposed an the outside of the wall portion 2a.

Referring back to the retractor 1 according to the sixth embodiment, when the hand-operated locking mechanism is not in operation, the emergency locking operation is executed similarly to the previous embodiments. On the other hand, when the hand-operated locking operation is to be carried out, a parent, similarly to the previous embodiment, adjusts by hand the length of the belt to such a degree as allows an infant to move and, after then, operates the operation portion 73a by hand to thereby rotate the screw shaft 73, for example, clockwise as shown by a curved arrow line in FIG. 14. As a result of this, the nut block 74 is moved in the direction of the base plate 72b in FIG. 15 to thereby press the pressure member 66 strongly in the direction of the length adjusting belt 3 in correspondence to the angles of the inclined surface of the pressure member 66. This brakes the length adjusting belt 3 to thereby restrict the pull-out and storage of the length adjusting belt 3.

Figure 16:
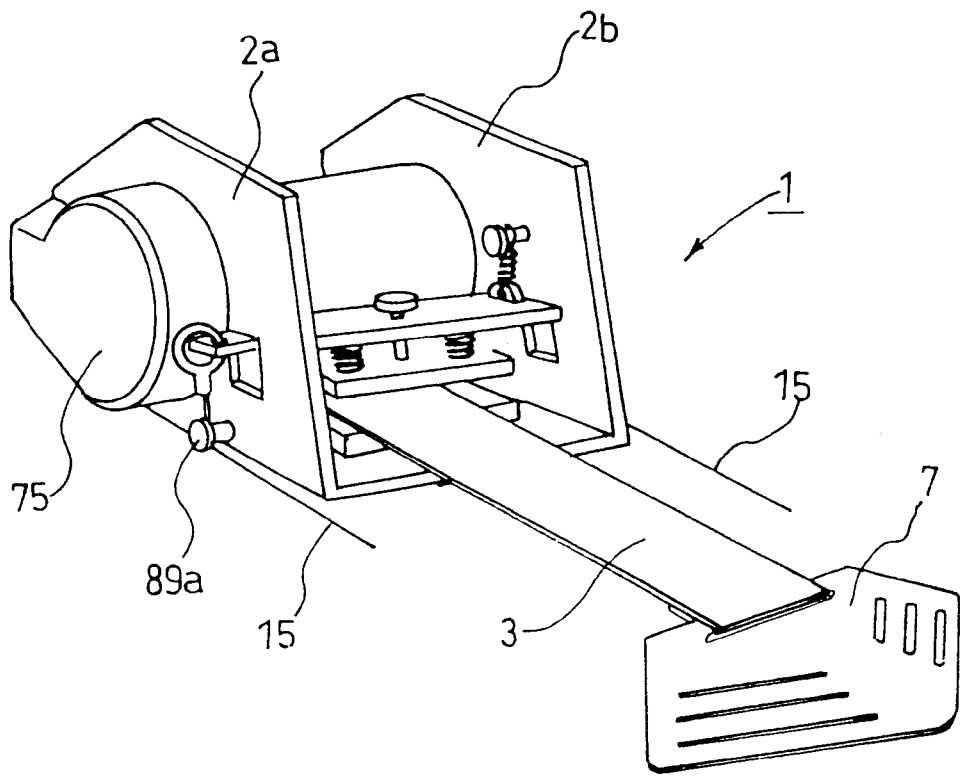
FIG. 16 is a perspective view of a retractor according to a seventh embodiment of the invention.
Figure 17:
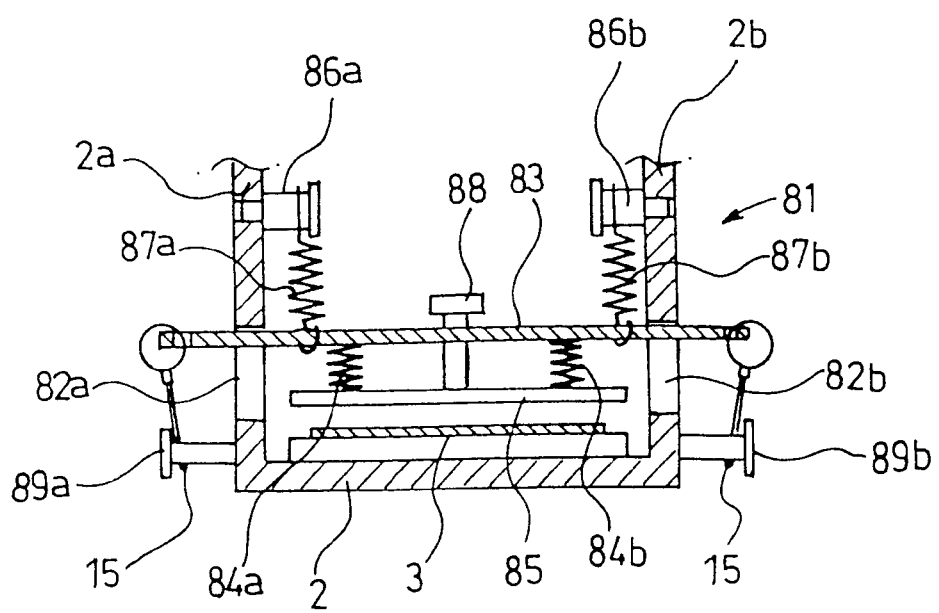
FIG. 17 is a section view of the structure of the retractor shown in FIG. 16.

According to the present embodiment as well, there can be obtained similar effects to the previous embodiments.
Seventh Embodiment Next, description will be predetermined below of a seventh embodiment of a retractor according to the invention with reference to FIGS. 16 and 17, In the present embodiment, similarly to the previously described sixth embodiment, the length adjusting belt 3 is directly locked regardless of the securing pawl and the like. In these FIGS. 16 and 17, the illustration of the above-mentioned securing pawl and gear is omitted and also parts capable of exhibiting similar functions to those employed in the previously described embodiments are predetermined the same designations and thus the description thereof is omitted here.

In the retractor 1 according to the present embodiment, the length adjusting belt 3 pulled out is pinched by pinch means to thereby execute the hand-operated locking of the length adjusting belt 3. That is in the pull-out opening of the length adjusting-belt 3, there is disposed a pinch mechanism 81 which corresponds to the hand-operated lock part B. The pinch mechanism 81 consists mainly of: a guide plate 83 capable of moving in the vertical direction under the guidance of two guide holes 82a and 82b which are respectively formed in the wall portion 2a and 2b in such a manner that they are long in the vertical direction; a pressure plate 85 mounted on the leading end of a pin 88 which is inserted through a hole (not shown) opened up in the guide plate 83; and, two springs 84a and 84b respectively interposed between the pressure plate 85 and guide plate 83. And, on the respective inner surfaces of the wall portions 2a and 2b, there are erectingly disposed two securing pins 86a and 86b and, between the securing pins 86a, 86b and the guide plate 83, there are interposed two springs 87a and 87b, so that the guide plate 83 can be pulled up by the springs 87a and 87b.

When the hand-operated locking operation is to be carried out, two wires 15 may be pulled by the operation part C that has been previously described in the first embodiment. That is, while the wires 15 are respectively fixed to the end portion of the guide plate 83, when the wires 15 are pulled, then the pulling direction of the guide plate 83 is changed by two guide pins 89a and 99b and the guide plate 83 is moved downward against the springs 87a and 87b. At the same time, the pressure plate 85 is also moved downward.

In particular, in the Initial stage, the spring 84a and 84b press against the length adjusting belt 3 slightly and, in the next stage, due to the downward movement of the pressure plate 85, the length adjusting belt 3 is strongly pressed by the springs 84a and 84b.

In this manner, the hand-operated locking operation can be achieved not of only by pinching the length adjusting belt 3 but also using the separated operation part C. Therefore, in the present embodiment as well, there can be obtained similar effects to the previously described embodiments and, in addition, since the position of the operation part C is not specified, there can also be obtained new effects, for example, the easiness of use of the child car seat can be enhanced.

Figure 18:
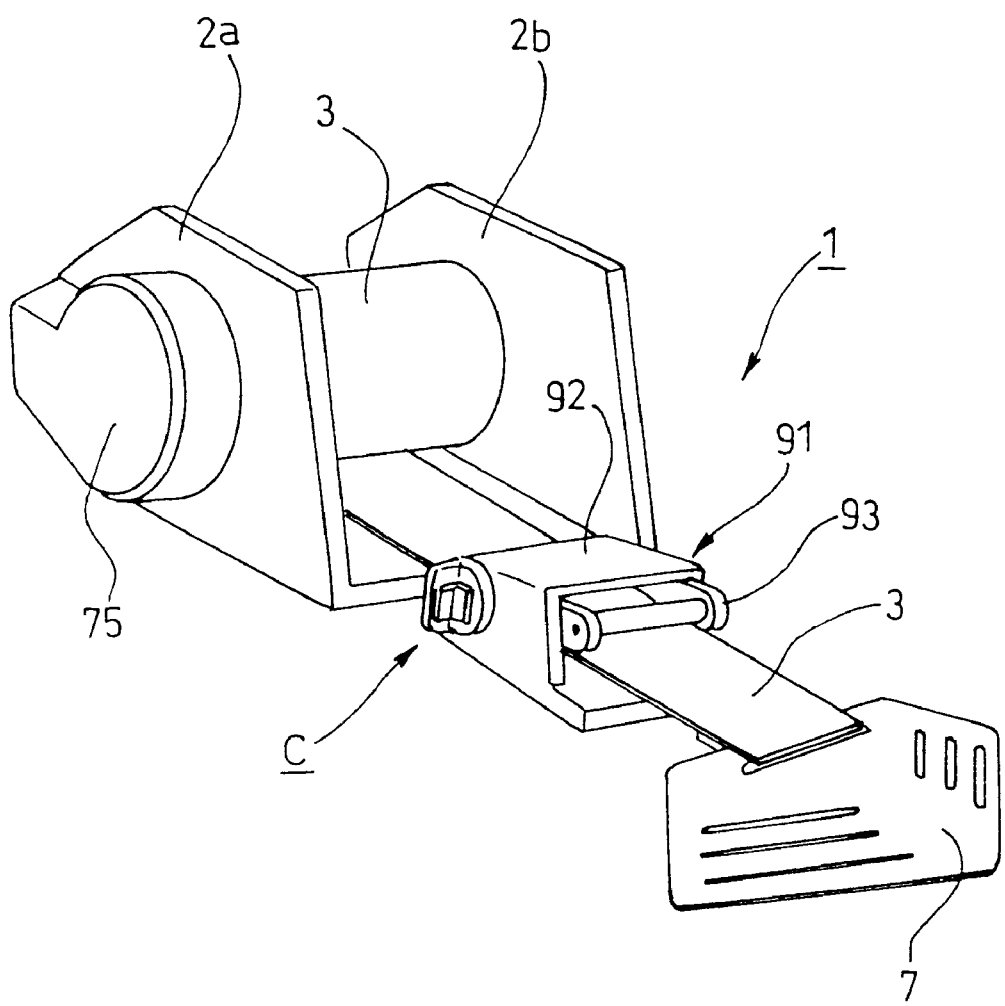
FIG. 18 is a perspective view of a retractor according to an eighth embodiment of the invention.

By the way, in the above-mentioned embodiment, the springs 84a and 84b are not always necessary but the pressure member 85 may also be mounted directly on the guide plate 83.
Eighth Embodiment Next, description will be predetermined below of an eighth embodiment of a retractor according to the invention with reference to FIGS. 18 to 20.

In the present embodiment, similarly to the previously described seventh embodiment, the length adjusting belt 3 is pinched by pinch means to thereby execute the hand-operated locking of the length adjusting belt 3. However, according to the present embodiment, a pinch mechanism 91 is provided separately from the frame body 2.

That is, the present pinch mechanism 91 comprises a cover 92 having an opening through which the length adjusting belt 3 can be inserted, a bar 93 capable of pressing against the length adjusting belt 3, a spring (expansion spring) 94 for energizing the bar 93 downward and an operation part C disposed, on the outside of the cover 92. The spring 94 is arranged in such a manner that one end thereof is secured to the inside of the cover 92 and the other end thereof is secured to an expansion-shaped securing portion 93a formed in one end of the bar 93.

The operation part C, as has been described heretofore in the previous embodiments, is structured such that it is able to lock the length adjusting belt 3 or remove the locking of the length adjusting belt 3 by operating or rotating the operation knob.

Figure 19:
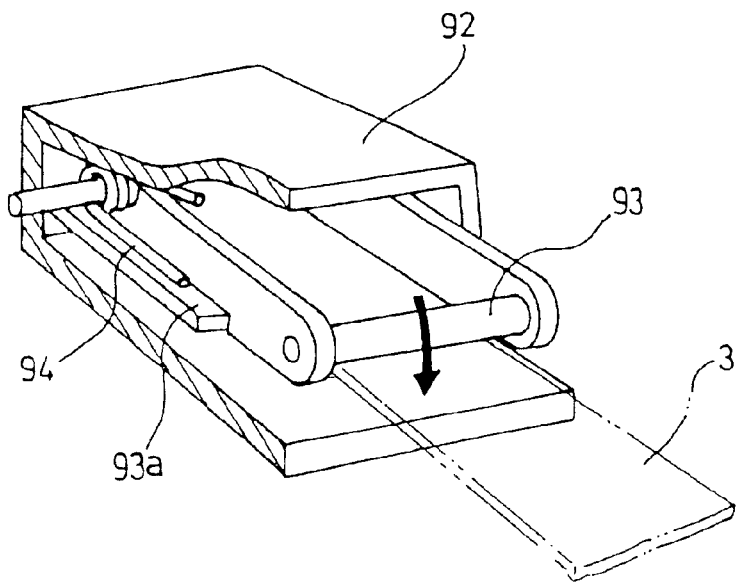
FIG. 19 is a perspective view of a structure of a lock mechanism employed in the retractor shown in FIG. 18.
Figure 20:
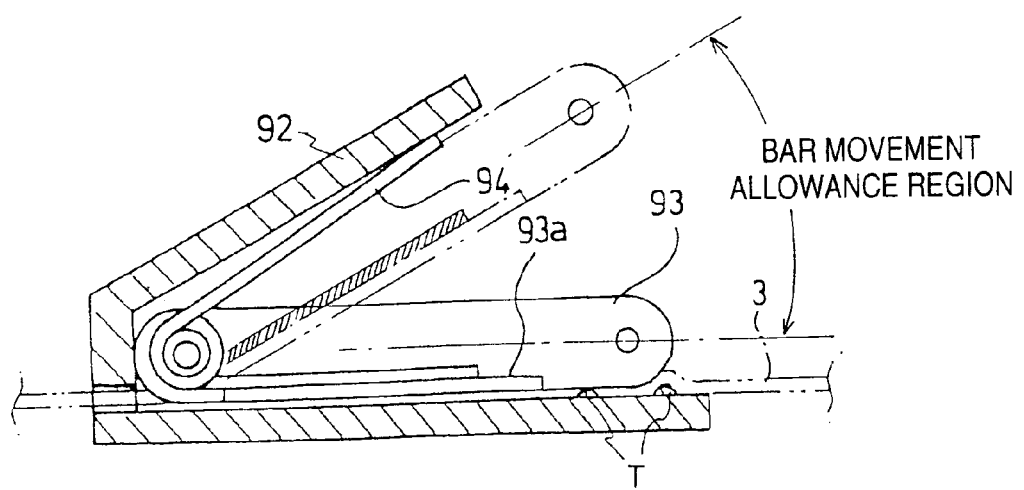
FIG. 20 is a perspective view of the structure of the lock mechanism shown in FIG. 18.

When allowing the operation part C to execute its locking operation, as shown by a solid line in FIG. 20, the bar 93 is moved downward in such a manner as shown by an arrow line in FIG. 19 due to the energizing force of the spring 94.

The downward movement of the bar 93 causes the bar 93 to pinch the length adjusting belt 3. Therefore, the length adjusting belt 3 is locked by hand to thereby restrict the pull-out and storage of the length adjusting belt 3. On the other hand, when allowing the operation part C to execute its lock removing operation, the operation part C is operated by hand against the energizing force of the spring 94 to thereby remove the bar 93 from the length adjusting belt 3 as shown by an imaginary line in FIG. 20. As a result of this, the length adjusting belt 3 is held in such a state that it can be freely pulled out and stored, whereas the emergency lock part is held in such a state that, similarly to the previously described embodiments, it can be operated.

By the way, on the contact surface side of the lower end portion of the cover 92 where the cover 92 can be contacted with the length adjusting belt 3, there may be provided a plurality of projections T in the neighborhood of the portion of the cover 92 where the bar 93 is pressed. That is, such provision of the projections T increases the contact resistance of the cover 92 with respect to the length adjusting belt 3, thereby being able to enhance the locking effect further.

As described above, in the retractor 1 according to the present embodiment, the hand-operated locking operation can be executed in the pull-out passage of the length adjusting belt 3. Therefore, when the present retractor 1 is applied to a child car seat, not only the freedom of design of the child car seat can be enhanced, but also there can be obtained similar effects to the previous embodiments.

Ninth Embodiment

Next, description will be predetermined: below of a ninth embodiment of a retractor according to the invention with reference to FIGS. 21 to 23.

The present embodiment is structured such that the length adjusting belt 3 can be locked by hand on the back surface of a child car seat.

Figure 21:
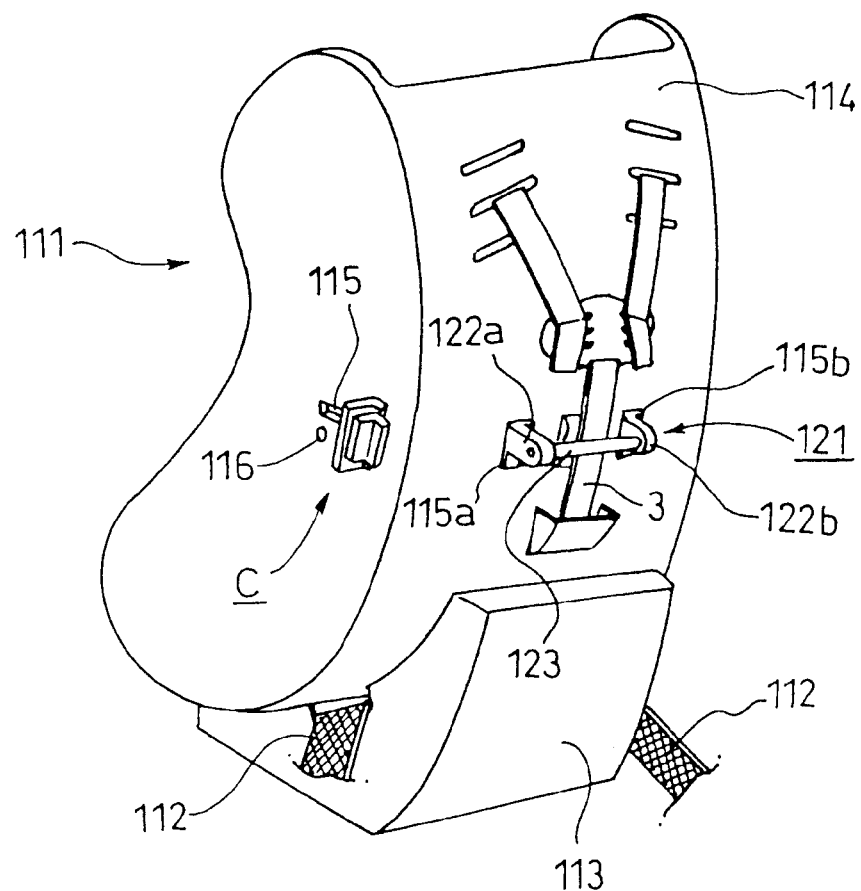
FIG. 21 is a perspective view of a child car seat according to a ninth embodiment of the invention.

On the back surface of a child car seat 111, as shown in FIG. 21, there is disposed a hand-operated lock mechanism 121. The child car seat 111 is composed of a base portion 113 to be fixed to a seat of a car using a safety belt 112, and a seat portion 114 in which an infant is seated; on the back surface of the seat portion 114, there is disposed the hand-operated lock mechanism 121; and, on the side surface of the seat portion 114, there is disposed the operation part C.

Figure 22:
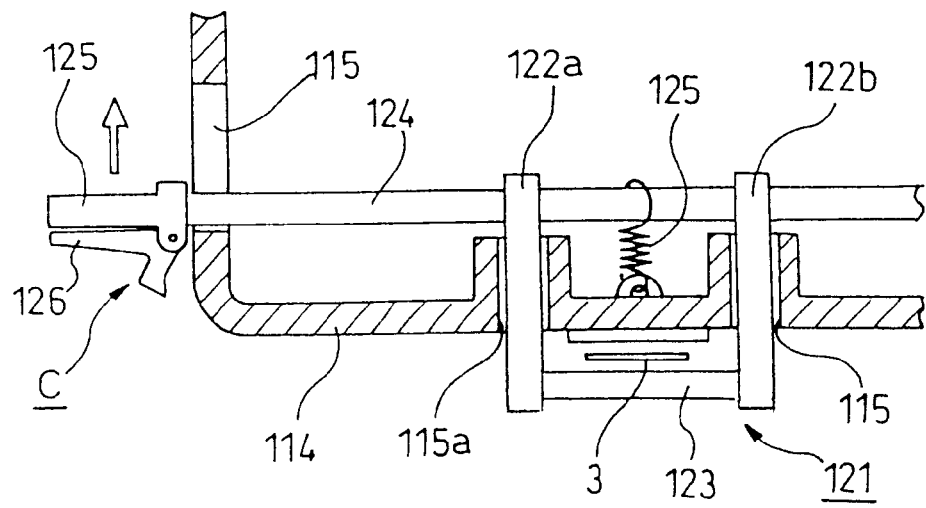
FIG. 22 is a section view of the structure of the child car seat shown in FIG. 21.

In the seat portion 114, as shown in FIG. 22, there are opened up a pair of through holes 115a and 115b which are spaced at a distance slightly larger than the width of the length adjusting belt 3; and, through the through holes 115a and 115b, there are respectively inserted a pair of reciprocating members 122a and 122b which form the hand-operated lock mechanism 121. The respective leading ends of the reciprocating members 122a and 122b are fixed to a pressure member 123. Therefore, when the reciprocating members 122a and 122b are pulled upward in FIG. 22, the pressure member 123 presses the length adjusting belt 3 against the back surface of the seat portion 114 to thereby lock the length adjusting belt 3 by hand, that is, execute the hand-operated locking operation on the length adjusting belt 3.

The reciprocating members 122a and 122b are fixed to a drive shaft 124 in the inside of the seat portion 114 and are always energized toward the back surface of the seat portion 114 by a operation knob 125. Therefore, unless they are pulled in a direction to resist the operation knob 125, that is, in the upward direction in FIG. 22 by the drive shaft 124, the reciprocating members 122a and 122b project on the back surface of the seat portion 114 and thus form a gap between the surface of the seat portion 114 and themselves, which allows the length adjusting belt 3 to be pulled out and taken up freely.

Figure 23:
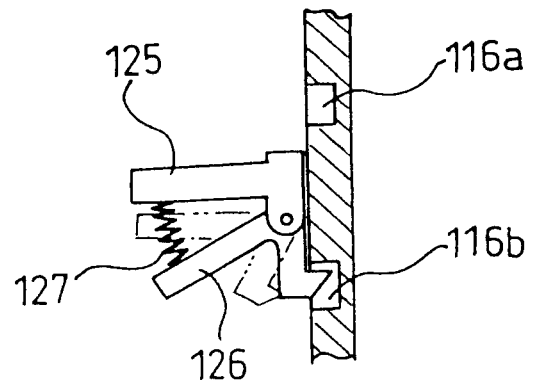
FIG. 23 is a section view of the structure of the child car seat shown in FIG. 21.

The left end of the drive shaft 124, as shown in FIG. 23, is connected to the operation part C. The operation part C is basically structured in such a manner as shown in FIG. 12. That is, on the side surface of the seat portion 114, there is formed a guide hole 115 which is long in the transverse direction of the seat portion 114, the end portion of the driveshaft 124 extends through the guide hole 115, and an operation know 125 is fixed to the leading end of the drive shaft 124. On the operation knob 125, there is rotatably mounted a lock knob 126 which can be driven by a spring 127 from a state shown by an imaginary line in FIG. 23 in such a manner as shown by a solid line shown in FIG. 23.

On the side surface of the seat portion 114, as shown in FIG. 21, downwardly (or upwardly) of the guide hole 115, there are formed two securing holes 116a and 116b which, as shown in FIG. 23, are spaced by a predetermined distance from each other.

According to the hand-operated lock mechanism 121 having the above-mentioned structural when the lock knob 126, as shown in FIG. 23, is secured to the securing hole 116b, the reciprocating members 122a and 122b are positioned as shown in FIG. 22, so that the length adjusting belt 3 can be freely pulled out and, taken up or stored. However, the retractor, around which the length adjusting belt 3 is wound, is held in a state where its original emergency locking operation can be carried out.

On the other hand, when the operation knob 125 is operated to thereby secure the lock knob 126 to the securing hole 116a, the operation part C and drive shaft 124 are pulled in an arrow direction shown in FIG. 22 and are also positioned there, so that the reciprocating members 122a and 122b are pulled against the operation knob 125 and the pressure member 123 presses the length adjusting belt, 3 against the back surface of the seat portion 114. As a result of this, the length adjusting belt 3 is prevented from being pulled out and taken up, that is, the length adjusting belt 3 is locked by hand.

Tenth Embodiment

Figure 24:
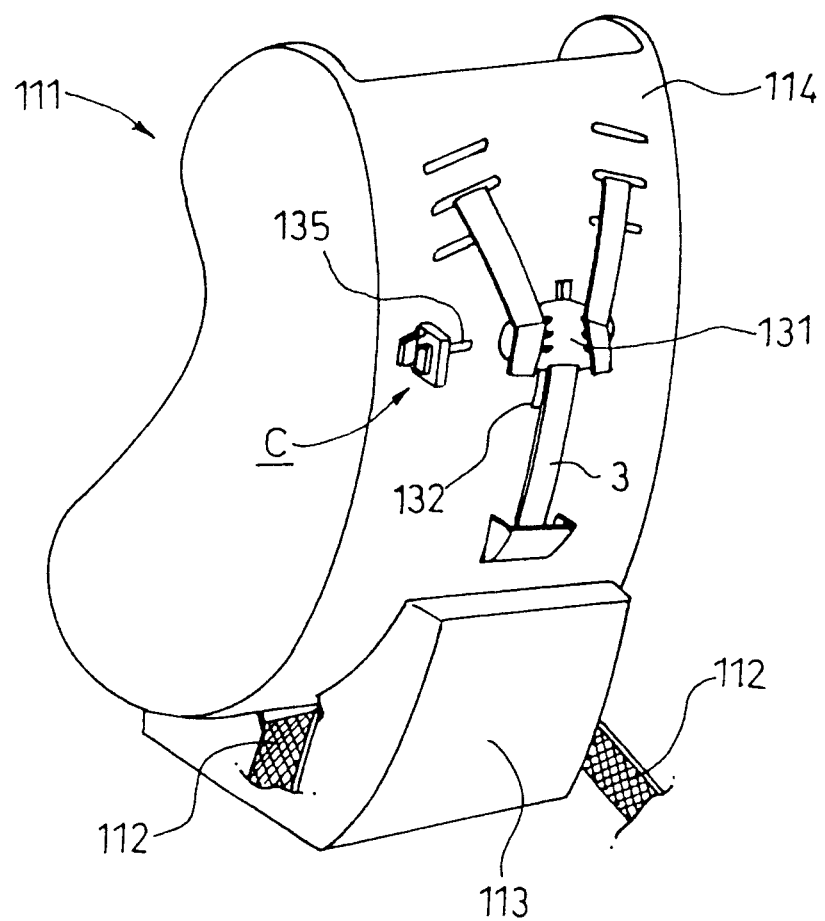
FIG. 24 is a perspective view of a child car seat according to a tenth embodiment of the invention.

Next, description will be predetermined below of a tenth embodiment, of a retractor according to the invention with reference to FIGS. 24 to 26.

The present embodiment is structured such that the length adjusting belt 3 is locked by hand using a belt adjusting metal member on the back surface of the seat portion. In the present embodiment, parts which operate similarly to those employed in the previous embodiments are predetermined the same designations and thus the description thereof is omitted here.

On the back surface of the seat portion 114, in more particular, in the neighborhood of a position where a belt adjusting metal member 131 is positioned, there is formed a guide groove 132 which extends in the longitudinal direction of the seat portion 114. And, on the back surface of the belt adjusting metal member 131, there is disposed a T-shaped defined by the belt adjusting metal-member and a pinch plate 133, while a removal preventive member 134 is disposed on the pinch plate 133.

On the other hand, there is formed another guide groove 135 in such a manner that it intersects the guide groove 132 at right angles and, in the guide groove 135, there is formed an operation part C in such a manner that it is free to move horizontally along the guide groove 135. The operation part C according to the present embodiment may have a structure basically similar to the structure previously described with reference to FIG. 12, while an operation knob 136 extends through the guide groove 135 and thus can operate as a guide member as well. To one end of the operation knob 136, there is secured a spring 137, while the spring 137 always pulls the operation knob 136 in the left direction in FIG. 25. And, on the end portion of the operation knob 136, there is disposed a pressure member 139 which can be energized by a spring 138.

In the inside of the seat portion 114, there is disposed a pinch mechanism 141 which is used to pinch the pinch plate 133 from both sides. The pinch mechanism 141 is composed of a pair of rotary members 143a and 143b, which are arranged symmetrically and can be rotated about their respective support shafts, 142a and 142b, and a pair of pressure contact members 144a and 144b; and, in the base portions of the rotary members 143a and 143b, there are formed gears 145a and 145b respectively.

Figure 25:
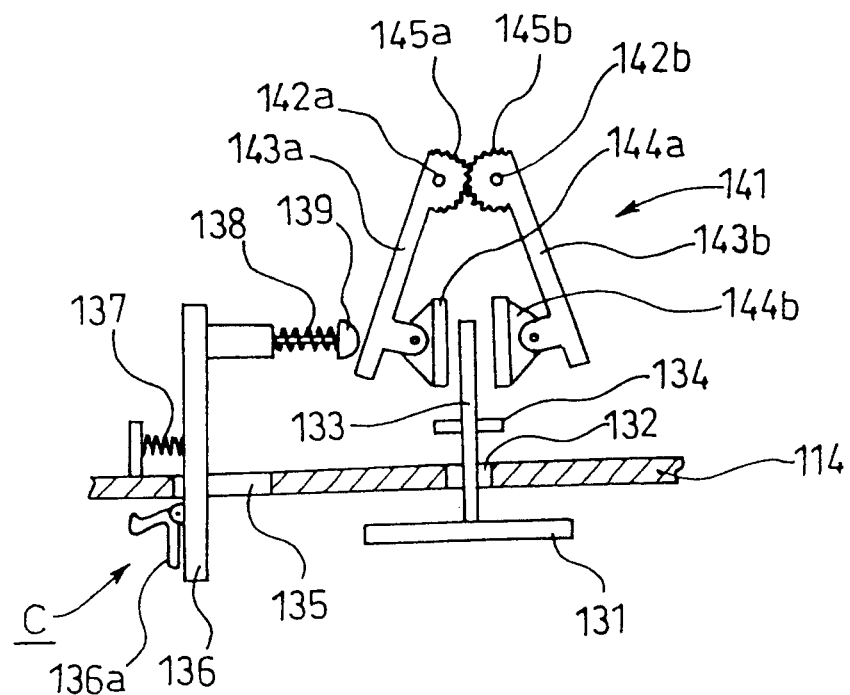
FIG. 25 is a section view of the structure of the child car seat shown in FIG. 24.
Figure 26:
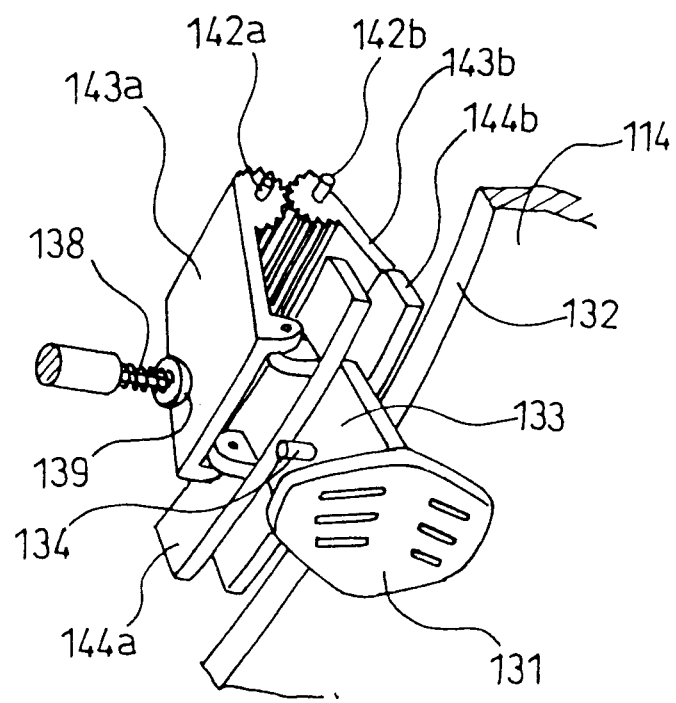
FIG. 26 is a perspective view of the structure of the child car seat shown in FIG. 24.

When executing the hand-operated locking operation, the lock knob 136a is operated similarly to the previously described embodiments to thereby move the operation knob 136 to the right in FIG. 25 along the guide groove 135. In response to the rightward movement of the operation knob 136 the pressure member 139 is also moved to the right, so that the rotary member 143a is rotated. When the rotary member 142a is rotated, than the rotary member 143b is rotated in the opposite direction due to the actions of the gears 145a and 145b and, at the time when the operation knob 136 is secured at a lock position, as shown in FIG. 26, the pressure contact members 144a and 144b hold the pinch plate 133 from both sides.

As a result of this, the belt adjusting metal member 131 is prevented from moving in the vertical direction to thereby prevent the length adjusting belt 3 from being pulled out and taken up, that is, the length adjusting belt 3 is locked by hand.

By the way, according to the structure of the present embodiment, the pinch plate 133 is held from both sides by the rotary members 143a and 143b. However, this is not limitative but, for example, instead of the rotary member 143b, there can be arranged a plate member in such a manner that it extends along the pinch plate 133, and the pinch member 133 can be pressed against the plate member by the rotary member 143a.

Eleventh Embodiment

Figure 27:
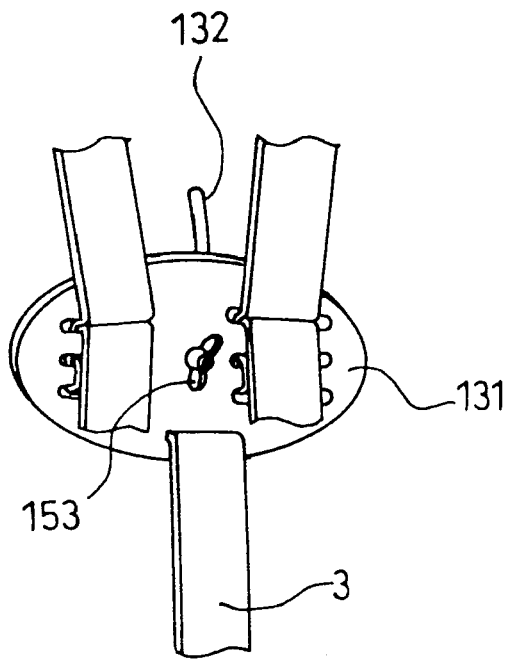
FIG. 27 is a perspective view of a belt adjusting metal member according to an eleventh embodiment of the invention.
Figure 28:
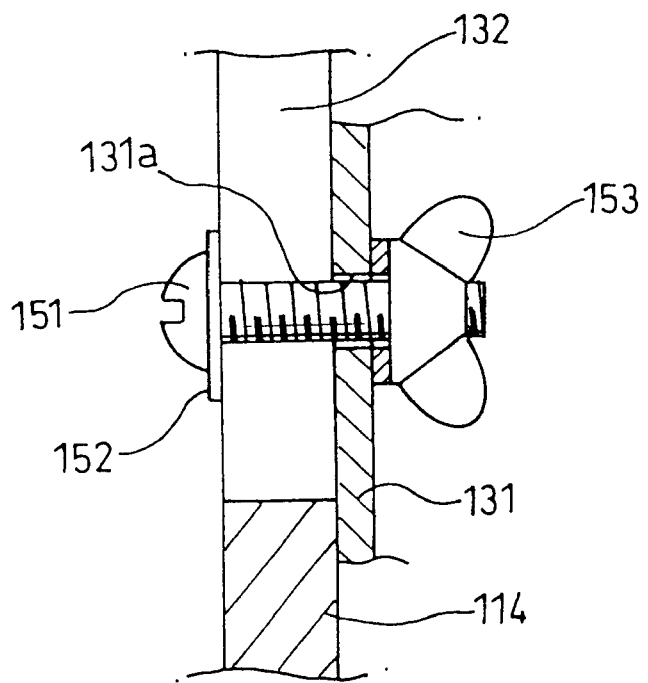
FIG. 28 is a section view of the main portions of the belt adjusting metal member shown in FIG. 27, showing how to adjust the belt length.

Next, description will be predetermined below of an eleventh embodiment of a retractor according to the invention with reference to FIGS. 27 and 28.

The present embodiment is structured such that the length adjusting belt 3 is locked by hand using a belt adjusting metal member on the back surface of the seat portion. In the present embodiment, parts which operate similarly to those employed in the previous embodiments are predetermined the same designations and thus the description thereof is omitted here.

On the back surface of the seat portion 114, in more particular, in the neighborhood of a position where a belt adjusting metal member 131 is positioned, there is formed a guide groove 132 which extends in the longitudinal direction of the seat portion 114. And, in the belt adjusting metal member 131, there is formed a screw insertion hole 131a through which there extends a screw 151 that has been inserted through the guide groove 132 from the inside of the seat portion 114. On the head portion of the screw 151, there is put a washer 152 which is used to prevent the head portion from passing therethrough into the guide groove 132 and, on the end portion of the screw 151, there is mounted a butterfly nut 153 in such a manner that it is threadedly engaged with the screw 151 end portion.

According to the above-mentioned structure, by loosening the butterfly nut 153, the belt adjusting metal member 131 is allowed to move freely along the guide groove 132 and, by tightening the butterfly nut 153, the belt adjusting metal member 131 can be fixed at an arbitrary position. Therefore, the parent can adjust the length of the length adjusting belt 3 simply by operating the butterfly nut 153 and after the belt length is adjusted, the length adjusting belt 3 is prevented from being pulled out and taken up.

This not only eliminates a fear that the infant can slip out of the belts but also can secure the safety of the infant even when the car is caused to stop suddenly.

By the way, it is also possible to combine together the respective embodiments described hereinbefore in a proper manner. For example, when there is employed a structure in which not only the rotation of the drum is restricted but also the belt is held from both sides by some hold means, further positive locking can be realized.

Modifications

Next, description will be predetermined below of various modifications of the operation part C according to the first embodiment.

Out of the following 9 modifications, the first to seventh modifications are of a type that the wire is pulled by rotating the operation knob; that is they fall under the category of the structure shown in FIG. 2. However, the present modifications are different from the structure shown in FIG. 2 in that they use a shaft, whereas the structure shown in FIG. 2 uses the rotary plate 22.

Figure 5:
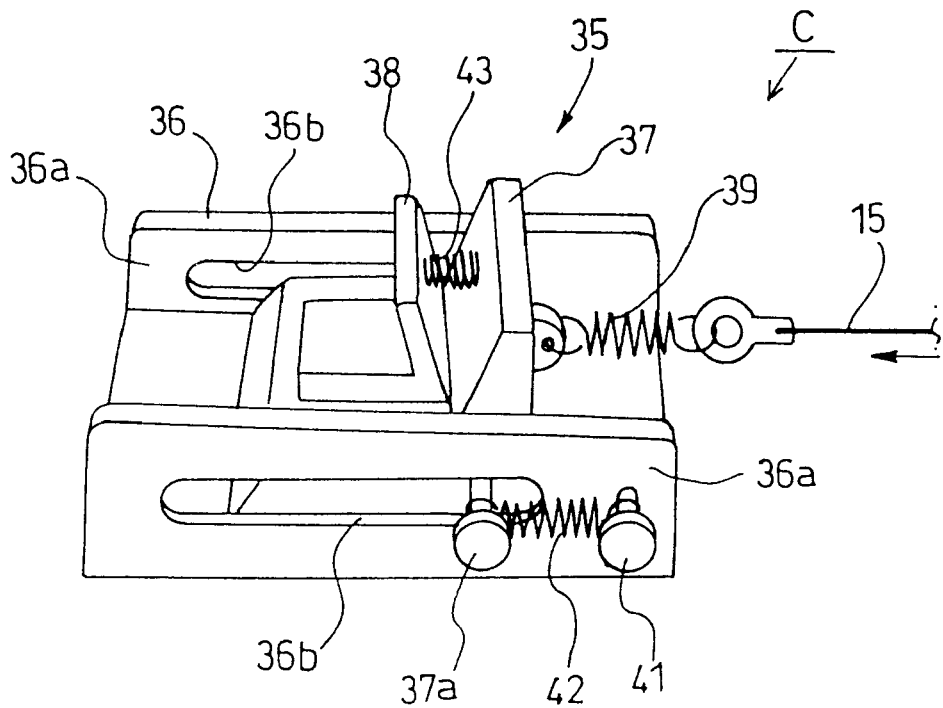
FIG. 5 is a perspective view of another structure of the operation part employed in the first embodiment.

Also, the eighth and ninth modifications are of a type that the wire is pulled by sliding the operation knob; that is, they fall under the category of the structure shown in FIG. 5.

Now, at first, description will be predetermined below of the former type.

Here, FIGS. 29 to 32 respectively show the first modification of the operation part C according to the first embodiment.

Figure 29A:
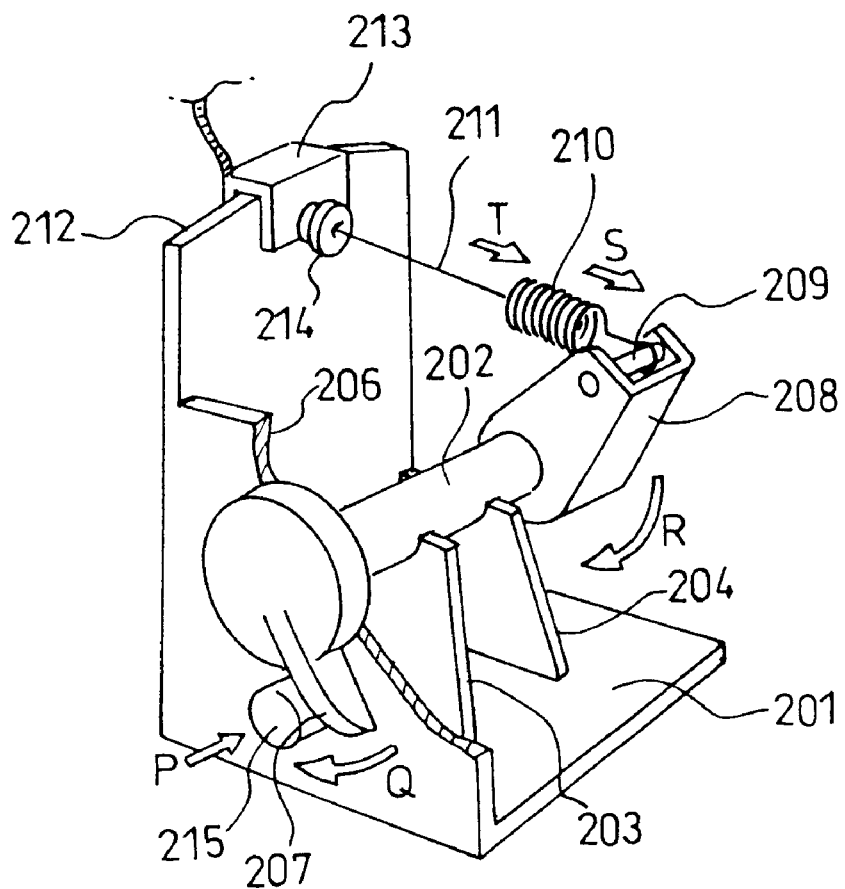
FIG. 29 is an explanatory view of a first modification of the operation part C employed in the first embodiment of the invention.
Figure 29B:
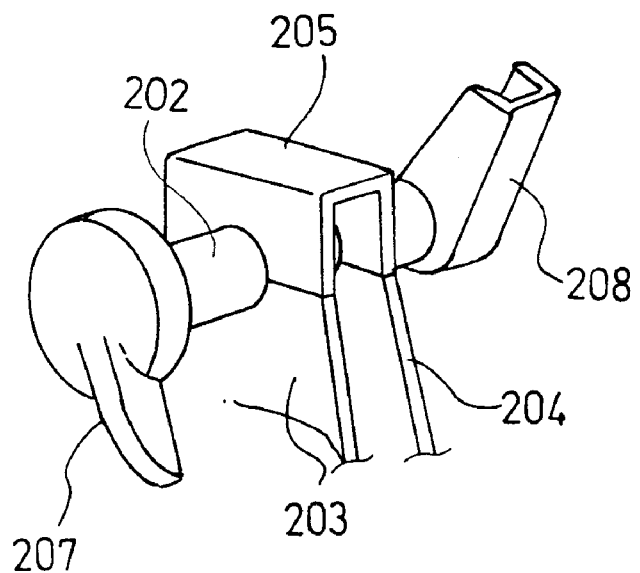

In FIG. 29 (a) to a base 201, there are fixed one support plate 203 and the other support plate 204 which are respectively used to support a shaft 202. On top of the two support plates 203 and 204, as shown In FIG. 29 (b), there is fixedly mounted a shaft holder 205 which journals the shaft 202, that is, supports the journal portions of the shaft 202. As means for fixing the shaft holder 205, there may be used an arbitrary method; for example, the shaft holder 205 may be fixed by welding, by tightening bolts and nuts, or the like.

One end of the thus journal supported shaft 202 projects from one side wall 206 of the base 201, while an operation knob 207 is fixed to the thus projecting end of the shaft 202.

Also, to the other end of the shaft 202, there is fixed an arm 209, while a pin 209 is disposed in the leading end of the arm 208. One and of a coiled spring 210 is mounted on the pin 209, while one end of a wire 211 is mounted on the other end of the coiled spring 210. The wire 211 is guided externally through a guide mouthpiece 214 which is mounted on the other side wall 212 of the base 201 by a cover 213, so that the wire 211 is used to operate the hand-operated lock part B shown in FIG. 1.

In the rotation area of one sidewall 206 where the operation knob 207 mounted on one side wall 206 can be rotated, there is projectingly provided a button 215 which is used to hold the operation position. This button 215, as shown best in FIG. 30 (a), is pressed by a coiled spring 217 which is stored within a case 216 built into one side wall 206, so that the head portion of the button 215 is projected externally of one side wall 206.

Here, the operation knob 207 cannot be rotated unless the button 215 is depressed-in, and this design prevents the erroneous operation.

Figure 30A:
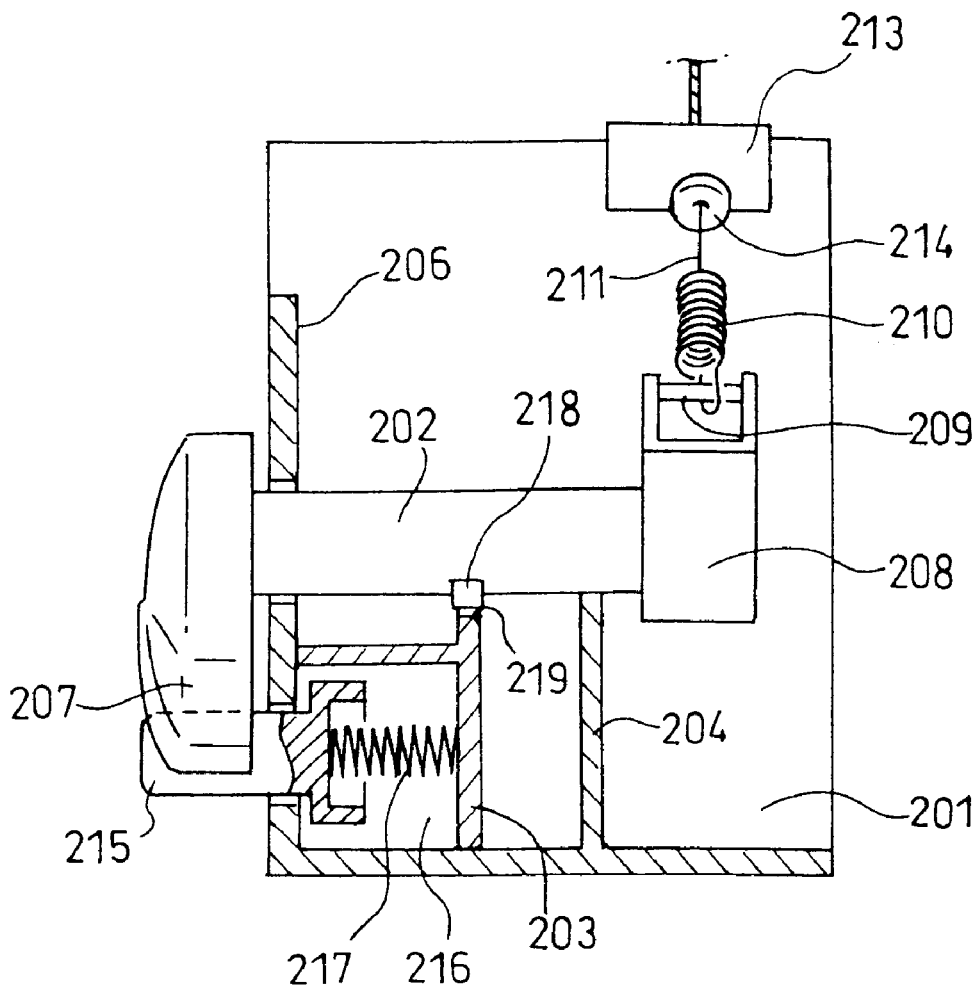
FIG. 30(a) is a longitudinal section view of the operation part, explaining the structure thereof.

By the way, in the facing portion of the shaft 202 to one support plate 203, as shown in FIG. 30 (*b*), there is disposed a pawl 218, and the pawl 218 is stored within an arc-shaped cut groove 219 which is formed in one support plate 203 to restrict the rotation range of the shaft 202, whereby the rotation range of the shaft 202 is previously set. That is the right end of the cut groove 219 is a second operation position X which provides a belt drum removing area, whereas the left end of the cut groove 219 is a first operation position Y which provides a belt drum locking area; and, the pawl 218 is allowed to move in this range.

Figure 31:
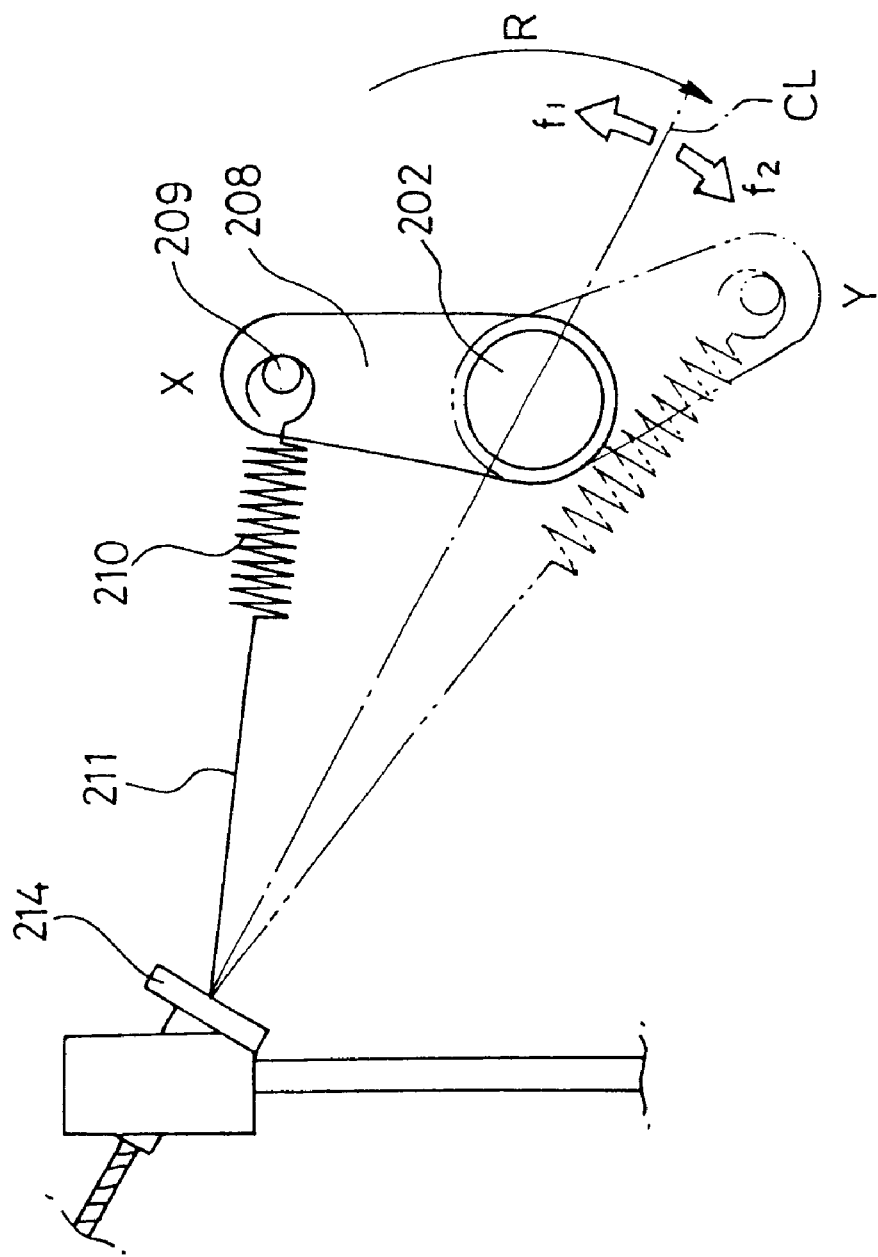
FIG. 31 is an explanatory view of the operation of a wire-type operation part with a rotary arm.

In the thus structured wire-type operation part, in the removed state in which the wire 211 is loosened, as shown in FIG. 31, the arm 208 is held at the second operation position X, while the coiled spring 210 is compressed. In this case, the operation knob 207 is held in such a state as shown in FIG. 29 (*a*). To move the arm 208 and thus the operation knob 207 from the second operation position X to the first operation position Y, it is required that the button 215 is pushed in the direction of an arrow line P in FIG. 29 (*a*), that is, into the case 216 located inside the side wall 206 before the operation knob 207 is rotated in the direction of an arrow line Q in FIG. 29 (*a*). This arrangement in which the operation knob 207 cannot be rotated unless the button 215 is pushed-in prevents the erroneous operation. The rotation of the operation knob 206 in the arrow Q direction causes the arm 208, which is fixed to the shaft 202 integrally with the operation knob 207, to be rotated in the direction of an arrow line R in FIG. 29 (*a*). With the rotation of the arm 208, the pin 209 provided on the arm 208 pulls the coiled spring 210 in the direction of an arrow line S [in FIG. 29 (*a*)]. Due to this, the coiled wire 210 pulls the wire 211 in the direction of an arrow line T [in FIG. 29 (*a*)] to thereby tighten the wire 211.

The wire 211 is the same as the wire 15 shown in FIG. 1 and thus to tighten the wire 211 means that the wire 15 is tightened; and, therefore, due to the fact that the wire 211 is tightened; the hand-operated lock part B shown in FIG. 1 is operated. The operation of the hand-operated lock part B is the same as in FIG. 1 and thus description thereof is omitted here.

Figure 32A:
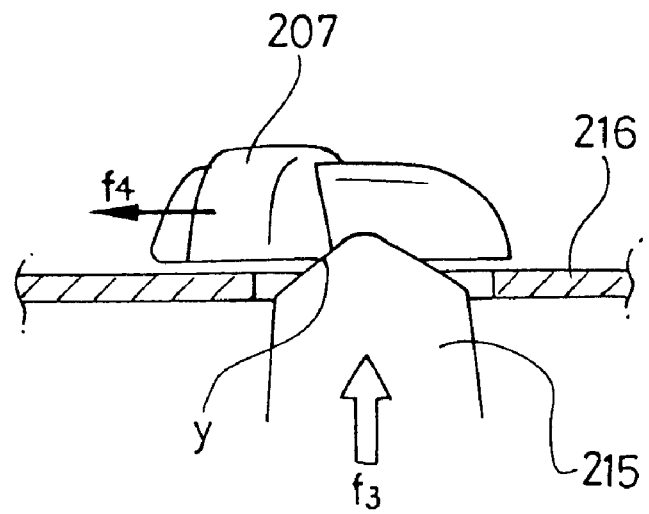
FIG. 32(a) is an explanatory view of the operation relation between the operation knob and button held at a first operation position.
Figure 32B:
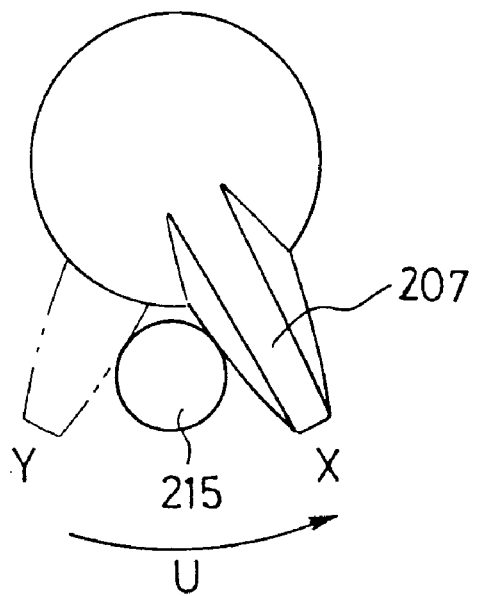
FIG. 32(b) is an explanatory view of the relation between the first and second operation positions.

In the process of the present operation, the operation knob 207 moves beyond the button 215 while pressing against the same and reaches the first operation position Y; and, when the button 215 is pressed again by the coiled spring 217 and the head portion of the button 215 is thereby projected externally of the side wall 206, then the operation knob 207 is secured [see FIG. 32 (*a*)].

In this process, as shown in FIG. 31, the arm 208 is rotated from the second operation position X to the first operation position Y; and, in this rotational movement of the arm 208, the arm 208 passes through an imaginary line CL connecting the wire exit of the guide mouthpiece 214 fixed to the other side wall 212 with the axis of the shaft 202.

While the pin 209 disposed on the arm 208 exists between X and CL, due to the tensile force of the coiled spring 210, a rotation force f1 (in the opposite direction to the arrow line R direction) is applied to the arm 208 but, while the pin 209 on the arm 208 exists on the CL line, no rotation force will be applied to the arm 208.

Also, while the pin 209 on the arm 208 exists between CL and Y, a rotation force f2 (in the arrow line R direction) is applied to the arm 208. In this case, as shown best in FIG. 32 (*a*), the button 215 is going to project due to a force in the direction f3 predetermined by the coiled spring 217, and the button 215 and operation knob 207 are contacted with each other at a point of y, so that the operation knob 207 is predetermined a rotation force in the direction of f4 (the same direction as the arrow line R direction).

However, depending on the shape of the button 215 as well as on the position relation between the button 215 and operation knob 207, a force in the opposite direction can also be applied.

In this manner, due to restriction of the rotation direction of the shaft 202 using the pawl 218 provided on the shaft 202 and the cut groove 219 formed in one support plate 203, setting of the position of the arm 209 apart from the imaginary line CL, and mutual operation between the operation knob 207 and button 215, even if the parent releases his or her hand from the operation knob 207 to thereby remove the operational external forcer the operation knob 207, as shown in FIG. 32 (*b*), can be held at either of the second operation position X or first operation position Y, and never be held at an intermediate position, i. e. an erroneous use position.

To move the operation knob 207 from the first operation position Y, where the wire 211 is held tense or tightened, to the second operation X, the operation knob 207 may be rotated in the direction of an arrow line U shown in FIG. 32 (*b*) while pushing the button 215 in the arrow line P direction shown in FIG. 29 (*a*).

That is when the operation knob 207 is moved from the first operation position Y to the second operation X, then the arm 208 is rotated in the opposite direction to the arrow line R, and the coiled spring 210 is switched from the extended position to the compressed position, so that the wire 211 is loosened to thereby remove the locking of the belt drum.

By the way, in FIG. 31, the position relation between the two operation position X and. Y is drawn in an exaggerated manner in order to simplify the description thereof but, in fact, the actual peripheral distance between the two operation positions X and Y is narrower than the illustrated distance. It should, however, be noted that the angle defined between the operation positions can be set at any desired value to meet a design requirement.

Figure 33A:
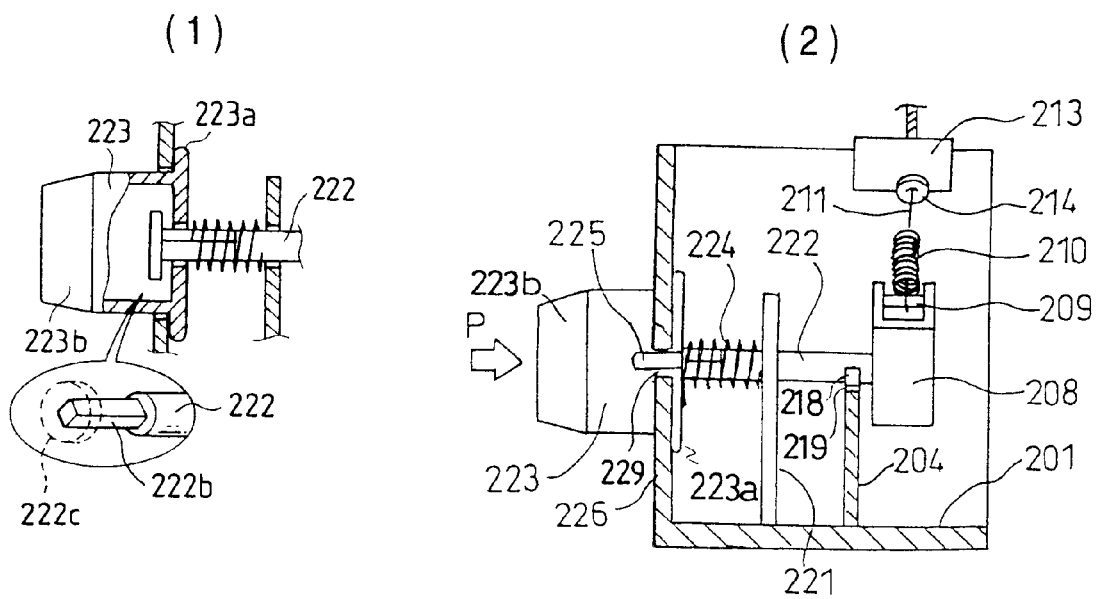
FIG. 33(a) is a partially longitudinal section view of the second modification, showing a state thereof in which it is held at a second operation position.
Figure 33B:
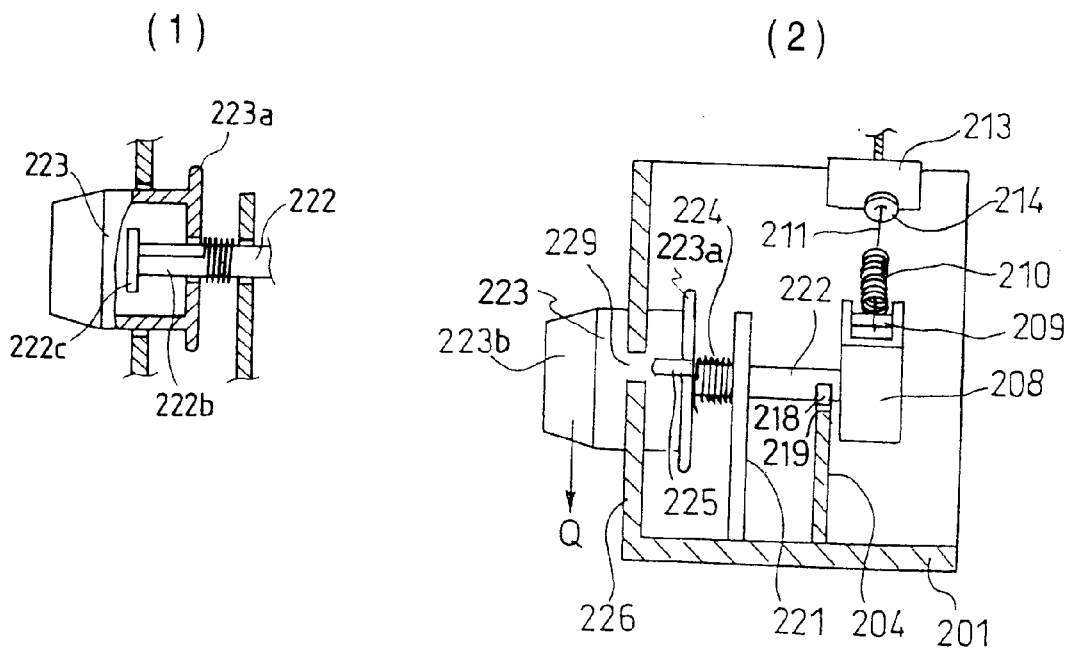
FIG. 33(b) is a partly longitudinal section view thereof, showing a process for moving it to a first operation position.
Figure 33C:
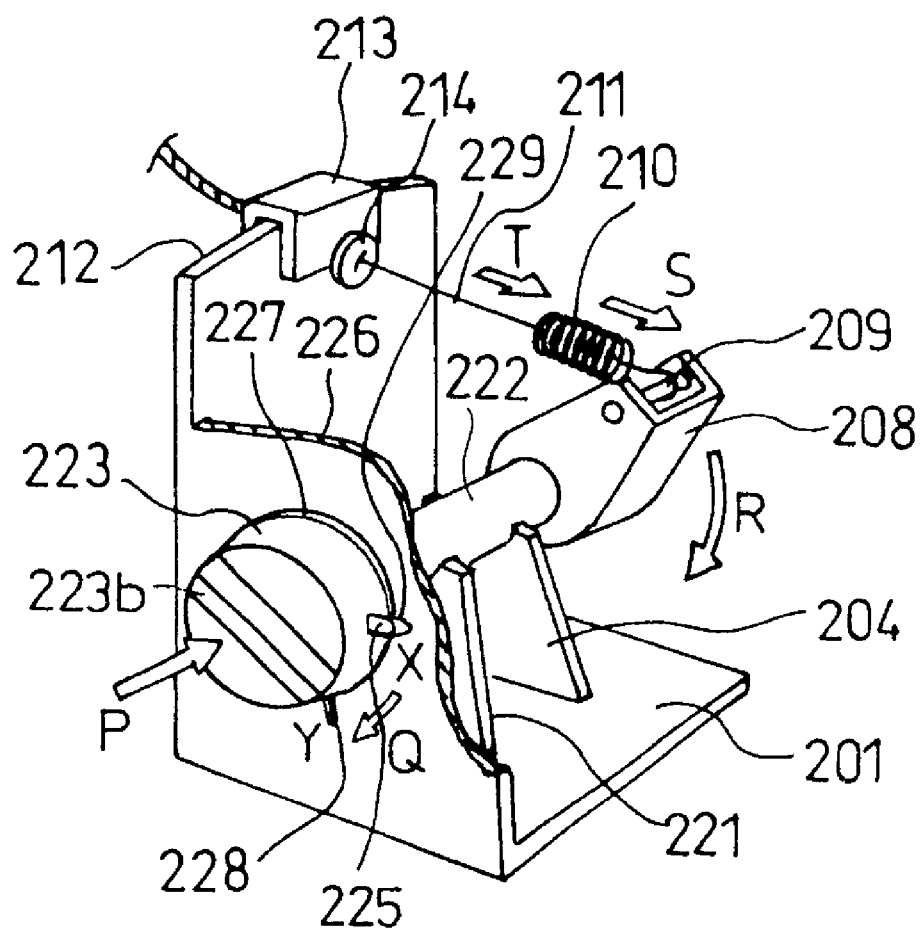
FIG. 33(c) is an explanatory view of the relation between the first and second operation positions of the second modification.

Now, FIGS. 33 and 34 respectively show the second and third modifications of the operation part C according to the first embodiment of the invention. While the first modification of the operation part C of the first embodiment shown in FIGS. 29 to 33 is structured such that the rotation of the shaft 202 is fixed using the button 215, both of the second and third modifications respectively shown in FIGS. 33 and 34 eliminate the need for use of the button 215. That is, the second and third modifications respectively shown in FIGS. 33 and 34 are similar to each other in that the operation knob (223 in FIG. 33, and 234 in FIG. 34) is moved slightly in the horizontal direction (in FIG. 33, and FIG. 34) and is then rotated to a slight degree in the arrow Q direction and, after then, the operation knob 222 (232) is returned oppositely in the horizontal direction to thereby fix the rotation of the operation knob 222 (232).

However, there is a difference between the two modifications; that is, the second modification is a type that the operation knob 223 thereof is pushed in, whereas the third modification is a type that the operation knob 234 thereof is pulled out.

FIG. 33 shows the type that the operation knob 223 in the operation part C of the first embodiment is pushed in, where FIG. 33 (*a*) shows an unlocked state of the operation knob 223, FIG. 33(*b*) shows a state in which the operation knob 22 is pushed in, and FIG. 33 (*c*) is a partially sectional, perspective view of the operation part (c) in the state shown in FIG. 33 (*a*) In addition, each of FIG. 33(*a*)(1) and FIG. 33(*a*)(2) is an axially sectional view of the operation knob 223, whereas each of FIG. 33(a)(2) and FIG. 33(b)(2) is a partially sectional view of the operation part C.

Referring firstly to the second modification shown in FIG. 33, the shaft 222 is journaled or supported on a support plate 221 which is fixed to a base 201, an operation knob 223 is fixed to the left end of the shaft 222, a coil spring 224 arranged concentrically with the shaft 222 is interposed between the operation on knob 223 and support plate 221, and the operation knob 223 is set such that it is normally situated at a left position, as shown in FIG. 33 (a)(1). As illustrated, the operation knob 223 is substantially in the form of a hollow cylinder as a whole, but is formed at its lower end (the right side in the drawings) with a stop ring 223a that prevent the removal of the operation knob 223, and at its upper end (the left side in the drawings) with a protruded portion 223b that facilitates the rotational operation of the operation knob, 223. A hole rectangular in section is opened at the bottom portion of the operation knob 223, into which a rectangular portion 222b (described later) of the shaft 222 is inserted. On the right end portion of the operation knob 223, there is partially disposed an axially-extending pawl 225.

In the side wall 226 of the base 201, there is formed a circular-shaped through hole 227, through which the operation knob 223 can be inserted and, on the circumference of the through hole 227, there are formed a cut groove 228 for a first operation position Y and a cut groove 229 for a second operation position X [FIG. 33 (c)]. The pawl 225, which is disposed on the right end of the operation knob 223, can be engaged with either of the cut groove 228 or 229 according to the need of a user.

The shaft 222 is in the form of a circular column as a whole with the exception that its left side down to a certain length from its left end (i.e. a length slightly longer than a length in which the operation knob 223 is moved axially) is formed into the rectangular portion 222b rectangular in section as shown in FIG. 33(a)(1). This rectangular portion 222b is loosely fitted to the aforementioned rectangular hole at the bottom of the operation knob 223 so that the operation knob 223 is moved (slid) horizontally in the rightward direction on and along the shaft 222 during the pushing-in operation of the operation knob 223, and drives the shaft 222 to be rotated during the rotational operation of the operation knob 223. In addition, a stopper 222c is provided on the left end of the shaft 222 to prevent the withdrawal of the operation knob 223.

Figure 30B:
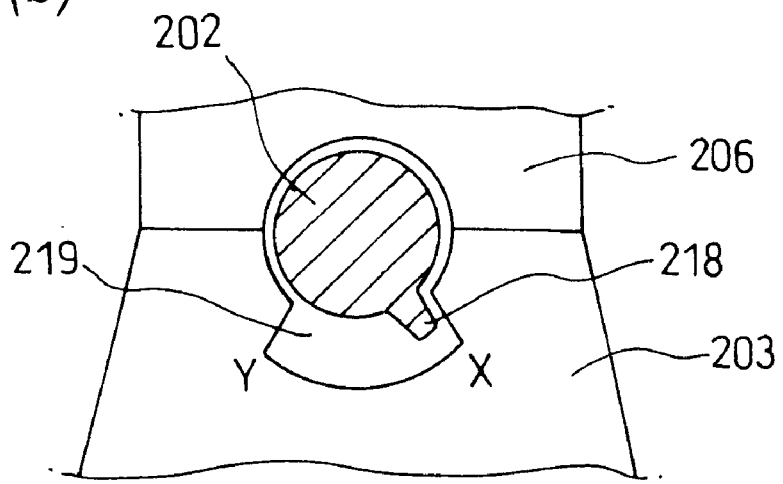
FIG. 30(b) is an explanatory view of a cut groove formed in the operation part.

In the facing portion of the shaft 222 to one support plate 204, there is disposed a pawl 218, and, similarly to that shown in FIG. 30(b), this pawl 218 is stored within an arc-shaped cut groove 219 which is formed in the one support plate 204 to restrict the rotation range of the shaft 222, whereby the rotation range of the shaft 222 is previously set. That is, the right end of the cut groove 219 is a second operation position X which provides a belt drum removing area, whereas the left end of the cut groove 219 is first operation position Y which provides a belt drum locking area; and, the pawl 218 is allowed to move in this range.

On the right side of the shaft 222, there is disposed an arm 208, a coiled spring 210 is secured to the arm 208, and the wire 211 is secured to the coiled spring 210. Here, the wire 211 is the same as the wire 15 shown in FIG. 1 and thus to tighten the wire 211 means to tighten the wire 15; and, therefore, due to the fact that the wire 211 is tightened, the hand-operated lock part B shown in FIG. 1 is operated. The operation of the hand-operated lock part B is the same as in FIG. 1 and thus description thereof is omitted here.

In the present modification, to move the operation knob 223 in the direction of an arrow line Q shown in FIG. 33 (c) from the second operation position X to the first operation position Y, at first, the operation knob 223 is pushed in the direction of an arrow line P shown in FIG. 33 (c). This causes the operatoin knob 223 to move horizontally in the rightward direction on and along the shaft 222, and therefore, as shown in FIG. 33 (b), the coiled spring 224 is compressed, so that the pawl 225 disposed on the operation knob 223 is removed from the cut groove 229 formed in the side wall 226. In such pushed-in state, when the operation knob 223 is rotated in the arrow line Q direction to thereby bring the pawl 225 disposed on the operation knob 223 into engagement with the cut groove 228 and the hand is released from the operation knob 223, then the coiled spring 224 presses against the operation knob 223 to the left, so that holding of the operation knob 223 at the first operation position Y is completed.

On the other hand, to move the operation part C from the first operation position Y to the second operation position X, the operation knob 223 may be pushed by hand in the arrow line P direction to thereby remove the pawl 225 from the cut groove 228, and then the operation knob 223 may be rotated in the opposite direction to the arrow line Q direction to thereby bring the pawl 225 into engagement with the cut groove 229. In this manner, the erroneous operation is prevented by arranging that the operation knob 223 cannot be rotated unless the operation knob 223 is pushed in the arrow P direction.

Next, description will be predetermined below of the third modification shown in FIG. 34.

As described above, while the second modification shown in FIG. 33 is a type that the shaft 222 is pushed in, whereas the third modification shown in FIG. 34 is a type that the shaft 232 is pulled out. FIG. 34(a) shows an unlocked state of the operation knob 232, FIG. 34(b) shows a state in which the operation knob 232 is pushed in, and FIG. 34(c) is a partially sectional, perspective view of the operation part C in the state shown in FIG. 34(a). In addition, each of FIG. 34(a)(1-2) and FIG. 34(b)(1-2) is an axially sectional view of the operation knob 232, and FIG. 34(a)(1-1) and FIG. 34(b)(1-1) respectively show a E—E section and an D—D section of these drawings. Each of FIG. 34(a)(2) and FIG. 34(b)(2) is a partially sectional view of the operation part C.

The shaft shown in FIG. 34 is made up of a right shaft 232 and a left shaft 232'. The right shaft 232 is in the form of a circular column as a whole with the exception that its left side down to a certain length from its left end (i.e. a length slightly longer than a length in which the operation knob 232 is moved axially) is formed into a rectangular portion 232b rectangular in section as shown in FIG. 34(a)(1). A stopper 232c is provided on the left end of the shaft 232 to prevent the withdrawal of the left shaft 232'.

The left shaft 232' is substantially in the form of a hollow cylinder, and on the right end side thereof there is opened a hole rectangular in section, into which the rectangular portion 232b of the right shaft 232 is inserted. The left shaft 232' is journaled or supported on a support plate 231 that is fixed to the base 201 in such a manner that the left end thereof is protruded to the left from a side wall 233 of the base 201. An operation knob 234 of a straight form is mounted to this protruded portion. The operation knob 234 is effective when the left shaft 232' is pulled out or rotated.

The aforementioned rectangular portion 232b of the right shaft 232 is loosely fitted to the rectangular hole provided in the bottom of the left shaft 232', so that the right shaft 232 does not follow the axial movement of the left shaft 232', but is rotated as the left shaft 232' is rotated.

Figure 34A:
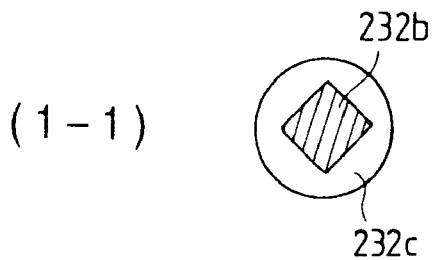
FIG. 34 is an explanatory view of a third modification of the operation part C of a wire type according to the first embodiment of the invention; in particular.
Figure 34A:
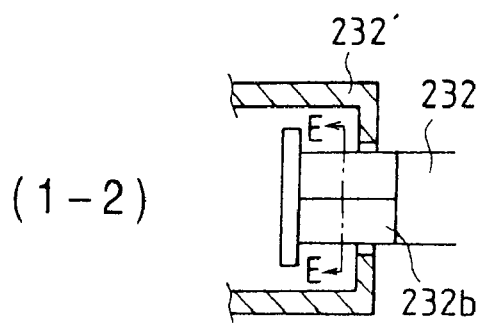
Figure 34A:
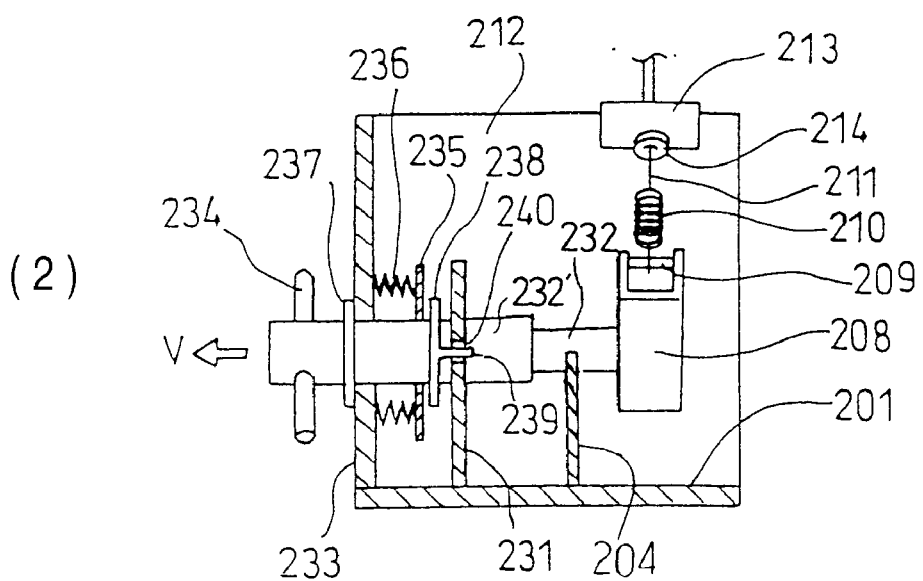
Figure 34B:
Figure 34B:
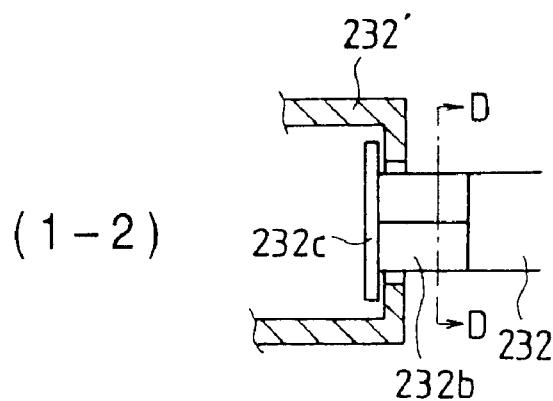
Figure 34B:
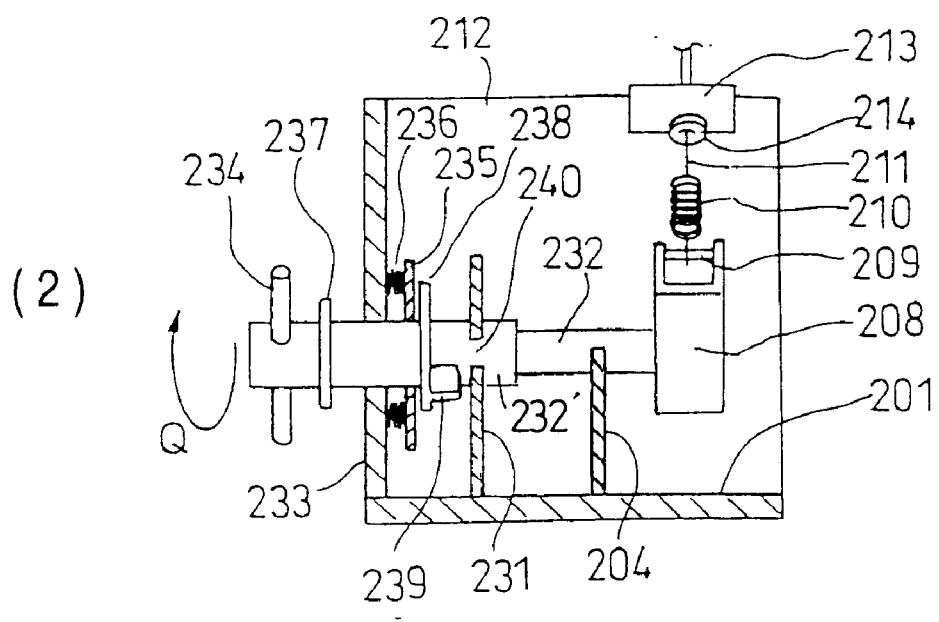
Figure 34C:
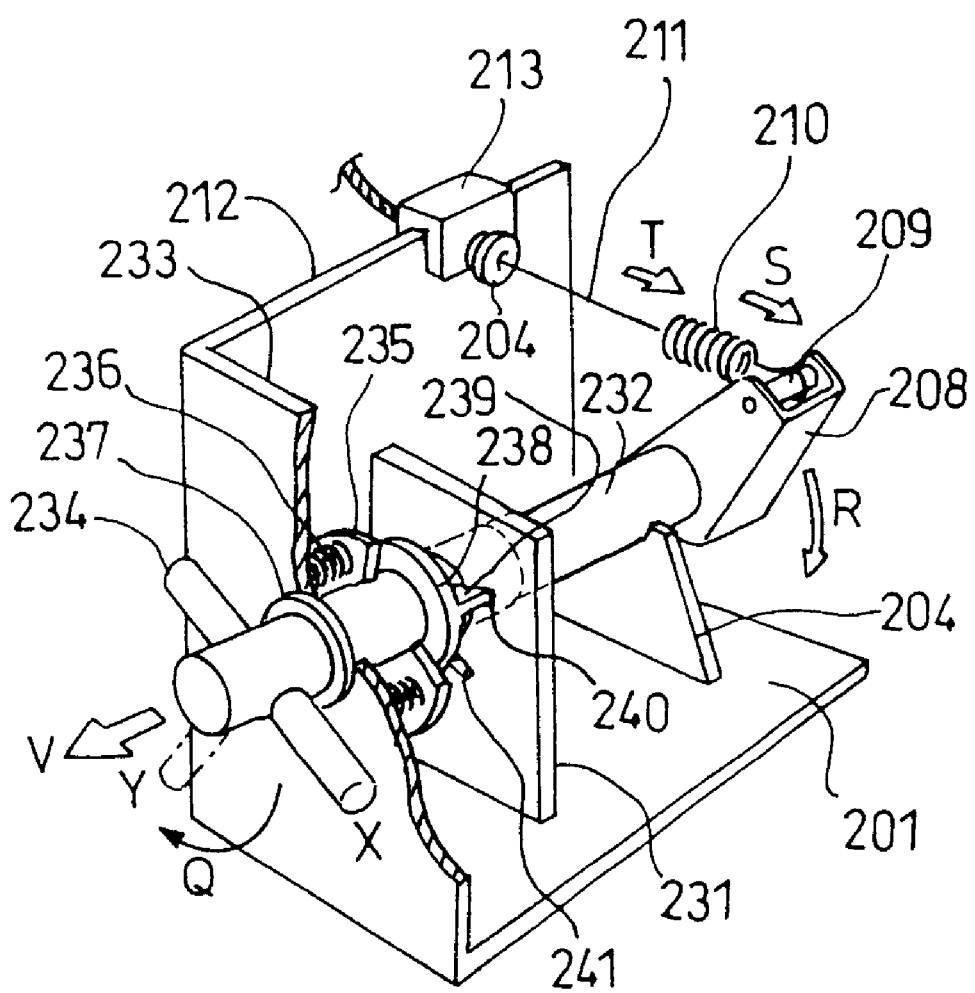

The operation knob 234 is normally held at the position shown in FIGS. 34(a)(1-1) and 34(a)(1-2). The pulling-out operation of the operation know 234 (see FIG. 34(b)) causes the left shaft 232' to be moved (slid) horizontally in the leftward direction on and along the shaft 232, and the rotational operation of the operation knob 234 causes the rotation of the left shaft 232', which is followed by the rotation of the right shaft 232.

Also, to the portion of the shaft 232 that is located in the neighborhood the side wall 233, there is fixed a hold plate 235 and, between the hold plate 235 and side wall 233, there is secured a coiled spring 236 which applies an energizing force to move the shaft 232 to the right.

On the other hand, the portion of the shaft 232 that is located in the neighborhood of the operation knob 234, there is disposed a stop ring 237. That is, the right and left movable range of the shaft 232 is restricted by the stop ring 237 and hold plate 235. On the right of the hold plate 235, there is mounted a select plate 238 in such a manner that it is fixed to the left shaft 232'. A pawl 239 is provided on and projected from the right side surface of the select plate 238. The pawl 239, as shown in FIG. 34 (c), can be fitted into either of a second operation position cut groove 240 or a first operation position cut groove 241 which is formed in the support plate 231 in such a manner as to extend through the support plate 231.

In the facing portion of the right shaft 232 to one support plate 204, there is disposed a pawl 218, and similarly to that shown in FIG. 30(b), this pawl 218 is stored within an arc-shaped cut groove 219 which is formed in the one support plate 204 to restrict the rotation range of the shaft 232, whereby the rotation range of the shaft 232 is previously set. That is, the right end of the cut groove 219 is a second operation position X which provides a belt drum removing area, whereas the left end of the cut groove 219 is a first operation position Y which provides a belt drum locking area; and, the pawl 218 is allowed to move in this range.

On the right side of the right shaft 232, there is disposed an arm 208, a coiled spring 210 is secured to the arm 208, and a wire 211 is secured to the coiled spring 210. Here, the wire 211 is the same as the wire 15 shown in FIG. 1 and thus to tighten the wire 211 means to tighten wire 15; and, therefore, due to the fact that the wire 211 is tightened, the hand-operated lock part B shown in FIG. 1 is operated. The operation of the hand-operated lock part B is the same as in FIG. 1 and thus description thereof is omitted here.

Now, FIG. 34 (a) shows a state in which the coiled spring 236 is expanded and thus the pawl 239 disposed on the select plate 238 is secured to the second operation position cut groove 240 formed in the support plate 231. To move the operation part C from this state to the first operation position, the operation knob 234 may be manually pulled out in the direction of an arrow line V to pull the pawl 239 out from the second operation position cut groove 240 to thereby remove the mutual engagement between the pawl 239 and cut groove 240, next, as shown in FIG. 34 (b), the operation knob 234 may be rotated in the direction of an arrow line Q to thereby bring the pawl 239 into engagement with the first operation position cut groove 241, and, after then, the hand may be released from the operation knob 234.

As a result of this, the coiled spring 236 is expanded to thereby secure the pawl 239 to the first operation position cut groove 241. At the then time, the operation knob 234 is moved from the second operation position X direction to the first operation position Y direction [see FIG. 34 (c)].

On the other hand, to move the operation part C from the first operation position to the second operation position, the operation knob 234 may be pulled out in the arrow line V direction and the above operation may be reversed.

In this manner, the erroneous operation is prevented by arranging that the operation knob 234 cannot be rotated unless the operation knob 234 is pulled out.

Figure 35A:
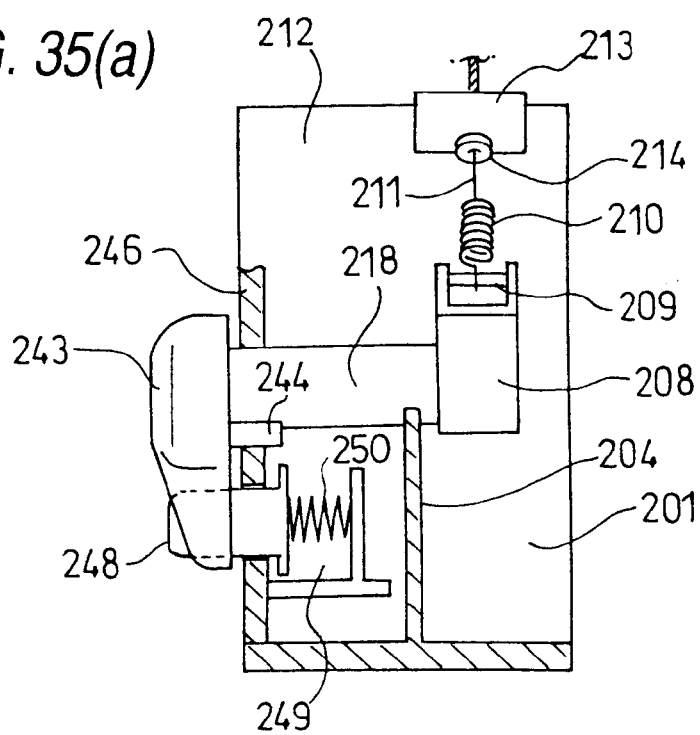
FIG. 35(a) is a partially longitudinal section view of the fourth modification, showing a state thereof in which it is held at a second operation position.
Figure 35B:
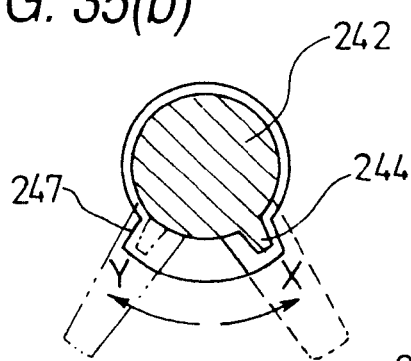
FIG. 35(b) is an explanatory view of an example of a cut groove employed in the fourth modification.
Figure 35C:
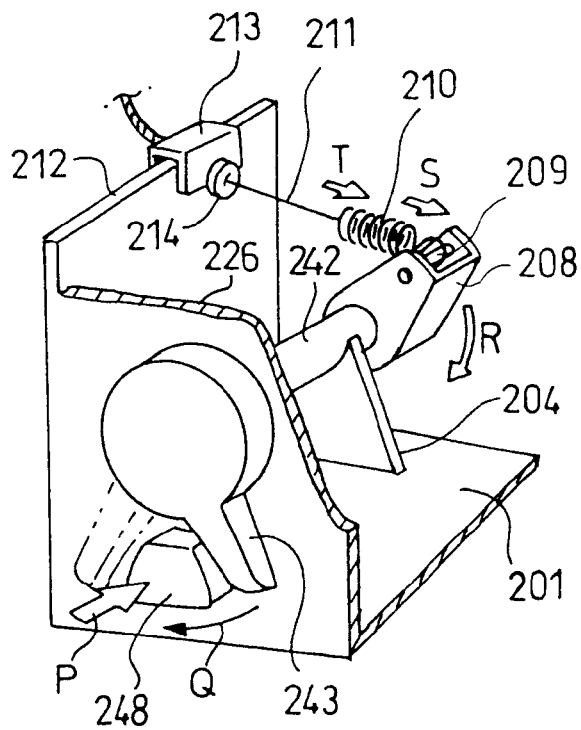
FIG. 35(c) is an explanatory view of the relation between the first and second operation positions of the fourth modification.

Now, FIG. 35 shows a fourth modification of the operation part C according to the first embodiment of the invention.

The fourth modification shown in FIG. 35 is of a type that a button 248 is used to prevent the rotation of the shaft and thus the fourth modification falls under the same category of the first modification shown in FIG. 30. However, the fourth modification shown in FIG. 35 is different from the first modification shown in FIG. 30 in that a spring support case 249 is employed but the support plate 203 is omitted.

In FIG. 35 (a), on the mounting portion of a shaft 242 where an operation knob 243 is mounted, there is disposed a pawl 244, while the pawl 244 can be rotated within an arc-shaped cut groove 247 [see FIG. 35 (b)] which is formed in the side wall 246 of a base 201. The position of the pawl 244 within the cut groove 247, that is, the position of the operation knob 243 is restricted by the button 248 which is so disposed as to project into the rotation area of the operation knob 243.

The button 248 extends through the side wall 246 and projects downwardly of the operation knob 243, while the bottom portion of the button 248 is pressed by a coiled spring 250 secured to the spring case 249 which is fixed to the side wall 246.

On the right side of the shaft 242, there is disposed an arm 208, a coiled spring 210 is secured to the arm 208, and a wire 211 is secured to the coiled spring 210. Here, the wire 211 is the same as the wire 15 shown in FIG. 1 and thus to tighten the wire 211 means to tighten the wire 15; and, therefore, due to the fact that the wire 211 is tightened, the hand-operated lock part B shown in FIG. 1 is operated. However, the operation of the hand-operated lock part B is the same as in FIG. 1 and thus description thereof is omitted here.

To move the operation part C from a second operation position X (the pawl 244 is present at a second operation position X of the cut groove 247) shown in FIG. 35 (b) to a first operation position Y, at first, the button 248 shown in FIG. 35 (c) may be pushed by hand in the direction of an arrow line P shown in FIG. 35 (c), and the operation knob 243 may be rotated in the direction of an arrow line Q shown in FIG. 35 (c); and, after the operation knob 243 passes the button 248, when the button 248 is released from the hand, then the button 248 returns to its original position due to the energizing force of the coiled spring 250, so that the operation knob 243 can be held at the first operation position Y. At the then time, the pawl 244 is present at the first operation position Y of the cut groove 247.

On the other hand, to move the operation part C from the first operation position Y to the second operation position X, the button 248 may be pushed in the arrow line P direction, and the operation knob 243 may be rotated in the opposite direction to the arrow line Q direction.

In this manner, the erroneous operation is prevented by arranging that the operation knob 243 cannot be rotated unless the button 248 is pushed-in.

Figure 36:
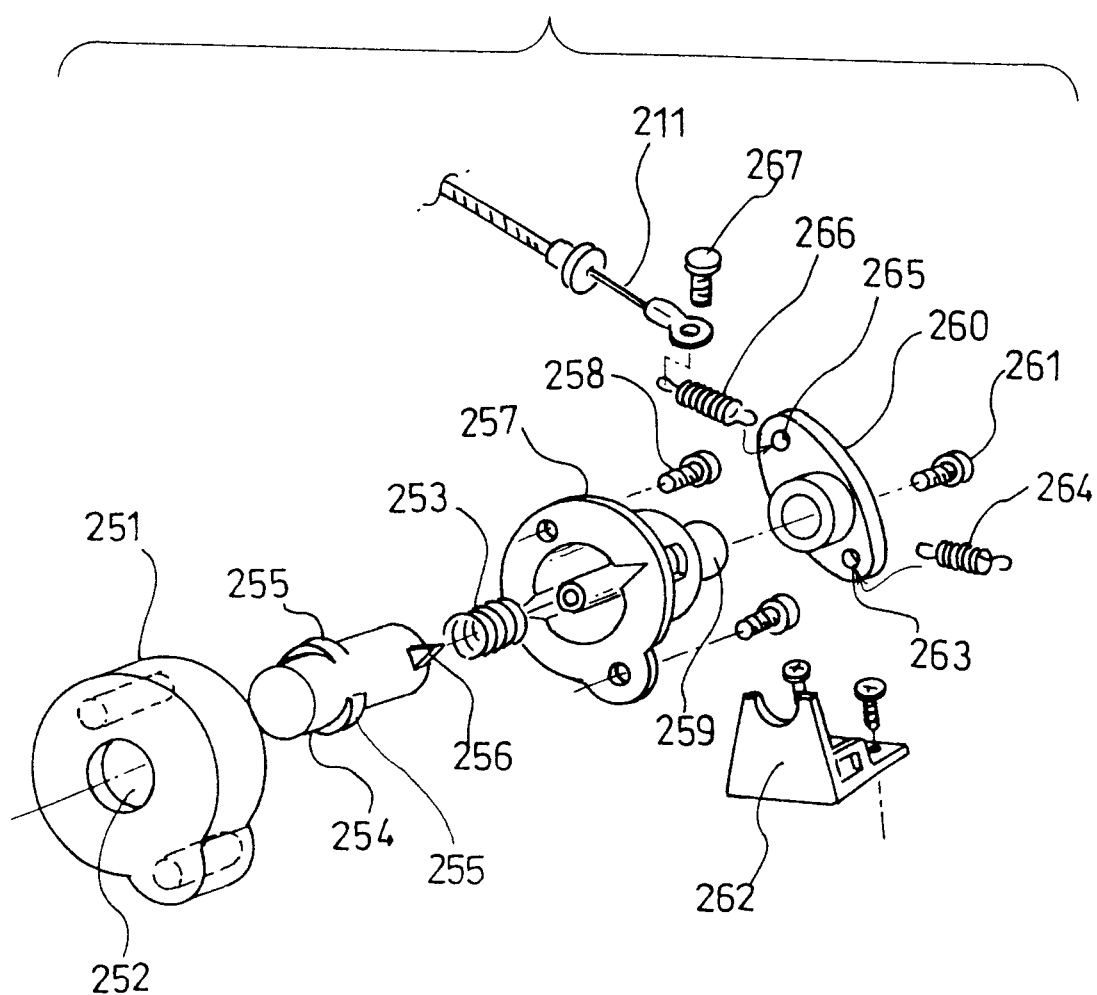
FIG. 36 is an exploded assembly view of a fifth modification of the operation part C of a wire type according to the first embodiment of the invention.
Figure 37A:
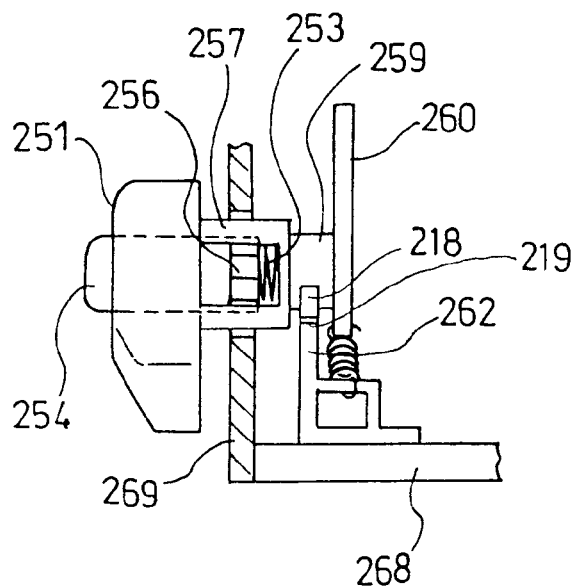
FIG. 37(a) is a partially longitudinal section view of the fifth modification, showing a state thereof in which it is held at a second operation position.
Figure 37B:
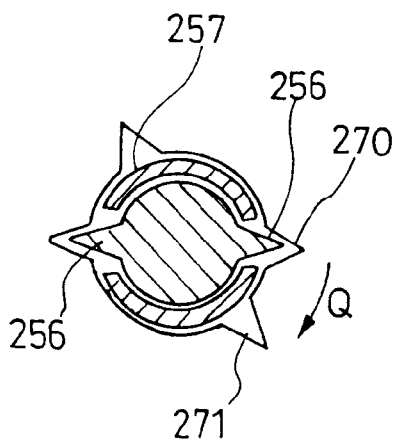
FIG. 37(b) is an explanatory view of an example of a cut groove employed in the fifth modification.
Figure 37C:
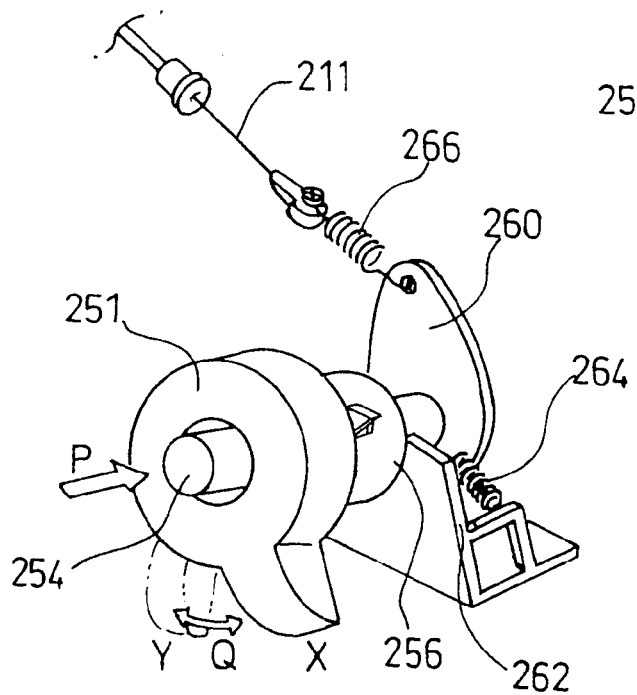
FIG. 37(c) is a perspective view of the relation between the first and second operation positions of the fifth modification.

Now, FIGS. 36 and 37 respectively show a fifth modification of the operation part C of the first embodiment.

The fifth modification shown in FIGS. 36 and 37 is of a type that a button is disposed in the center portion of an operation knob in the axial direction thereof. Specifically, FIG. 36 is an exploded assembly view of the fifth modification, FIG. 37 (a) is a partially longitudinal section view of the fifth modification, FIG. 37 (b) is an explanatory view of a cut groove employed in the fifth modification, and FIG. 37 (c) is a perspective view of the fifth modification.

In FIG. 36, a hollow operation knob 251 includes a hole 252 formed in the axially central portion thereof, while a button 254 energized by a coiled spring 253 can be fitted into the hole 252. In the upper portion of the button 254, there are disposed two stoppers 255 which are used to prevent the button 254 from flying out from the hollow operation knob 251 and, in the lower portion of the button 254, there are disposed two pawls 256. The lower portion of the button 254 is stored into a hollow shaft coupler 257, while the hollow shaft coupler 257 is fixed to the hollow operation knob 251 by a screw 258 or the like.

On the right end of the hollow shaft coupler 257, there is formed a shaft 259. An arm 260 is fixed to the shaft 259 by a bolt 261. The shaft 259 is supported on a support plate 262. Between a hole 263 formed in the lower end of the arm 260 fixed to the shaft 259 and the support plate 262, there is mounted a return spring 264, while one end of a coiled spring 266 is mounted into a hole 265 formed in the upper end of the arm 260. The other end of the coiled spring 266 is fixed to a wire 211 by a screw 267.

The support plate 262, as shown in FIG. 37 (a), is fixed to a base 268. The assembled state of the present modification is as shown in FIG. 37 (a) or (c), and the two pawls 256 disposed on the button 254 respectively project outwardly of the outside diameter of the hollow shaft coupler 257. In the side wall 269 of the base 268, there are opened up two second operation position cut grooves 270 and two first operation position cut grooves 271, while the two pawls 256 disposed on the button 254 can be secured to the second operation position cut grooves 270 or the first operation position cut grooves 271 [FIG. 37 (b)].

In the facing portion of the shaft 259 to one support plate 262, there is disposed a pawl 218, and similarly to that shown in FIG. 30(b), this pawl 218 is stored within an arc-shaped cut groove 219 which is formed in the one support plate 262 to restrict the rotation range of the shaft 259, whereby the rotation range of the shaft 259 is previously set. That is, the right end of the cut groove 219 is a second operation position X which provides a belt drum removing area, whereas the left end of the cut groove 219 is a first operation position Y which provides a belt drum locking area; and, the pawl 218 is allowed to move in this range.

In the thus structured operation part C, to move the operation part C from the second operation position thereof to the first operation position thereof, the button 254 may be pushed by hand in the direction of an arrow line P shown in FIG. 37 (c). In response to this, the coiled spring 253 is compressed to thereby remove the two pawls 256 from their respective second operation position cut grooves 270. While maintaining this state, the hollow operation knob 254 may be rotated in the direction of an arrow line Q shown in FIG. 37 (c) to thereby bring the two pawls 265 into engagement with their respective first operation position cut grooves 271 and, after then, the hand may be released from the button 254. Due to this operation, the arm 260 is rotated, so that the wire 211 can be held in an tightly locked state. On the other hand, to return this state back to the second operation position X, the button 254 may be pushed by hand to thereby remove the pawls 256 from their respective first operation position cut grooves 271, the hollow operation knob 251 may be rotated in the opposite direction to the arrow line Q direction to thereby guide and bring the pawls 256 into engagement with their respective second operation position cut grooves 270.

In this manner, the erroneous operation is prevented by arranging that the operation knob 251 cannot be rotated unless the button 254 is pushed-in.

Figure 38:
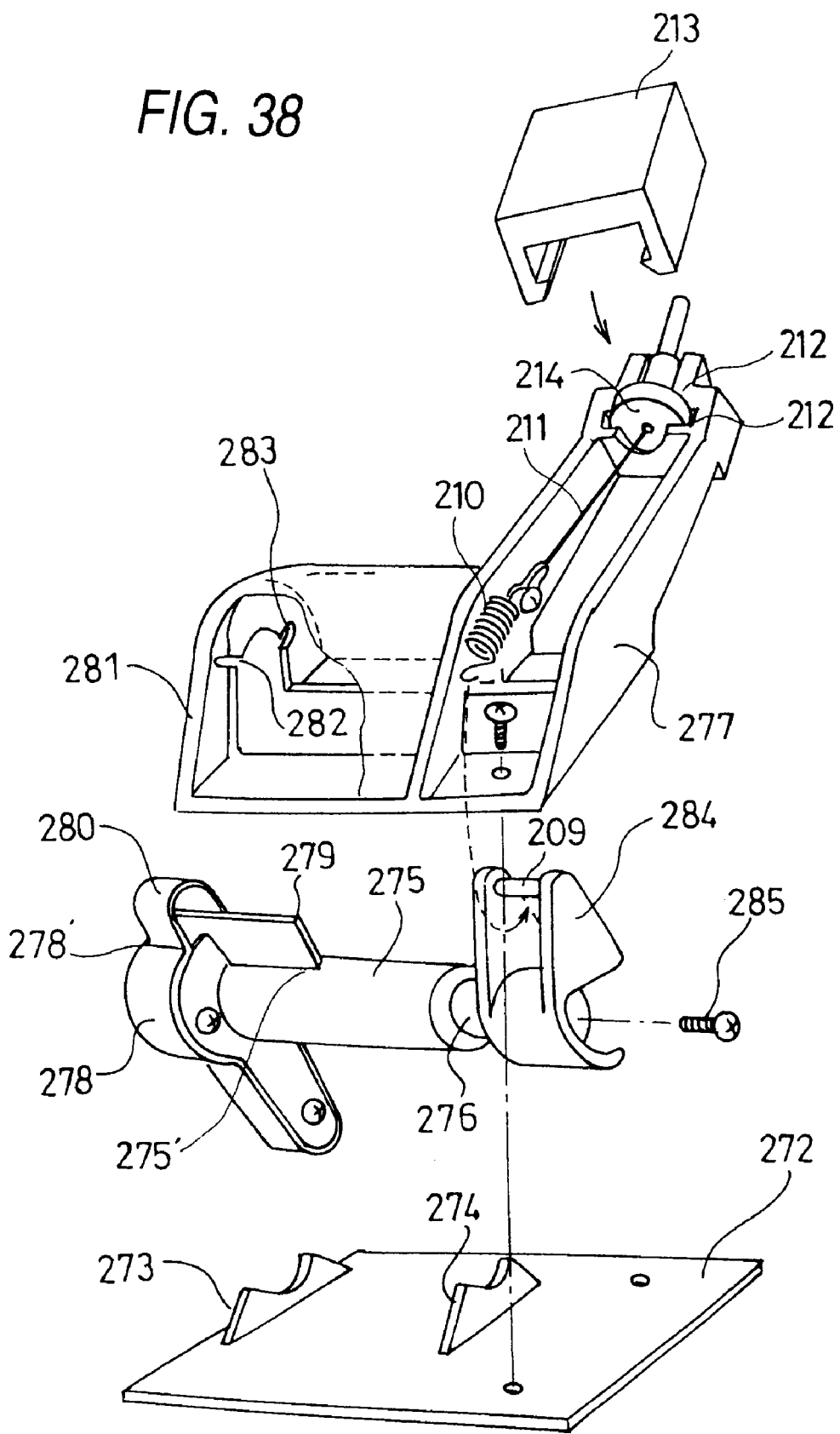
FIG. 38 is an exploded assembly view of a sixth modification of the operation part C of a wire type according to the first embodiment of the invention.
Figure 39A:
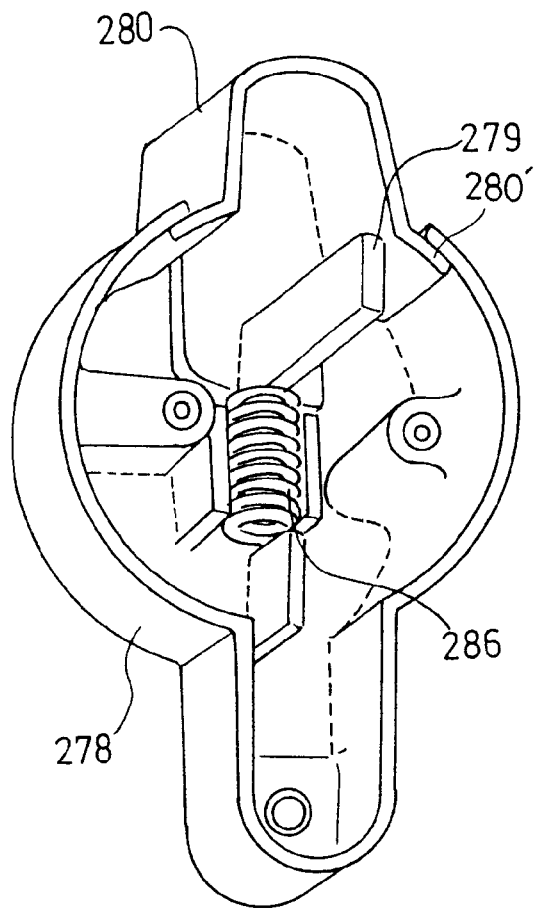
FIG. 39(a) is a view of the internal structure of an operation knob employed in the sixth embodiment.
Figure 39B:
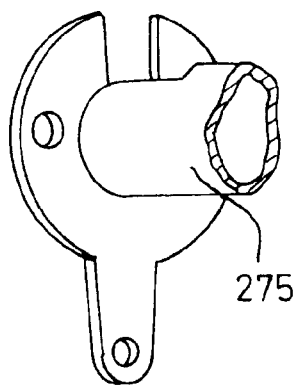
FIG. 39(b) is a perspective view of an example of a hollow shaft coupler employed in the sixth modification.
Figure 39C:
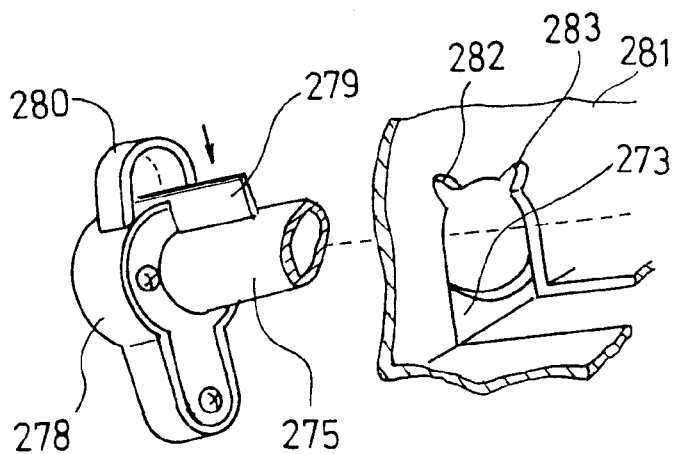
FIG. 39(c) is an explanatory view of the correlation between a securing plate and two cut grooves respectively employed in the sixth modification.
Figure 40A:
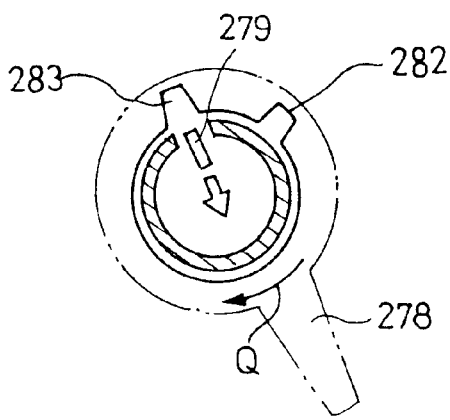
FIG. 40(a) is an explanatory view of a process for moving the present operation part from a second operation position to a first operation position.
Figure 40B:
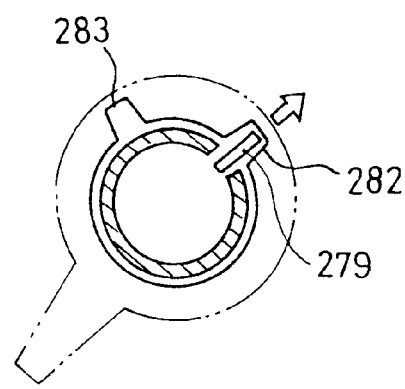
FIG. 40(b) is an explanatory view of a state thereof in which the present operation part has been moved to the first operation position.
Figure 40C:
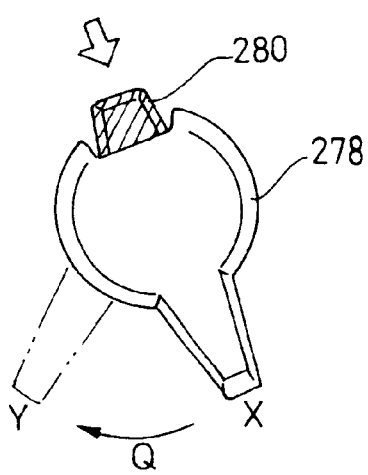
FIG. 40(c) is an explanatory view of the relation between the first and second operation positions of the sixth modification.
Figure 40D:
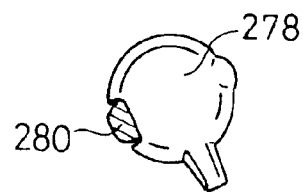
FIGS. 40(d) and 40(e) are an explanatory view of a modification of an operation knob employed in the sixth modification.
Figure 40E:
Figure 41A:
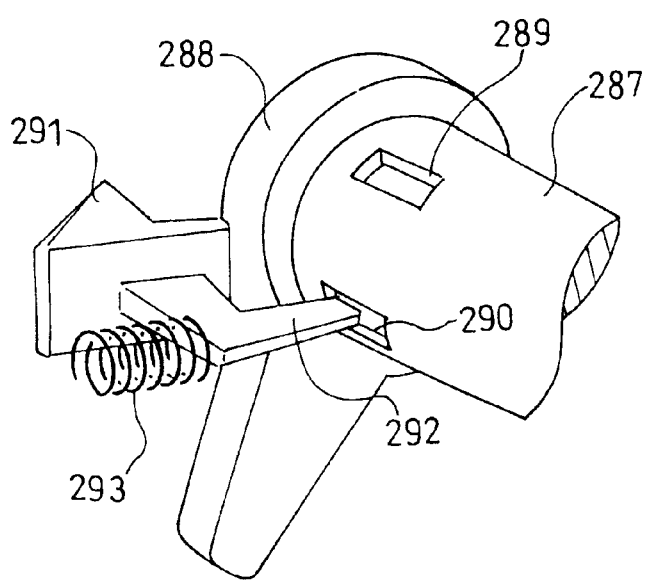
FIG. 41(a) is a perspective view of the seventh modification, showing a state thereof in which it is held at a second operation position.
Figure 41B:
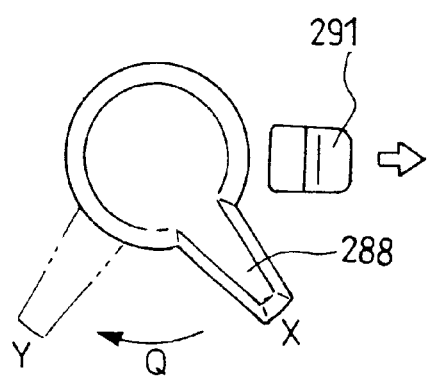
FIG. 41(b) is an explanatory view of the relation between the first and second operation positions of the seventh modification, FIG.
Figure 41C:
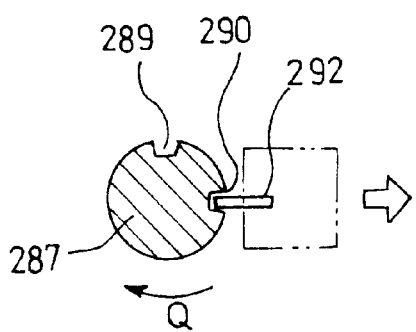
FIG. 41(c) is an explanatory view of the seventh modification, showing a state thereof in which a shaft is held at the second operation position.
Figure 41D:
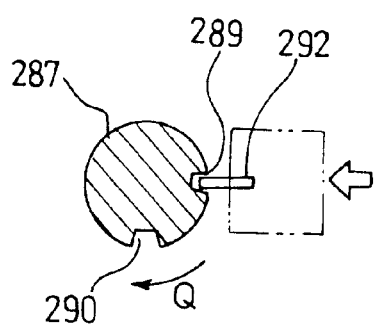
FIG. 41(d) is an explanatory view of the seventh modification, showing a state thereof in which the shaft is held at the first operation position.

Now, FIGS. 38 to 40 respectively show a sixth modification of the operation part C according to the first embodiment of the invention.

The sixth modification is of a type that a button 280 is disposed on the side surface of an operation knob 278. FIG. 38 is an exploded assembly view of the sixth modification, FIG. 39 is an explanatory view of the operation knob 278 employed in the present modification, and FIG. 40 is an explanatory view of the operation of the present modification.

In FIG. 38, a hollow shaft coupler 275 is supported on top of one support plate 273 which is so disposed on a base 272 as to stand erect therefrom, while a shaft 276 formed integrally with the hollow shaft coupler 275 is supported on top of the other support plate 274 similarly disposed on the base 272, and the shaft 276 is held by a shaft holder 277 from above. Also, on the left end portion of the hollow shaft coupler 275, there is formed an opening 275' through which a securing plate 279 can be projected, while the operation knob 278 is fixed at the left end of the hollow shaft coupler 275.

In the facing portion of the shaft 276 to one support plate 204, there is disposed a pawl 218, and similarly to that shown in FIG. 30(b), this pawl 218 is stored within an arc-shaped cut groove 219 which is formed in the one support plate 274 to restrict the rotation range of the shaft 276, whereby the rotation range of the shaft 276 is previously set. That is, the right end of the cut groove 219 is a second operation position X which provides a belt drum removing area, whereas the left end of the cut groove 219 is a first operation position Y which provides a belt drum locking area; and, the pawl 218 is allowed to move in this range.

In the upper portion of the operation knob 278, there is formed an opening 278', while the button 280 can be fitted into the opening 278' in such a manner that the button 280 faces from the inside of the operation knob 278 toward the outside thereof; and, in the bottom portion of the button 280, there is formed a flange 280' [FIG. 39 (a)] which is used to prevent the button 280 from slipping off the inside of the operation knob 278 after it is once fitted therein. The securing plate 279 is formed integrally with the button 280. Now, when the button 280 is fitted into the opening 278' in such a manner that the button 280 faces from the inside of the operation knob 278 toward the outside thereof, then the securing plate 279 projects from the opening 275' formed in the left end of the hollow shaft coupler 275. As will be discussed later, since the button 280 and securing plate 279 are pushed upward by a coiled spring 286 [FIG. 39(a)], the button 280 and securing plate 279 are always projected from the openings 278' and 275' respectively and, when the button 280 is pushed, then the securing plate 279 is retreated into the opening 275'.

Also, in the left end wall 281 of the shaft holder 277, there are opened up a first operation position cut groove 282 and a second operation position cut groove 283, while the securing plate 279 can be engaged with either of the first operation position cut groove 282 or second operation position cut groove 283. To the right end of the shaft 276, there can be fixed an arm 284 by a screw 285. On the leading end of the arm 284, there is disposed a pin 209, and one end of a coiled spring 210 is mounted on the pin 209; and, to the other end of the coil spring 210, there is mounted one end of a wire 211. The wire 211 is guided externally through a guide mouthpiece 214 which is fitted between the two side walls 212 and 212 of the shaft holder 277. The guide mouthpiece 214 is covered and fixed by a cover 213.

Now, FIG. 39 (a) shows the internal structure of the operation knob 278.

As shown in FIG. 39 (a), the button 280 and the securing plate 279 formed integrally with the button 280 are both pushed upward by a coiled spring 286. The hollow shaft coupler 275, which is shown in a reduced manner in FIG. 39 (b), is screwed to the operation knob 278 in such a manner that it covers the back surface of the operation knob 278.

And, in FIG. 39 (c), there are shown the connected state between the operation knob 278, button 280 and securing plate 279 as well as the correlation between the first and second operation position cut grooves 282, 283 respectively formed in the left end wall 281 of the shaft holder 277 and the support plate 273.

Next, description will be predetermined below of the operation of the operation part C according to the present modification.

To move the operation part C from a second operation position X thereof to a first operation position Y [see FIG. 40 (c)], at first, the button 280 may be pushed in by hand. In response to this, as shown in FIG. 40 (a), the securing plate 279 is removed from the second cut groove 283 and thus, while maintaining this state, the operation knob 278 may be rotated in the direction of an arrow line Q shown in FIG. 40 (a). When the button 280 is released from the hand at the time when the securing plate 279 reaches the first cut groove 282, then the securing plate 279 is engaged with the first cut groove 282 to thereby move the operation part C to the first operation position Y, so that the operation part C tightens a wire (not shown) to thereby stop the rotation of a belt drum.

To move the operation part C back to the second operation position X and remove the stop of the rotation the belt drum, the above operation may be reversed. In this manner, the erroneous operation is prevented by arranging that the operation knob 278 cannot be rotated unless the button 280 is pushed-in.

By the way, FIG. 40 (d) shows a further modification in which a lock removing button is disposed on the side portion of the operation knob 278, and FIG. 40 (e) shows a still further modification in which the shape of the operation knob 278 is changed.

Now, FIG. 41 shows a seventh modification of the operation part C according to the first embodiment of the invention.

While the foregoing modifications are all of a type that the button is disposed within the operation knob (although they are different in that the button is mounted on the central portion of the operation knob in some modifications but on the side surface thereof in the remaining modifications), whereas the seventh modification is of a different type from the foregoing modifications: that is, the present modification is different from the foregoing modifications in that a button 291 is provided separately from an operation knob 288.

In the seventh modification, in the neighborhood of the connecting end of a shaft 287 with the operation knob 288, there are formed a first operation position cut groove 289 and a second operation position cut groove 290, and a securing plate 292 to be operated by the button 291 is engaged into one of the first and second operation position cut grooves 289 and 290 to be thereby be able to restrict the rotation of the shaft 287.

The securing plate 292 is normally energized by a coiled spring 293 into engagement with one of the first and second operation position cut grooves 289 and 290. To remove this engagement, the button 291 may be operated to thereby move the securing plate 292. In this operation, the coiled spring 293 is compressed to thereby store energy therein.

In FIGS. 41 (a), 41 (b) and 41 (c), there is shown a second operation position X where the securing plate 292 is in engagement with the second operation position cut groove 290.

To move the operation part C from the second operation position X to a first operation position Y, as shown in FIG. 41 (b), the button 291 may be pushed to the right.

In response to this, as shown in FIG. 41 (c), the securing plate 292 is removed from the second operation position cut groove 290. While maintaining this state, by rotating the operation know 288 by hand in the direction of an arrow line Q shown in FIG. 41 (c), the shaft 287 is rotated and guided up to the first operation position Y.

In this state, when the hand is released from the button 291, then, as shown in FIG. 41 (d), the securing plate 292 is fitted into the first operation position cut groove 289 to thereby tighten a wire (not shown), so that the shaft 287 can be held with a belt drum locked.

To return the operation part C from this belt drum locked position to the second operation position X where the locking of the belt drum is removed, while pushing the button 291 to the right, the operation knob 288 may be rotated in the opposite direction to the arrow line Q direction and stopped at the second operation position X to thereby bring the securing plate 292 into engagement with the second operation position cut groove 290. In this manner, the erroneous operation is prevented by arranging that the operation knob 288 cannot be rotated unless the button 291 is pushed-in.

Although the illustration of the right side of the shaft 287 is omitted, the structure of the right side of the shaft 287 is the same as the structure shown in FIG. 1: that is, on the right side of the shaft 287, there is disposed an arm, a coiled spring is secured to the arm, and a wire for operating the hand-operated lock part B shown in FIG. 1 is secured to the coiled spring.

Figure 42A:
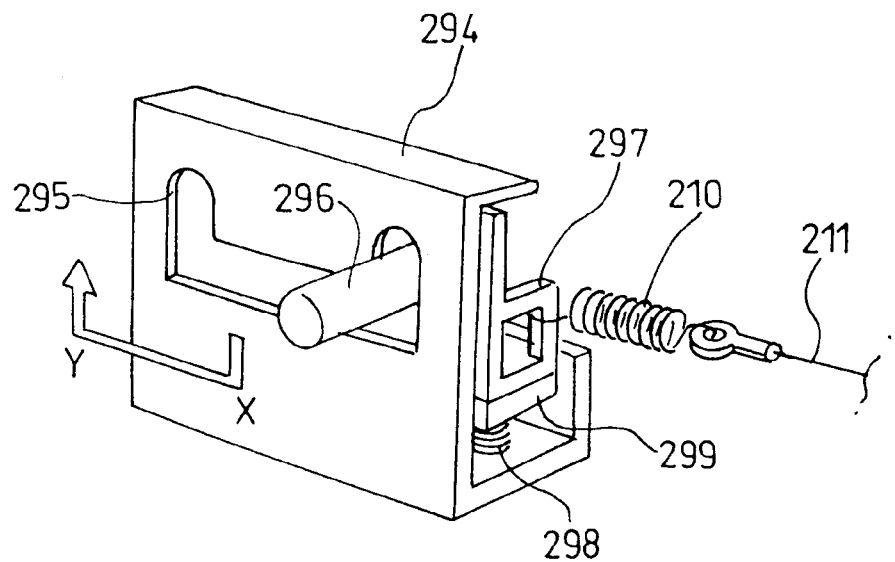
FIG. 42(a) is a perspective view of the front surface of the eighth modification.
Figure 42B:
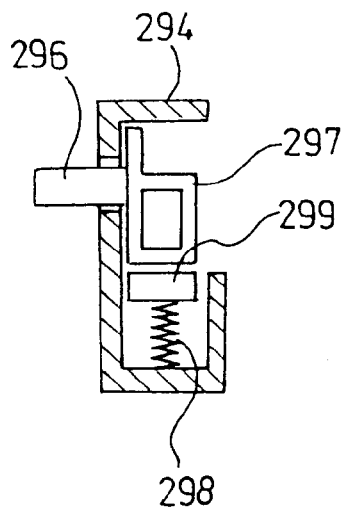
FIG. 42(b) is a partially longitudinal section view thereof.
Figure 42C:
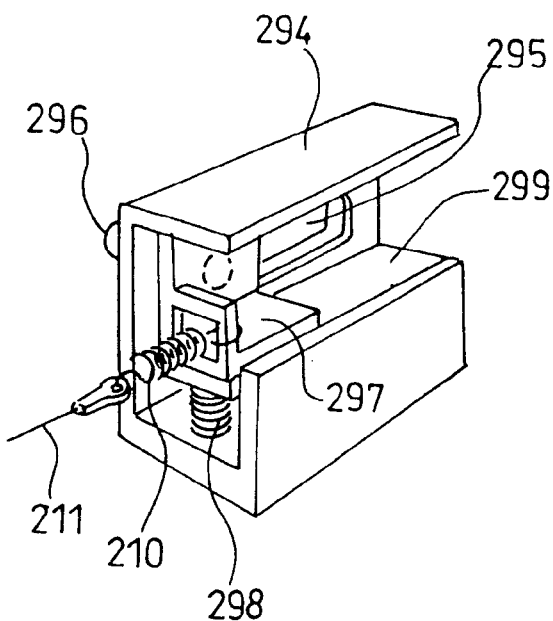
FIG. 42(c) is a perspective view of the back surface thereof.

Now, FIG. 42 shows an eighth modification of the operation part C according to the first embodiment of the invention.

While the above-mentioned first to seventh modifications all use the shaft and rotate the shaft so as to pull the wire, in the eighth modification, instead of rotating the shaft to thereby pull and tighten the wire, by pulling the wire directly, the wire is slided from a first operation position to a second operation position or vice versa to hold the operation part C at first or second operation position: in other words, in principle, the eighth modification falls under the category of the structure shown in FIG. 5 (and FIG. 6).

However, the structure shown in FIG. 42 is different from the structure shown in FIG. 5 in that the securing mechanism employed in the structure shown in FIG. 5 is a hook type in which the securing projection 38a is provided on the lock knob 38, whereas a securing mechanism according to the structure shown in FIG. 42 is a groove type in which an operation knob 296 is caught into a through groove 295.

Specifically, FIG. 42 (a) is a perspective view of the front surface of the present operation part. In the front surface of a frame body 294, there is formed a U-shaped through groove 295; and, the right end of the through groove 295 provides a second operation position X, while the left end thereof provides a first operation position Y. A rod-shaped operation knob 296 projects through the through groove 295.

The base portion of the operation knob 296 is fixed to a moving body 297.

The moving body 297 is carried on a slide seat 299 which is disposed on top of a coiled spring 298 held by the frame body 294, and the moving body 297 is always energized upwardly. On the moving body 297, there is mounted the other end of a coiled spring 210 with one end thereof fixed to a wire 211.

Also, FIG. 42 (*b*) is a longitudinal section view of the present operation part, and FIG. 42 (*c*) is a perspective view of the back surface of the present operation part.

To move the operation knob 296 from the second operation position X to the first operation position Y, while pressing down the operation knob 296, the operation knob 296 may be firstly moved to the left by hand. And, when the hand is released from the operation knob 296 at the left end of the through groove 295, then the operation knob 296 is pushed upward due to the pressure of the coiled spring 298 to thereby pulled the wire 211 to the left and thus tighten the wire 211, so that a belt drum can be held in a locked condition.

To move the operation knob 296 from the first operation position Y to the second operation position X, the above operation may be reversed.

Figure 43A:
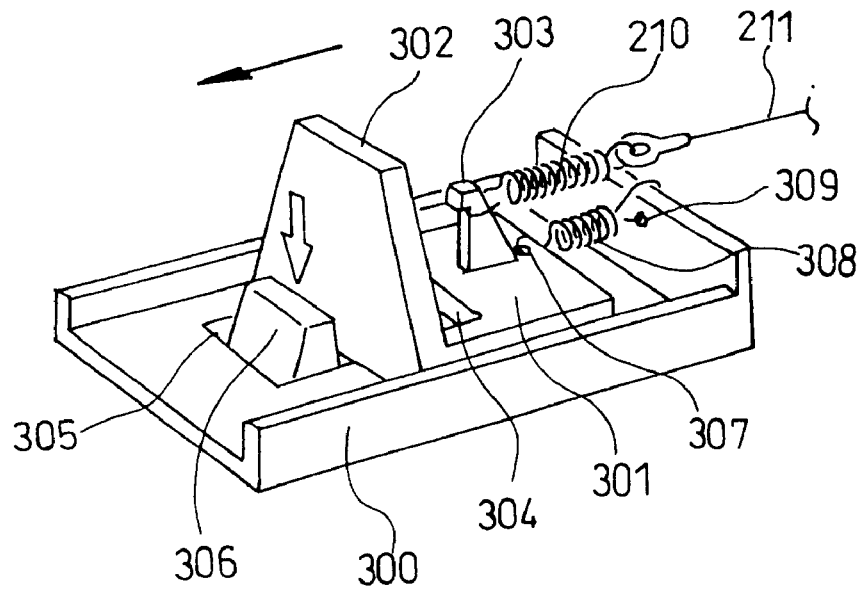
FIG. 43(a) is a perspective view of the ninth modification.
Figure 43B:
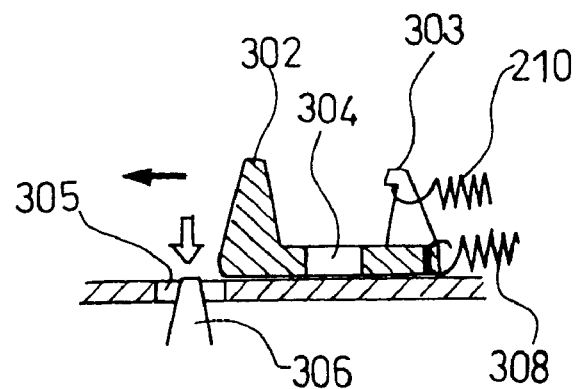
FIG. 43(b) is a partially longitudinal section view of a process for moving the present operation part from a second operation position to a first operation position.
Figure 43C:
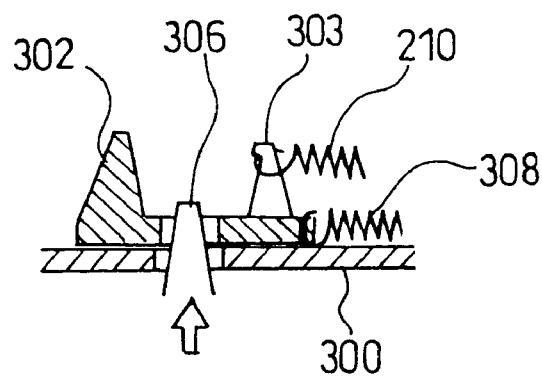
FIG. 43(c) is a partially longitudinal section view of a state thereof in which the present operation part has been moved to the first operation position.

Now, FIG. 43 shows a ninth modification of the operation part C according to the first embodiment of the invention.

The present modification also falls under the category of the structure shown in FIG. 42, that is, the present modification of a type that a wire 211 is directly pulled and slided.

In FIGS. 43 (*a*), (*b*) and (*c*), on a frame body 300, there is disposed a moving body 301 which is movable right and left. Referring to the structure of the moving body 301, on the left end thereof, there is disposed an operation knob 302 in an erect manner, on the right end portion thereof, there is disposed a support plate 303 also in an erect manner, and in the central portion thereof, there is formed a through hole 304. In the neighborhood of the left end of the frame body 300, there is formed a through hold 305, while a securing plate 306 supported by the pressure of a spring projects through the through hole 305. In the right end portion of the moving body 301, there is formed a support hole 307. And, one end of a return spring 308 is mounted on the support hole 307, while the other end of the return spring 308 is mounted on a support hole 309 which is formed in the right end of the frame body 300. Thus, the moving body 301 is always pulled to the right end side of the frame body 300.

Now, FIGS. 43 (*a*) and (*b*) show a state in which the operation knob 302 is held at the second operation position and the locking of the belt drum is removed.

To move the operation knob 302 from this state to the first operation position, at first, as shown in FIG. 43 (*b*), the securing plate 306 may be pressed downward and the operation knob 302 may be operated by hand to thereby allow the moving body 301 to move over the operation knob 302 to the left. As a result of this, the through hole 304 is situated above the securing plate 306 and thus the securing plate 306 projects upwardly through the through hole 304 to thereby be able to secure the moving body 301.

In response to this, the wire 211 is pulled to the left and is held in a state in which the belt drum is locked.

To move the operation knob 302 from this state to the second operation position, when the securing plate 306 held in the state shown in FIG. 43 (*c*) is pushed downward to thereby shift the moving body 301 to the right, then the moving body 301 is pulled by the return spring 308 and is thus moved to the right, and the securing plate 306 projects on the left side of the operation knob 302, so that the operation knob 302 can be held at the second operation position.

The above-mentioned retractor and a child car seat to which the same retractor is applied can provide various effects as follows:

(1) Since the belt for holding the infant seated in the child car seat can be previously set to a desired length and locked, the infant can be prevented from slipping out of the belt.

(2) Even in an emergency, the belt is prevented from being pulled out more than the length that has been set by hand, the safety of the infant can be enhanced.

(3) Because emergency locking and hand-operated belt locking are possible, the retractor can operate as a multi-function retractor and thus a child car seat incorporating such retractor therein can be improved in easiness of use.

(4) Since the emergency lock part and hand-operated lock part respectively forming the retractor can be separated from the operation part for operating the hand-operated lock part, the child car seat incorporating such retractor therein can be enhanced in the freedom of design as well as can be improved in easiness of (5) As the locking of the belt is possible even in the pulling course of the belt, the child car seat can be improved in easiness of use.

What is claimed is:

1. An emergency-lock type retractor which is mounted to a child safety seat comprising:

a rotatable drum, a seat belt connected to said drum, first means for controlling rotation of said drum to restrict said seat belt from being drawn out from said drum when a belt wound around said drum is pulled at a predetermined speed or higher, second means, set by an operator, for controlling rotation of said drum to restrict said seat belt from being drawn out and from being retracted, said second controlling means including:

a gear rotatable with said drum;

a locking pawl which engages said gear, said second controlling means causing said locking pawl to engage said gear;

a drive plate formed integrally with said locking pawl; and a spring biased rotating plate adapted to be pushed against said drive plate so that said locking pawl engages said gear and thereby locks rotation of said rotatable drum.

2. An emergency-lock type retractor which is mounted to a child safety seat as claimed in claim 1, further comprising:

an operation block positioned proximate to said second controlling means and cooperating with said locking pawl of said second controlling means through a wire.

3. An emergency-lock type regulator which is mounted to a child safety seat as claimed in claim 2, wherein said operation block has:

a spring-actuated lock piece which controls operation of said second controlling means in restricting said seat belt from being drawn out and from being retracted.

4. An emergency-lock type retractor as claimed in claim 2, wherein said operation block includes a U-shaped frame body and a rotary drum having a first locking hole and a second locking hole, a lock piece rotationally moves with said rotary drum with respect to said U-shaped frame body.

5. An emergency-lock type retractor which is mounted to a child safety seat as claimed in claim 2, wherein said operation block includes a U-shaped frame body and a lock piece linearly moving along with said U-shaped frame body, said lock piece includes a locking projection which cooperates with a securing hole of said U-shaped frame body.

6. An emergency-lock type retractor which is mounted to a child safety seat comprising:
- a rotatable drum;
- a seat belt connected to said drum;
- first means for controlling rotation of said drum to restrict said seat belt from being drawn out from said drum when a belt is wound around said drum is pulled at a predetermined speed or higher;
- second means, set by an operator, for controlling rotation of said drum to restrict said seat belt from being drawn out and from being retracted, said second controlling means including:
  - a gear rotatable with said drum; and
  - a locking pawl which engages said gear, said second controlling means causing said locking pawl to engage said gear; and
- an operation block positioned proximate to the second controlling means and cooperating with said locking pawl of said second controlling means through a wire, said operation block including:
  - a U-shaped frame body and a rotary drum having a first locking hole and a second locking hole; and
  - a lock piece rotationally moves with said rotary drum with respect to said U-shaped frame body.

7. An emergency-lock type retractor which is mounted to a child safety seat comprising:
- a rotatable drum;
- a seat belt connected to said drum;
- first means for controlling rotation of said drum to restrict said seat belt from being drawn out from said drum when a belt is wound around said drum is pulled at a predetermined speed or higher;
- second means, set by an operator, for controlling rotation of said drum to restrict said seat belt from being drawn out and from being retracted, said second controlling means including:
  - a gear rotatable with said drum;
  - a locking pawl which engages said gear, said second controlling means causing said locking pawl to engage said gear; and
- an operation block positioned proximate to the second controlling means and cooperating with said locking pawl of said second controlling means through a wire, said operation block including:
  - a U-shaped frame body; and
  - a lock piece linearly moving along with said U-shaped frame body, said lock piece includes a locking projecting which cooperates with a securing hole of said U-shaped frame body.

* * * * *